United States Patent
Bourd et al.

(10) Patent No.: US 9,626,234 B2
(45) Date of Patent: *Apr. 18, 2017

(54) INTER-PROCESSOR COMMUNICATION TECHNIQUES IN A MULTIPLE-PROCESSOR COMPUTING PLATFORM

(71) Applicant: QUALCOMM Incorporated, San Diego, CA (US)

(72) Inventors: Alexei Vladimirovich Bourd, San Diego, CA (US); Colin Christopher Sharp, San Diego, CA (US); David Rigel Garcia Garcia, Toronto (CA); Chihong Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 14/570,974

(22) Filed: Dec. 15, 2014

(65) Prior Publication Data

US 2015/0097849 A1 Apr. 9, 2015

Related U.S. Application Data

(63) Continuation of application No. 13/235,266, filed on Sep. 16, 2011, now Pat. No. 8,937,622.

(Continued)

(51) Int. Cl.
*G06F 9/54* (2006.01)
*G06T 1/20* (2006.01)
*G06T 1/60* (2006.01)

(52) U.S. Cl.
CPC .............. *G06F 9/544* (2013.01); *G06F 9/546* (2013.01); *G06T 1/20* (2013.01); *G06T 1/60* (2013.01)

(58) Field of Classification Search
None
See application file for complete search history.

(56) References Cited

U.S. PATENT DOCUMENTS

| 5,604,909 A | 2/1997 | Joshi et al. |
| 5,854,637 A | 12/1998 | Sturges |

(Continued)

FOREIGN PATENT DOCUMENTS

| CN | 1605064 A | 4/2005 |
| GB | 2462860 A | 2/2010 |

(Continued)

OTHER PUBLICATIONS

Asynchronous communications, Oct. 27, 1999, [Retrieved date on Jun. 9, 2014], Retrieved from the Internet < URL: http://www4.cs.fau.de/~geier/corba-faq/asynch-comm.html >, 2 pp.

(Continued)

*Primary Examiner* — Barry Drennan
*Assistant Examiner* — Jason Pringle-Parker
(74) *Attorney, Agent, or Firm* — Shumaker & Sieffert, P.A.

(57) ABSTRACT

This disclosure describes communication techniques that may be used within a multiple-processor computing platform. The techniques may, in some examples, provide software interfaces that may be used to support message passing within a multiple-processor computing platform that initiates tasks using command queues. The techniques may, in additional examples, provide software interfaces that may be used for shared memory inter-processor communication within a multiple-processor computing platform. In further examples, the techniques may provide a graphics processing unit (GPU) that includes hardware for supporting message passing and/or shared memory communication between the GPU and a host CPU.

26 Claims, 28 Drawing Sheets

Related U.S. Application Data

(60) Provisional application No. 61/384,571, filed on Sep. 20, 2010, provisional application No. 61/515,182, filed on Aug. 4, 2011.

(56) References Cited

U.S. PATENT DOCUMENTS

| | | | |
|---|---|---|---|
| 6,088,740 A | 7/2000 | Ghaffari et al. | |
| 6,212,667 B1 | 4/2001 | Geer et al. | |
| 6,618,759 B1 | 9/2003 | Lefebvre et al. | |
| 6,801,208 B2 | 10/2004 | Keshava et al. | |
| 6,891,543 B2 | 5/2005 | Wyatt | |
| 7,023,445 B1 | 4/2006 | Sell | |
| 7,356,669 B2 | 4/2008 | Radulescu et al. | |
| 7,526,634 B1 | 4/2009 | Duluk, Jr. et al. | |
| 7,583,268 B2 | 9/2009 | Huang et al. | |
| 7,653,736 B2 | 1/2010 | Van Eijndhoven et al. | |
| 8,106,921 B2 * | 1/2012 | Nystad | H04N 19/43 345/555 |
| 8,108,622 B2 | 1/2012 | Nonogaki et al. | |
| 8,212,832 B2 | 7/2012 | Stefanidis et al. | |
| 8,937,622 B2 | 1/2015 | Bourd et al. | |
| 2003/0210248 A1 * | 11/2003 | Wyatt | G06F 12/0888 345/541 |
| 2005/0138249 A1 | 6/2005 | Galbraith et al. | |
| 2005/0182767 A1 | 8/2005 | Shoemaker et al. | |
| 2006/0044219 A1 | 3/2006 | Kao et al. | |
| 2006/0112234 A1 | 5/2006 | Cabot et al. | |
| 2006/0114260 A1 | 6/2006 | Diard | |
| 2007/0294481 A1 | 12/2007 | Hoover et al. | |
| 2007/0294696 A1 | 12/2007 | Papakipos et al. | |
| 2009/0122068 A1 | 5/2009 | Garritsen | |
| 2009/0248983 A1 | 10/2009 | Offen et al. | |
| 2009/0251475 A1 | 10/2009 | Mathur et al. | |
| 2010/0118039 A1 | 5/2010 | Labour | |
| 2010/0123717 A1 | 5/2010 | Jiao | |
| 2010/0250856 A1 * | 9/2010 | Owen | G06F 12/126 711/128 |
| 2011/0022817 A1 | 1/2011 | Gaster et al. | |
| 2011/0057937 A1 | 3/2011 | Wu et al. | |
| 2012/0036029 A1 | 2/2012 | Esplin et al. | |
| 2012/0045682 A1 | 2/2012 | Oury et al. | |
| 2012/0069029 A1 | 3/2012 | Bourd et al. | |
| 2012/0069035 A1 | 3/2012 | Bourd et al. | |

FOREIGN PATENT DOCUMENTS

| | | |
|---|---|---|
| JP | S6242247 A | 2/1987 |
| JP | H02140847 A | 5/1990 |
| JP | H03127146 A | 5/1991 |
| JP | H0950399 A | 2/1997 |
| JP | 2005182825 A | 7/2005 |
| JP | 2005524907 A | 8/2005 |
| JP | 2008140078 A | 6/2008 |
| JP | 2008204292 A | 9/2008 |
| JP | 2010020755 A | 1/2010 |

OTHER PUBLICATIONS

Distributed Object, Wikipedia, Jul. 29, 2009, [Retrieved date on Jun. 10, 2014], Retrieved from the internet < URL: http://en.wikipedia.org/w/index.php?title-Distributed_object&oldid=304858079 >, 2 pp.

Foster, "Message Passing Interface," 1995, [Retrieved date on Jun. 10, 2014], Retrieved from the Internet < URL: http://www.mcs.anl.gov/~itf/dbpp/text/node94.html >, 43 pp.

Free On-Line Dictionary of Computing, foldoc.org/queue, May 18, 2007, 1 pp.

International Preliminary Report on Patentability from International Application No. PCT/US2011/052206, dated Feb. 22, 2013, 7 pp.

International Search Report and Written Opinion from International Application No. PCT/US2011/052206 dated Jan. 18, 2012, 10 pp.

Joerg, et al., "A tightly-coupled processor-network interface," Mar. 1992, Massachusetts Institute of Technology, 13 pp.

Kawamura, et al., "Real-time OS for Research and DSP: System Interface of SPOX", , Interface, CQ Publishing Co., Ltd, Sep. 1, 1994, vol. 20, No. 9, pp. 139-154.

Lawlor, "Message Passing for GPGPU Clusters: cudaMPI," Department of Computer Science, University of Alaska Fairbanks, retrieved online at https://www.cs.uaf.edu/~olawlor/papers/2009/cudaMPI/lawlor_cudaMPI_2009.pdf, Aug. 2009, 8 pp.

Munshi, "The OpenCL Specification," Version 1.1, Document Revision 36, Khronos OpenCL Working Group, Sep. 30, 2010, 379 pp.

Okuzono, "Introduction to OpenCL," Shuwa System Co., Ltd., May 20, 2010, pp. 15-32.

Stuart et al., "Message Passing on Data-Parallel Architectures," 2009, retrieved online at http:\\www.idav.ucdavis.edu/func/return_pdf?pub_id=959, on Sep. 16, 2011, 12 pp.

The OpenCL specification, Oct. 6, 2009, Khronos OpenCL Working Group, Munshi A., (Ed., ), Document Revision: 48, Version 1.0, pp. 1-308.

Wesolowski, "An Application Programming Interface for General Purpose Graphics Processing Units in an Asynchronous Runtime System," 2008, retrieved online at http://charm.cs.uiuc.edu/papers/LukaszMSThesis08.pdf on Sep. 16, 2011, 55 pp.

First Office Action from counterpart Japanese Patent Application No. 2013-530216, dated Jul. 8, 2014, 7 pp.

Reply to Written Opinion dated Jan. 18, 2012, from International Application No. PCT/US2011/052206, dated Jun. 22, 2012, 12 pp.

Hennessy, et al., "Computer Architecture A Quantitative Approach", Morgan Kaufmann, 2nd edition, 1996, 7 pp. (Applicant point out, in accordance with MPEP 609.04(a), that the year of publication, 1996, is sufficiently earlier than the effective U.S. filing date, Sep. 16, 2011, so that the particular month of publication is not in issue.).

* cited by examiner

INTER-PROCESSOR COMMUNICATION TECHNIQUES IN A MULTIPLE-PROCESSOR COMPUTING PLATFORM

This application is a continuation of U.S. application Ser. No. 13/235,266, filed Sep. 16, 2011 which claims the benefit of U.S. Provisional Application No. 61/515,182, filed Aug. 4, 2011, and U.S. Provisional Application No. 61/384,571, filed Sep. 20, 2010, the entire content of each of which is incorporated herein by reference.

TECHNICAL FIELD

The disclosure relates to computing platforms and, more particularly, to computing platforms that include multiple processors.

BACKGROUND

Computing platforms that include multiple processors are used to improve the performance of applications that have high computational intensity requirements and/or high data throughput requirements. A multiple-processor computing platform may include a general-purpose central processing unit (CPU) that may act as a host device and one or more computing devices that the host CPU may use to offload the performance of computationally-intensive tasks, thereby improving performance of the overall system. In some cases, the one or more computing devices may be specifically designed to process certain types of tasks more efficiently than the host CPU, which may provide further performance improvements for the overall system. For example, the one or more computing devices may be specifically designed to execute parallel algorithms more efficiently than the host CPU.

One type of computing device that may be used in a multiple-processor computing system is a graphics processing unit (GPU). Traditionally, CPUs included fixed function hardware that was specifically designed for the real-time rendering of 3-dimensional (3D) graphics to a display device, but was not typically programmable, i.e., a compiled program could not be downloaded to the GPU and executed on the GPU. More recently, however, with the development of programmable shader units, much of the architecture of the GPU has shifted to a programmable architecture that includes many parallel processing elements. The programmable architecture allows the GPU to facilitate the execution of, not only graphics operations, but also general-purpose computing tasks in a highly-parallel manner.

Using a GPU to execute general-purpose, non-graphics specific computing tasks may be referred to herein as General-Purpose computation on Graphics Processing Units (GPGPU), or alternatively as GPU computing. In some cases, CPUs may make available an application programming interfaces (API) that is not graphics specific, thereby easing the programming of the GPU for the execution of general-purpose computing tasks. GPU computing tasks may include tasks that are computationally-intensive and/or include a high degree of parallelism, e.g., matrix calculations, signal processing calculations, statistical algorithms, molecular modeling applications, finance applications, medical imaging, cryptanalysis applications, etc.

A GPU is just one type of computing device that can be used in a multiple-processor computing platform, and other types of computing devices may also be used in addition to or in lieu of a GPU. For example, other types computing devices that may be used in a multiple-processor computing platform include, e.g., an additional CPU, a digital signal processor (DSP), a Cell Broadband Engine (Cell/BE) processor or any other type of processing unit.

A multiple-processor computing platform with multiple computing devices may be either a homogenous platform or a heterogeneous platform. In a homogenous platform, all computing devices share a common instruction set architecture (ISA). In contrast, a heterogeneous platform may include two or more computing devices with different ISAs. In general, different types of computing devices may have different ISAs, and different brands of computing devices of the same type may also have different ISAs.

The performance of a multiple-processor computing platform may be further improved by utilizing multi-core computing devices and/or many-core computing devices. An example of a multi-core computing device is the GPU described above that contains a programmable shader unit having a plurality of processing cores. CPUs, however, may also be designed to include multiple processing cores. In general, any chip or die that includes multiple processing cores may be considered to be a multi-core processor. A processing core may refer to a processing unit that is capable of executing an instruction on a particular piece of data. For example, a single arithmetic logic unit (ALU) unit or vector processor within a GPU may be considered to be a processing core. Many-core processors generally refer to multi-core processors that have a relatively high number of cores, e.g., greater than ten cores, and are typically designed using different techniques than those which are used to design multi-core processors with a smaller number of cores. Multi-core processors provide performance improvement by allowing a software program to execute in parallel, e.g., concurrently, on multiple cores on a single chip.

A parallel programming model refers to a programming model that is designed to allow a program to be executed concurrently on multiple processing cores. The program may be a multi-threaded program, in which case, a single thread may operate on each processing core, in some examples, a single computing device may include all of the processing cores used to execute the program. In other examples, some of the processing cores used to execute the program may be located on different computing devices of the same type or of a different type.

A cross-platform, cross-vendor, heterogeneous computing platform, parallel programming model Application Programming Interface (API) may be used to provide a common language specification for the parallel programming of a heterogeneous, multi-core computing platform that includes different types of computing devices potentially made by different vendors which implement different ISAs. Open Computing Language (OpenCL™) is an example of a cross-platform, cross-vendor, heterogeneous computing platform, parallel programming API. Such APIs may be designed to allow for more generalized data processing on a GPU. For example, beyond exposing the expanded shader subsystem capabilities via a compute language, these APIs may generalize the data flow and control paths into the GPU in a non-graphics specific manner. Presently, however, the instruction sets provided by such APIs are based on the hardware architecture of a GPU, and hence, limited to functionality that is compatible with existing GPU architectures.

SUMMARY

This disclosure describes communication techniques that may be used within a multiple-processor computing platform. The techniques may, in some examples, provide software interfaces that may be used to support message passing within a multiple-processor computing platform that initiates tasks using command queues. The techniques may, in additional examples, provide software interfaces that may be used for shared memory inter-processor communication within a multiple-processor computing platform. In further examples, the techniques may provide a graphics processing unit (GPU) that includes hardware for supporting message passing and/or shared memory communication between the GPU and a host CPU.

In one example, this disclosure describes a host device that includes one or more processors. The device further includes a command queue interface executing on the one or more processors and configured to place a plurality of commands into a command queue in response to receiving one or more enqueue instructions from a process executing on the host device. The plurality of commands includes a first command instructing the host device to transfer data between a first memory space associated with the host device and a second memory space associated with a graphics processing unit (GPU). The plurality of commands further includes a second command instructing the host device to initiate execution of a task on the GPU. The device further includes a message passing interface executing on the one or more processors and configured to pass one or more messages between the process executing on the host device and a task executing on the GPU while the task is executing on the GPU and in response to receiving one or more message passing instructions from the process executing on the host device.

In another example, this disclosure describes a method that includes placing, with a command queue interface executing on one or more processors of a host device, a plurality of commands into a command queue in response to receiving one or more enqueue instructions from a process executing on the host device. The plurality of commands includes a first command instructing the host device to transfer data between a first memory space associated with the host device and a second memory space associated with a graphics processing unit (GPU). The plurality of commands further includes a second command instructing the host device to initiate execution of a task on the GPU. The method further includes passing, with a message passing interface executing on the one or more processors of the host device, one or more messages between the process executing on the host device and a task executing on the GPU while the task is executing on the GPU and in response to receiving one or more message passing instructions from the process executing on the host device.

In another example, this disclosure describes an apparatus that includes means for placing a plurality of commands into a command queue in response to receiving one or more enqueue instructions from a process executing on a host device. The plurality of commands includes a first command instructing the host device to transfer data between a first memory space associated with the host device and a second memory space associated with a graphics processing unit (GPU). The plurality of commands further includes a second command instructing the host device to initiate execution of a task on the GPU. The apparatus further includes means for passing one or more messages between the process executing on the host device and a task executing on the GPU while the task is executing on the GPU and in response to receiving one or more message passing instructions from the process executing on the host device.

In another example, this disclosure describes a computer-readable storage medium that includes instructions that cause one or more processor to place a plurality of commands into a command queue in response to receiving one or more enqueue instructions from a process executing on a host device. The plurality of commands includes a first command instructing the host device to transfer data between a first memory space associated with the host device and a second memory space associated with a graphics processing unit (GPU). The plurality of commands further includes a second command instructing the host device to initiate execution of a task on the GPU. The computer-readable storage medium further includes instructions that cause the one or more processors to pass one or more messages between the process executing on the host device and a task executing on the GPU while the task is executing on the GPU and in response to receiving one or more message passing instructions from the process executing on the host device.

In another example, this disclosure describes a graphics processing unit (GPU) that includes one or more processors configured to execute a task. The GPU further includes one or more registers accessible by a host device. The GPU further includes a message passing module configured to pass one or more messages, via the one or more registers, between the task executing on the one or more processors and a process executing on the host device while the task is executing on the one or more processors and in response to receiving one or more message passing instructions from the task executing on the one or more processors.

In another example, this disclosure describes a method that includes receiving, with a message passing module of a graphics processing unit (GPU), one or more message passing instructions from a task executing on the GPU. The method further includes passing, via one or more registers within the GPU that are accessible by a host device, one or more messages between the task executing on the GPU and a process executing on the host device while the task is executing on the GPU and in response to receiving the one or more message passing instructions from the task executing on the GPU.

In another example, this disclosure describes an apparatus that includes means for receiving one or more message passing instructions from a task executing on a graphics processing unit (GPU). The apparatus further includes means for passing, via one or more registers within the GPU that are accessible by a host device, one or more messages between the task executing on the GPU and a process executing on the host device while the task is executing on the GPU and in response to receiving the one or more message passing instructions from the task executing on the GPU.

In another example, this disclosure describes a computer-readable medium comprising instructions that cause one or more processors to receive one or more message passing instructions from a task executing on a graphics processing unit (GPU). The computer-readable storage medium further includes instructions that cause the one or more processors to pass, via one or more registers within the GPU that are accessible by a host device, one or more messages between the task executing on the GPU and a process executing on the host device while the task is executing on the GPU and in response to receiving the one or more message passing instructions from the task executing on the GPU.

In another example, this disclosure describes a method that includes receiving, with a memory buffer interface executing on one or more processors of a host device, an instruction that includes information specifying whether an immediate mode should be enabled for a shared memory space that is accessible by the host device and by a graphics processing unit (GPU). The method further includes selectively enabling, with the memory buffer interface, the immediate mode for the shared memory space based on the information specifying whether the immediate mode should be enabled.

In another example, this disclosure describes a host device that includes one or more processors. The device further includes a memory buffer interface executing on the one or more processors and configured to receive an instruction that includes information specifying whether an immediate mode should be enabled for a shared memory space, and selectively enable the immediate mode for the shared memory space based on the information specifying whether the immediate mode should be enabled, the shared memory space being accessible by the host device and by a graphics processing unit (GPU).

In another example, this disclosure describes an apparatus that includes means for receiving an instruction that includes information specifying whether an immediate mode should be enabled for a shared memory space that is accessible by a host device and by a graphics processing unit (GPU). The apparatus further includes means for selectively enabling the immediate mode for the shared memory space based on the information specifying whether the immediate mode should be enabled.

In another example, this disclosure describes a computer-readable medium comprising instructions that cause one or more processors to receive an instruction that includes information specifying whether an immediate mode should be enabled for a shared memory space that is accessible by a host device and by a graphics processing unit (GPU). The computer-readable storage medium further includes instructions that cause the one or more processors to selectively enable the immediate mode for the shared memory space based on the information specifying whether the immediate mode should be enabled.

In another example, this disclosure describes a graphics processing unit (GPU) that includes a GPU cache associated with a memory. The device further includes one or more processing modules configured to selectively use caching services of the GPU cache to execute at least one of a read operation and a write operation with respect to a memory space of the memory in response to receiving information specifying whether caching services should be used for executing at least one of read operations and write operations with respect to the memory space.

In another example, this disclosure describes a method that includes selectively using caching services of a graphics processing unit (GPU) cache associated with a memory to execute at least one of a read operation and a write operation with respect to a memory space of the memory in response to receiving information specifying whether caching services should be used for executing at least one of read operations and write operations with respect to the memory space.

In another example, this disclosure describes an apparatus that includes a GPU cache associated with a memory. The apparatus further includes means for selectively using caching services of the GPU cache to execute at least one of a read operation and a write operation with respect to a memory space of the memory in response to receiving information specifying whether caching services should be used for executing at least one of read operations and write operations with respect to the memory space.

In another example, this disclosure describes a computer-readable medium comprising instructions that cause one or more processors to selectively use caching services of a graphics processing unit (GPU) cache associated with a memory to execute at least one of a read operation and a write operation with respect to a memory space of the memory in response to receiving information specifying whether caching services should be used for executing at least one of read operations and write operations with respect to the memory space.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
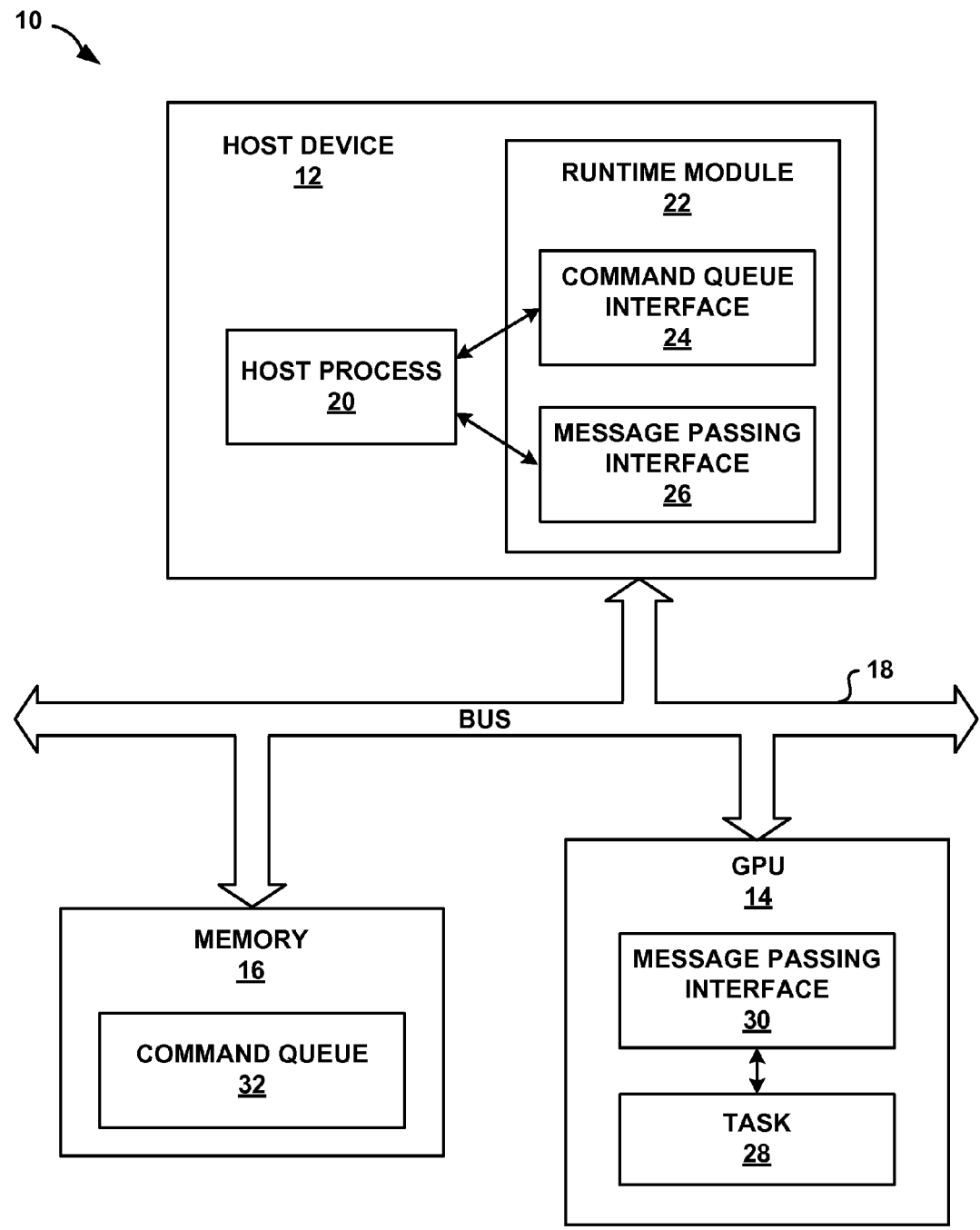
FIG. 1 is a block diagram illustrating an example computing system that may be used to perform message passing techniques in accordance with this disclosure.

This disclosure describes communication techniques that may be used within a multiple-processor computing platform. The techniques may, in some examples, provide software interfaces that may be used to support message passing within a multiple-processor computing platform that initiates tasks using command queues. The techniques may, in additional examples, provide software interfaces that may be used for shared memory inter-processor communication within a multiple-processor computing platform. In further examples, the techniques may provide a graphics processing unit (GPU) that includes hardware for supporting message passing and/or shared memory communication between the GPU and a host CPU.

In recent years, processors that were originally designed for processing of real-time 3D graphics, e.g., a graphics processing unit (GPU), were generalized to perform general purpose computing tasks (GPGPU). The value of GPGPUs has been demonstrated in part by the adoption of industry-wide standards, such as, e.g., the Open Computing Language (OpenCL™) standard. OpenCL is an example of a cross-platform, cross-vendor, heterogeneous computing platform, parallel programming API that may be used to execute programs having task-level parallelism and/or data-level parallelism on a multiple-processor computing platform. The API is designed specifically to allow more generalized data processing on a GPU by generalizing the data flow and control paths of the GPU in a non-graphics specific manner. One limitation of this approach is the coarse granularity of data communication between the host CPU and the computing devices, e.g., a GPU.

For example, the OpenCL API provides a command queue interface that supports task-level granularity of communication between a host device and one or more computing devices. Each command queue generally holds commands that will be executed by a specific computing device. A host process executing on a host device may transfer data between the host memory space and the device memory space by placing a command in the command queue instructing the host device to perform the memory transfer. Similarly, the host process may cause a task to begin executing on a computing device by placing a command in the command queue, instructing the host device to execute a task on the computing device.

The command queue interface may be configured to provide either in-order execution of commands or out-of-order execution of commands. When the command queue interface is configured to provide in-order execution of commands, the command queue interface guarantees that the commands will be executed in the order in which the commands were placed into the command queue and that execution of a subsequent command will not begin until the previous command has completed execution. Thus, when the host process places a command in the command queue to execute a task, the command queue waits for the task to complete execution prior to executing any additional commands that may be subsequently placed into the command queue.

In a simple setting involving a host CPU and a GPU and an in-order command queue, a communication scheme between the host CPU and the GPU may involve the following operations: (1) the host CPU prepares data and places it into GPU-accessible memory; (2) the host CPU commands the GPU to execute a task; (3) the host CPU waits for the GPU to finish execution of the task; and (4) the host CPU copies data from the GPU-accessible memory to the host memory. In such a configuration, all data needed for the execution of a task on the GPU is transferred to the GPU-accessible memory prior to the start of the execution of the task, and the data produced by the task executing on the GPU is not available to the host CPU until after the task executing on the GPU completes execution. This coarseness in data sharing between a host CPU and a GPU may prevent effective implementations of many useful operations for parallel-based applications, such as, for example, passing inter-process messages between a process executing on the host device and a task executing on the GPU. Such messages may be useful, for example, to allow a task miming on the GPU to have the capability to execute a Remote Procedure Call (RPC) on the host CPU.

When the command queue interface is configured to provide out-of-order execution of commands, the host process is not able to control when, during the execution of a particular task, the execution of a particular command will take place. As such, the out-of-order execution mode for the command queue also does not effectively allow the implementation of inter-process message passing between a process executing on the host device and a task executing on the GPU.

With respect to the memory model used in OpenCL, the API defines so-called global CL buffers and global CL images that may be used for sharing data between a host CPU and a GPU or for sharing data between multiple OpenCL compute devices. However, the CPU and the GPU cannot read from or write to a buffer at the same time. Typically, a CPU prepares one or more buffers that contain source data and passes the buffers to the GPU for processing. The GPU either modifies these buffers or places results in other buffers that were also allocated by software executing on the CPU a priori for the purpose of receiving the GPU data modifications.

Although the memory objects in OpenCL currently allow a region of host memory space to be used to store the buffer data that is used by a computing device, the specification allows the computing devices to cache this data for more efficient execution of a task. The host device is generally not able to immediately invalidate the computing device cache that is used to cache the buffer data. Thus, even if the host device were to overwrite certain memory buffer data stored in host memory space, there is no guarantee that the cache in the computing device will be updated in order to provide the computing device immediate access to the modified data. In addition, because the results of the computations performed by the computing device may be stored in the computing device cache, the host process executing on the host device is not able to read any partial results from the buffer because such data may be invalid due to newer data stored in the computing device cache. Thus, the memory management model in OpenCL does not readily allow for in-flight data sharing via a shared memory.

The techniques described in this disclosure may be used, in some examples, to overcome one or more of the above-mentioned limitations of the OpenCL API. For example, the techniques of this disclosure may provide software interfaces that can be used to support inter-process message passing within a multiple-processor computing platform that initiates tasks using task-level granularity command queues. As another example, the techniques of this disclosure may provide software interfaces that can be used to support in-flight data sharing via a shared memory within a multiple-processor computing platform.

In some examples, the techniques of this disclosure may provide a GPU hardware architecture that facilitates software-level message passing. For example, the techniques of this disclosure may provide a GPU hardware architecture that is configured to support the execution of software-level message passing instructions. In further examples, the techniques of this disclosure may provide a GPU hardware architecture that facilitates shared memory communication between the GPU and a host CPU. For example, the techniques of this disclosure may provide a GPU hardware architecture that is configured to selectively enable and disable caching services for a shared memory space and/or to selectively enable and disable a cache-coherency mechanism for a shared memory space.

According to a first aspect of this disclosure, a message passing interface is provided that facilitates the execution of message passing instructions between a host device and one or more computing devices during the execution of a task by the computing device. Message passing may refer to a form of inter-process, and potentially inter-device, communication where the processes that are communicating each perform complementary sets of operations to successfully pass a message. For example, each of the processes that communicates according to a message passing protocol may implement a send operation and a receive operation. The message passing techniques in this disclosure may allow a CPU and a computing device, e.g., a GPU, to pass messages between each other during the execution of a task on the computing device. In this manner, a multiple-processor computing platform that implements a task-level granularity command queue communication scheme may be able to facilitate inter-process and/or inter-device communication.

In some examples, the message passing techniques described in this disclosure may be referred to as "out-of-band signaling" techniques because the techniques may use an interface other than command queue interface, which is typically used in OpenCL for communication between a host device and a computing device, such as, e.g., a GPU. In other words, the techniques of this disclosure may include a new out-of-band communication interface that is logically separate from the in-band command queue interface included within OpenCL. The out-of-band communication interface may not be subject to the same task-level granularity to which the command queue interface is subject, thereby providing a solution to one or more the limitations described above with respect to the task-level granularity of the command queue.

The messages transferred between the CPU and the GPU according to the techniques of this disclosure may be any type of message. Examples of different types of messages include signals, memory allocation requests, memory deallocation requests, notification messages, synchronization messages, remote procedure invocation messages (e.g., messages that are part of a Remote Procedure Call (RPC)), data packets, reporting messages, assertion mechanism messages, and logging messages.

In the current OpenCL paradigm, all requests from a host CPU to a GPU are queued up in OpenCL Command Queues and are then are sent to the GPU. In particular, an application might enqueue a large number of kernel executions and buffer operations in the command queue. Meanwhile, if the first enqueued task, e.g., a kernel execution, needs, for example, to request additional memory allocation from a CPU, multiple issues arise. First, how does the GPU notify the CPU from within a running kernel that it needs the memory allocation to occur? Second, how does the CPU notify the GPU about the completion of the memory allocation and of the address of the newly allocated memory block? The message passing interface techniques of this disclosure, however, may be able to resolve these issues by allowing one or more messages containing the above-described notifications and information to be passed between the CPU and the GPU.

The out-of-band signaling techniques of this disclosure may be used, in some examples, to implement signaling between a host CPU and one or more computing devices, e.g., OpenCL compute devices. The out-of-band signaling may provide fast out-of-band notifications, e.g., using a push or pull mechanism. In some examples, the out-of-band signaling techniques may carry relatively small amounts of data.

According to a second aspect of this disclosure, a GPU is provided that is capable of sending messages to and receiving messages from processes executing on processors other than the GPU. For example, a GPU may include hardware that is configured to implement one or more operations for sending and receiving messages. In some examples, a GPU designed in accordance with this disclosure may include one or more host-accessible registers configured to store status and data information associated with a message passing protocol. The one or more registers may be configured to facilitate message passing between a task executing on the GPU and a process executing on a device other than the GPU. In further examples, the ALU processing block of the GPU (e.g., a programmable shader unit) may be communicatively coupled to the host-accessible registers to send and receive messages via the host-accessible registers. The GPU may also be designed to include various polling and/or interrupt mechanisms to implement synchronous and/or asynchronous message passing techniques.

According to a third aspect of this disclosure, a memory buffer interface is provided that allows immediate memory objects to be created. The immediate memory objects may be used to implement a non-cacheable shared memory space and/or a cache-coherent shared memory space in order to share data between a process executing on a host device and a task executing on a computing device while the task is executing on the computing device. The shared memory space may be a memory space that is accessible by both the host device and a computing device, e.g., a GPU, during the execution of a task by the computing device. A non-cacheable shared memory space, as used herein, may refer to a shared memory space for which one or more corresponding caches in one or both of the host device and the computing device is disabled for the memory space. A cache-coherent shared memory space, as used herein, may refer to a shared memory space where shared memory cache coherency techniques are used to maintain cache coherency within one or more corresponding caches in one or both of the host device and the computing device. The non-cacheable shared memory space and the cache-coherent shared memory space may allow data sharing at any time. The immediate memory objects may, in some examples, be implemented as a non-cacheable volatile shared memory and/or as a cache-coherent volatile shared memory for the host device and the computing device.

In some examples, the immediate memory objects of this disclosure may be integrated within a cross-platform, cross-vendor, heterogeneous computing platform, parallel programming API that includes a memory object memory management scheme. For example, the immediate memory objects may be integrated into OpenCL as an additional attribute of the OpenCL memory objects, e.g., OpenCL buffer objects or the OpenCL image objects. In such examples, the immediate memory objects may be created by modifying the memory object creation functions to include a parameter or flag specifying whether the resulting memory object created by the function call should be a standard mode memory object or an immediate mode memory object. In this manner, the techniques of this disclosure may allow multi-processor computing systems that implement APIs which include memory object memory management schemes, such as OpenCL, to implement in-flight data sharing via a shared memory space that is not subject to cache coherency issues.

In further examples, the immediate memory objects of this disclosure may be used for in-flight data sharing between a host CPU and an OpenCL compute device or between different OpenCL compute devices. In additional examples, the immediate memory objects may contain internal synchronization markers. In further examples, the immediate memory objects may be used together with out-of-band signals for synchronization.

According to a fourth aspect of this disclosure, a GPU is provided that includes a cache corresponding to a shared memory space which may be selectively disabled for particular memory address spaces in order to provide a non-cacheable shared memory space. For example, the GPU may selectively enable and disable the caching services provided by a cache associated with a shared memory space in response to receiving information specifying whether caching services should be used for executing read operations and/or write operations with respect to the shared memory space. In some examples, the information specifying whether caching services should be used for executing read operations and/or write operations with respect to the shared memory space may be a cached mode instruction or an immediate mode instruction that specifies whether a cached mode or immediate mode should be used to execute the particular instruction. In further examples, the information specifying whether caching services should be used for executing read operations and/or write operations with respect to the shared memory space may be an immediate mode memory object attribute that specifies whether an immediate mode is enabled for the memory object.

In further examples, the techniques of this disclosure may provide a GPU that includes a cache coherency mode which may be selectively enabled to provide a cache-coherent shared memory space. In some examples, the GPU may selectively enable a cache coherency mode for a portion of the cache corresponding to the shared memory space based on one or more instructions received from a host device. The host device may issue one or more instructions to the GPU to selectively enable the shared memory space cache coherency mode for the portion of the cache corresponding to the shared memory space upon allocation of the shared memory space by the host device based on an immediate mode parameter specified by a host process.

The out-of-band signaling and immediate buffering techniques of this disclosure may provide a more fine grained task coupling between a host CPU and GPU or between two OpenCL compute devices compared to that which would otherwise be obtainable by using the OpenCL command queue interface alone. The techniques of this disclosure may allow a multiple-processor computing platform to perform a variety of operations in order to assist in efficient execution of parallel and/or multi-threaded programs. For example, the techniques of this disclosure may allow a task executing on a GPU to launch an RPC. As another example, the techniques of this disclosure may allow a task executing on the GPU to launch, via the CPU, another GPU task. As a further example, the techniques of this disclosure may allow a task executing on the GPU to issue resource management requests, such as, for example, memory allocation and/or memory deallocation requests to the CPU and/or driver executing on the CPU. As yet another example, the techniques of this disclosure may allow a task executing on the GPU to perform status checks and general message passing to a CPU, such as, for example, implementation of an assertion mechanism, progress reporting, and/or diagnostic logging.

FIG. 1 is a block diagram illustrating an example computing system 10 in accordance with this disclosure. Computing system 10 is configured to process one or more software applications on multiple processing devices. In some examples, the one or more software applications may include a host process, and computing system 10 may be configured to execute the host process and to distribute the execution of one or more tasks initiated by the host process on other computing devices within computing system 10. In further examples, the host process and/or the tasks executed by computing system 10 may be programmed according to a parallel programming model. For example, the applications may include instructions that are designed to leverage the task-level parallelism and/or data-level parallelism of underlying hardware systems.

Computing system 10 may be a personal computer, a desktop computer, a laptop computer, a computer workstation, a video game platform or console, a mobile telephone such as, e.g., a cellular or satellite telephone, a mobile telephone, a landline telephone, an Internet telephone, a handheld device such as a portable video game device or a personal digital assistant (PDA), a digital medial player such as a personal music player, a video player, a display device, or a television, a television set-top box, a server, an intermediate network device, a mainframe computer or any other type of device that processes information.

Computing system 10 includes a host device 12, a graphics processing unit (GPU) 14, a memory 16 and an interconnection network 18. Host device 12 is configured to provide a platform for the execution of a host process and a runtime module for a multiple-processor computing platform API. Typically, host device 12 is a general-purpose CPU, although host device 12 may be any type of device capable of executing programs. Host device 12 is communicatively coupled to GPU 14 and memory 16 via interconnection network 18. Host device 12 includes a host process 20 and a runtime module 22, each of which may execute on any combination of one or more programmable processors.

Host process 20 includes a set of instructions that form a software program for execution on the computing system platform of computing system 10. The software program may be designed to perform one or more specific tasks for an end-user. Such tasks may, in some examples, involve computationally intensive algorithms that can exploit the multiple processing devices and parallel architectures provided by computing system 10.

Runtime module 22 may be a software module executing on host device 12 that implements one or more interfaces configured to service one or more of the instructions contained in host process 20. The interfaces implemented by runtime module 22 include a command queue interface 24 and a host message passing interface 26. In some examples, runtime module 22 may implement one or more interfaces contained within a standard multiple-processor system API in addition to the interfaces described in this disclosure. In some examples, the standard API may be a heterogeneous computing platform API, a cross-platform API, a cross-vendor API, a parallel programming API, a task-level parallel programming API and/or a data-level parallel programming API. In further examples, the standard API may be the OpenCL API. In such examples, runtime module 22 may be designed to be in compliance with one or more of the OpenCL specifications. In additional examples, runtime module 22 may be implemented as part of or be a driver program, e.g., a GPU driver.

Command queue interface 24 is configured to receive one or more enqueue instructions from host process 20 and to execute the functions specified by the received instructions. In some examples, command queue interface 24 may be designed in accordance with the OpenCL specification. For example, command queue interface 24 may implement one or more of the enqueue instructions specified in the OpenCL specification for interacting with command queues.

According to this disclosure, host, message passing interface 26 is configured to receive one or more message passing instructions from host process 20 and to execute the functions specified by the received instructions. In some examples, host message passing interface 26 may be implemented as an extension to an existing standard API, such as, e.g., the OpenCL API. In additional examples, host message passing interface 26 may be integrated into an existing standard API, such as, e.g. the OpenCL API.

GPU 14 is configured to execute one or more tasks in response to instructions received from host device 12. GPU 14 may be any type of GPU that includes one or more programmable processing elements. For example, GPU 14 may include one or more programmable shader units that are configured to execute a plurality of execution instances for a task in parallel. The programmable shader units may include a vertex shader unit, a fragment shader unit, a geometry shader unit and/or a unified shader unit. GPU 14 is communicatively coupled to host device 12 and memory 16 via interconnection network 18, GPU 14 includes a task 28 and a device message passing interface 30. Task 28 and device message passing interface 30 may execute on any combination of one or more programmable processing elements.

Task 28 comprises a set of instructions that form a task for execution on a computing device in computing system 10. In some examples, the set of instructions for task 28 may be defined in host process 20 and, in some cases, compiled by instructions included in host process 20 executing on host device 12. In further examples, task 28 may be a kernel program that has multiple execution instances executing on GPU 14 in parallel. In such examples, host process 20 may define an index space for the kernel that maps kernel execution instances to respective processing elements for executing the kernel execution instances, and GPU 14 may execute the multiple kernel execution instances for task 28 in accordance with the index space defined for the kernel.

According to this disclosure, device message passing interface 30 is configured to receive one or more message passing instructions from host process 20 and to execute the functions specified by the received instructions. In some examples, device message passing interface 30 may be implemented as an extension to an existing standard API. For example, the standard API may be a standard computing device API, such as, e.g., the OpenCL C API. In additional examples, device message passing interface 30 may be integrated into an existing standard API, such as, e.g., the OpenCL C API.

Memory 16 is configured to store data for use by one or both of host device 12 and GPU 14. Memory 16 may include any combination of one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data storage media or an optical storage media. Memory 16 is communicatively coupled to host device 12 and GPU 14 via interconnection network 18. Memory 16 includes command queue 32.

Command queue 32 may be a data structure implemented in memory 16 that stores and retrieves commands received from command queue interface 24. In some examples, command queue 32 may be a buffer that stores commands in a particular order for execution.

Interconnection network 18 is configured to facilitate communication between host device 12, GPU 14 and memory 16. Interconnection network 18 may be any type of interconnection network known in the art. In the example computing system 10 of FIG. 1, interconnection network 18 is a bus. The bus may be include one or more of any of a variety of bus structures, such as, e.g., a third generation bus (e.g., a HyperTransport bus or an InfiniBand bus), a second generation bus (e.g., an Advanced Graphics Port bus, a Peripheral Component Interconnect Express (PCIe) bus, or an Advanced eXentisible Interface (AXI) bus) or any other type of bus. Interconnection network 18 is coupled to host device 12, GPU 14 and memory 16.

The structures and functionalities of the components in computing system 10 will now be described in further detail. As discussed above, host process 20 includes a set of instructions. The set of instructions may include, for example, one or more enqueue instructions, and one or more host message passing instructions. In additional examples, the set of instructions may include instructions that specify the tasks or kernels to be executed on GPU 14, instructions that create command queues and associate the command queues with particular devices, instructions that compile and bind programs, instructions that setup kernel parameters, instructions that define index spaces, instructions that define a device context and other instructions that support the functionality provided by host process 20.

Host process 20 may interact with command queue interface 24 by issuing one or more enqueue instructions to command queue interface 24 that instruct command queue interface 24 to place one or more commands into command queue 32. The one or more enqueue instructions may include memory transfer enqueue instructions that instruct command queue interface 24 to enqueue a memory transfer command into command queue 32. For example, the one or more enqueue instructions may include an instruction to enqueue a command instructing host device 12, e.g., runtime module 22 executing on host device 12, to transfer data between a memory space associated with host device 12 and a memory space associated with GPU 14.

A memory space may be associated with host device 12 if the memory space is accessible by host device 12 during the execution of host process 20 by host device 12. Similarly, a memory space may be associated with GPU 14 if the memory space is accessible by GPU 14 during the execution of task 28 by GPU 14. The memory space associated with host device 12 may be referred to herein as host memory space, and the memory space associated with GPU 14 may be referred to herein as device memory space. In some examples, memory 16 may include portions of both the host memory space and the device memory space. In further examples, portions of one or both of the host memory space and the device memory space may be located on one or more other memory devices not shown in computing system 10 of FIG. 1.

In some examples, the command instructing host device 12 to transfer data between a memory space associated with host device 12 and a memory space associated with GPU 14 may be a command instructing runtime module 22 to transfer the data stored in a portion of the host memory space to a buffer object allocated in device memory space. The instruction issued by host process 20 to enqueue such a command may be referred to herein as a write buffer enqueue instruction. In some cases, the write buffer enqueue instruction may take the form of the clEnqueueWriteBuffer( ) function specified by the OpenCL API specification.

In additional examples, the command instructing host device 12 to transfer data between a memory space associated with host device 12 and a memory space associated with GPU 14 may be a command instructing runtime module 22 to transfer the data stored in a buffer object allocated in device memory space to a portion of the host memory space. The instruction issued by host process 20 to enqueue such a command may be referred to herein as a read buffer enqueue instruction. In some cases, the read buffer enqueue instruction may take the form of the clEnqueueReadBuffer( ) function specified by the OpenCL API specification.

The one or more enqueue instructions may also include task execution enqueue instructions that instruct command queue interface 24 to enqueue a task execution command into command queue 32. For example, the one or more enqueue instructions may include an instruction to enqueue a command instructing host device 12, e.g., runtime module 22 executing on host device 12, to execute a task on GPU 14. In some examples, the command to execute the task may be a command to execute multiple execution instances of the task on a plurality of processing elements in GPU 14 in parallel. For example, the task may be kernel, and host process 20 may define an index space for the kernel that maps kernel execution instances to respective processing elements in GPU 14 for executing the kernel execution instances. In such an example, the command to execute a task may be a command to execute a kernel on GPU 14 according to an index space defined for GPU 14. In some cases, a task execution enqueue instruction may take the form of the clEnqueueNDRangeKernel( ) function specified by the OpenCL API.

According to this disclosure, host process 20 may also interact with host message passing interface 26 by issuing one or more host message passing instructions to host message passing interface 26 instructing host message passing interface 26 to pass one or more messages between host process 20 executing on host device 12 and task 28 executing on GPU 14. The host message passing instructions may be executed by host device 12.

The host message passing instructions may, in some examples, include a send instruction that instructs host device 12 to send specified data to a specified device. For example, the send instruction may instruct host message passing interface 26 to send a message from host process 20 executing on host device 12 to task 28 executing on GPU 14. In some examples, the send instruction may include a first input parameter specifying a particular device to which the message should be sent and a second input parameter specifying the content of the message to be sent.

The send instruction may be either a blocking send instruction or a non-blocking send instruction. The send instruction may include, in some examples, a third input parameter specifying whether the send instruction is a blocking send instruction or a non-blocking send instruction. A blocking send instruction may wait until the send operation is completed prior to returning to the calling process, e.g., host process 20 executing on host device 12. A non-blocking send instruction may return to the calling process without waiting until the send operation is completed. For example, the non-blocking send instruction may return a handle to the particular send operation that can subsequently be queried by the calling process to determine if the send operation was successful. A non-blocking send operation may fail, and in the event of failure, the calling process may need to issue the send instruction again to retry the send operation.

In some examples, the interface for the send instruction may take the following form:

```
clSendOutOfBandData(
    cl_device *deviceId,
    int OOB_data,
    bool blocking)
``` where clSendOutOfBandData is the instruction identifier, cl_device *deviceId is an input parameter specifying a particular OpenCL device to which the message should be sent, int OOB_data is an input parameter specifying the content of the message to be sent, and bool blocking is an input parameter specifying whether the instruction is a blocking send instruction or a non-blocking send instruction. In the case of a blocking instruction, the instruction may return a parameter indicative of whether the send operation was successfully completed. In the case of a non-blocking instruction, the instruction may return a handle parameter for subsequent status querying by the calling process.

The host message passing instructions may, in some examples, include a register callback routine instruction that instructs host device 12 to register a callback to receive data from a specified device in an asynchronous way. For example, the register callback routine instruction may instruct host message passing interface 26 to invoke a callback routine in response to receiving a signal from GPU 14 indicating that the task executing on GPU 14 has sent a message to host process 20. The register callback routine instruction may include a first input parameter specifying a particular device for which a callback routine should be registered and a second input parameter specifying the memory location of the callback routine.

In some examples, the interface for the register callback routine instruction may take the following form:

```
clRegisterOutOfBandDataCallback(
    cl_device *deviceId,
    void(*) (int) callBackPtr)
``` where clRegisterOutOfBandDataCallback is the instruction identifier, cl_device *deviceId is an input parameter specifying a particular OpenCL device to which the message should be sent, and void(*) (int) callBackPtr is an input parameter specifying the memory location of the callback routine. The register callback routine instruction may return a parameter indicative of whether the callback routine registration operation was successfully completed.

The host message passing instructions may, in some examples, include a polling instruction that instructs host device 12 to attempt to read data from a specified device. For example, the polling instruction may instinct host message passing interface 26 to poll GPU 14 for message status information indicative of whether task 28 executing on GPU 14 has sent a message. The polling instruction may include an input parameter specifying a particular device to be polled, and an output parameter specifying the data obtained, if any, as a result of the polling.

In some examples, the interface for the polling instruction may take the following form:

```
clTryReadOutOfBandData(
    cl_device *deviceId,
    int *OOB_data)
``` where clTryReadOutOfBandData is the instruction identifier, cl_device *deviceId is an input parameter specifying a particular OpenCL device to be polled, and int *OOB_data is an output parameter specifying the data obtained, if any, as a result of the polling. The polling instruction may return a parameter indicative of whether data was successfully obtained from the polling operation.

Similar to host process 20, task 28 may include one or more device message passing instructions that are executed by a computing device. The device message passing instructions may include a send instruction that instructs a computing device to send specified data to host device 12. For example, the send instruction may instruct GPU 14 to send a message from task 28 executing on GPU 14 to host process 20 executing on host device 12.

The send instruction may be either a blocking send instruction or a non-blocking send instruction. The send instruction may include, in some examples, a first input parameter specifying whether the send instruction is a blocking send instruction or a non-blocking send instruction. A blocking send instruction may stall the calling process, e.g., task 28 executing on GPU 14, and wait for the send operation to be completed prior to returning to the calling process. A non-blocking send instruction may return to the calling process without waiting until the send operation is completed. For example, the non-blocking send instruction may return a handle to the particular send operation that can subsequently be queried by the calling process to determine if the send operation was successful. A non-blocking send operation may fail, and in the event of failure, the calling process may need to issue the send instruction again to retry the send operation. The send instruction may include a second input parameter specifying the content of the message to be sent to the host device.

In some examples, the interface for the send instruction may take the following form:

```
send_oobdata (
    bool blocking,
    int data)
``` where send_oobdata is the instruction identifier, bool blocking is an input parameter specifying whether the instruction is a blocking send instruction or a non-blocking send instruction, and int data is an input parameter specifying the content of the message to be sent. In the case of a blocking instruction, the instruction may return a parameter indicative of whether the send operation was successfully completed. In the case of a non-blocking instruction, the instruction may return a handle parameter for subsequent status querying by the calling process.

The device message passing instructions may, in some examples, include a receive instruction that instructs a computing device to receive data from host device 12. For example, the receive instruction may instruct GPU 14, e.g., device message passing interface 30, to provide to task 28 executing on GPU 14 a message sent to task 28 from host process 20 executing on host device 12 if available. Such an instruction may be used to support a polling mechanism.

The receive instruction may be either a blocking receive instruction or a non-blocking receive instruction. The receive instruction may include, in some examples, an input parameter specifying whether the receive instruction is a blocking receive instruction or a non-blocking receive instruction. A blocking receive instruction may stall the calling process, e.g., task 28 executing on GPU 14, and wait until a message is available prior to returning to the calling process. A non-blocking receive instruction may return to the calling process without waiting until a message is available. For example, if a message is available, the non-blocking receive instruction may return the message. However, if a message is not available, the non-blocking receive instruction may fail. In the event of failure, the calling process may need to issue the receive instruction again to retry the receive operation. The receive instruction may include an output parameter specifying the data obtained, if any, as a result of the receive operation.

In some examples, the interface for the receive instruction may take the following form:

```
receive_oobdata(
    bool blocking,
    int data)
``` where receive_oobdata is the instruction identifier, bool blocking is an Input parameter specifying whether the instruction is a blocking receive instruction or a non-blocking receive instruction, and int data is an output parameter specifying the data obtained, if any, as a result of the receive operation. The instruction may return a parameter indicative of whether the receive operation was successfully completed.

Command queue interface 24 is configured to enqueue commands into command queue 32. For example, command queue interface 24 may receive one or more enqueue instructions from host process 20, and place one or more commands into command queue 32 in response to receiving the one or more enqueue instructions from host process 20. The one or more enqueue instructions may include task execution enqueue instructions and data transfer enqueue instructions that instruct command queue interface 24 to enqueue, respectively, task execution commands and data transfer commands.

Command queue interface 24 is also configured to execute the commands stored in command queue 32. For data transfer commands, command queue interface 24 may transfer data between host memory space and device memory space. For example, for a write buffer command, command queue interface 24 may transfer the data stored in a portion of the host memory space to a buffer object allocated in device memory space. As another example, for a read buffer command, command queue interface 24 may transfer the data stored in a buffer object allocated in device memory space to a portion of the host memory space. The device memory space may correspond to a device to which command queue 32 is associated.

For task execution commands, command queue interface 24 may cause the execution of the task to begin on a device associated with a command queue. For example, in the example of FIG. 1, command queue 32 is associated with GPU 14 within the context of runtime module 22. Therefore, when executing a task execution command, command queue interface 24 may cause a task to begin executing on GPU 14. In some examples, command queue interface 24 may cause the task to begin executing on GPU 14 by placing one or more commands into a local command queue contained within GPU 14. In other examples, command queue interface 24 may cause the task to begin executing on GPU 14 by sending one or more instructions to GPU 14 instructing GPU 14 to begin execution of the task. Command queue interface 24 may use interconnection network 18 to communicate with GPU 14, memory 16 and the host and device memory spaces.

In some examples, command queue interface 24 may execute the commands in-order. In such examples, if a first command is enqueued prior to a second command, execution of the second command begins after the first command has completed execution. In further examples, command queue interface 24 may execute the commands out-of-order. In such examples, if a first command is enqueued prior to a second command, execution of the second command does not necessarily begin after the first command has completed execution.

Host message passing interface 26 is configured to execute one or more message passing instructions received from host process 20. For example, in response to receiving one or more message passing instructions from host process 20, host, message passing interface 26 may pass one or more messages between host process 20 executing on host device 12 and task 28 executing on GPU 14 while task 28 is executing on GPU 14. In some examples, host message passing interface 26 may execute the one or more message passing instructions without placing any commands into command queue 32.

According to a first example, in response to receiving a send instruction from host process 20, host message passing interface 26 may send a message from host process 20 to task 28 while task 28 is executing on GPU 14. For example, host message passing interface 26 may compose an outgoing message based on message data contained within the send instruction, and transfer the outgoing message, via interconnection network 18, to a device specified in the send instruction, e.g., GPU 14, for delivery to a task executing on the specified device, e.g., task 28.

According to a second example, in response to receiving a register callback routine instruction from host process 20, host message passing interface 26 may associate me callback routine specified in the instruction with a signal from the device specified in the instruction, e.g., GPU 14, indicating that the task, e.g., task 28, executing on the specified device has sent a message. In some examples, the signal from the device may be an interrupt signal. The interrupt signal, in some examples, may be delivered via a dedicated interrupt signal line. In response to receiving the signal from the specified device indicating that task executing on the device has sent a message, host message passing interface 26 may initiate execution of the callback routine specified in the register callback routine instruction. The callback routine may obtain the message sent by the task, e.g., task 28, from the specified device, e.g., GPU 14, and return the message to host process 20 for further processing.

According to a third example, in response to receiving a polling instruction, host message passing interface 26 may poll the device specified in the instruction, e.g., GPU 14 for message status information. Host message passing interface 26 may use interconnection network 18 or another hardware based communication pathway to poll the device. If the message status information indicates that a task, e.g., task 28, executing on the specified device, e.g., GPU 14, has sent the message, host message passing interface 26 may obtain the message from the specified device, and return the message to host process 20 for further processing.

Device message passing interface 30 is configured to execute one or more device message passing instructions received from task 28. For example, in response to receiving one or more device message passing instructions from task 28, device message passing interface 30 may pass one or more messages between task 28 executing on GPU 14 and host process 20 executing on host device 12 while task 28 is executing on GPU 14.

According to a first example, in response to receiving a send instruction, device message passing interface 30 may send a message from task 28 executing on GPU 14 to host process 20 executing on host device 12. For example, device message passing interface 30 may compose an outgoing message based on message data contained within the send instruction, and transfer the outgoing message, via interconnection network 18, to host device 12 for delivery to host process 20.

According to a second example, in response to receiving a receive instruction from task 28, device message passing interface 30 may determine if a message from host process 20 is available. In some examples, device message passing interface 30 may check one or more host-accessible registers to determine if a message is available. If a message from host process 20 is available, device message passing interface 30 may provide the message to task 28.

Although command queue interface 24 and host message passing interface 26 are illustrated as components that are separate form host process 20 in FIG. 1, in some examples, the functionality of one or both of command queue interface 24 and host message passing interface 26 may be partially and/or completely compiled into host process 20. Similarly, in some examples, the functionality of device message passing interface 30 may be partially and/or completely compiled into task 28.

For ease of illustration, the example computing system 10 illustrated in FIG. 1 describes the message passing techniques of this disclosure using GPU 14 as a computing device. It should be recognized, however, that the techniques of this disclosure may be applied to multiple-processor computing systems that have computing devices other than a GPU in addition to or in lieu of GPU 14. In some examples, the computing devices may be OpenCL compute devices. An OpenCL compute device includes one or more compute units. Each of the compute units includes one or more processing elements. For example, a compute unit may be a cluster of processing elements, e.g., ALUs, that has an on-chip shared memory that can be used by ail of the processing elements in the compute unit. A work item may be one of a plurality of parallel executions of a kernel or task invoked on an OpenCL compute device by a command placed into a command queue. Each work item, may execute on an individual processing element in a compute unit in parallel with other work items executing on other processing elements. A work group may be a collection of one or more work-items that is processed on a single compute unit within the compute device as part of a single kernel execution command. An OpenCL host may be a central CPU of the platform that is used to run the OpenCL run-time layer.

The OpenCL API may provide a common set of interfaces for interaction between the host, device and different types of compute devices. For example, the OpenCL API may provide a common interface for interaction between a host and a GPU compute device and the host and a non-GPU compute device. The OpenCL API allows the host to use a common interface for executing tasks (e.g., OpenCL kernels) on the various compute devices. In some examples, the tasks may be general-purpose computing tasks, and the OpenCL API may allow the host to cause the general-purpose computing task to execute on a GPU compute device.

The example computing system 10 shown in FIG. 1 illustrates an infrastructure and techniques for facilitating message passing and/or out-of-band signaling between a host device and a computing device. In other example computing systems, however, the techniques may be readily extended to provide in-flight message passing between different computing devices (e.g., OpenCL compute devices) in a computing system having more than one computing device. In such examples, one or more interrupt lines may be wired between different computing devices.

Figure 2:
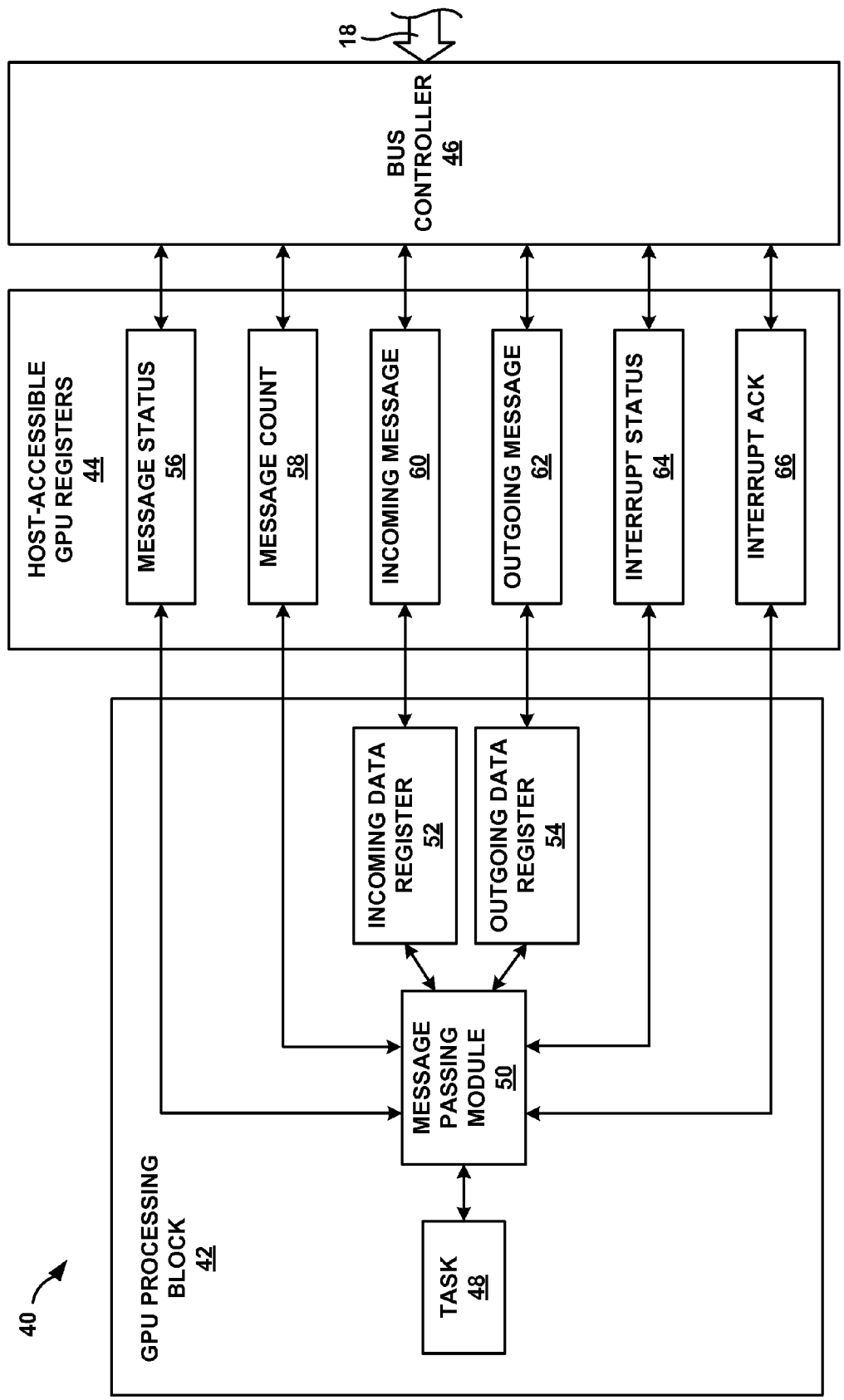
FIG. 2 is a block diagram illustrating an example GPU that may be used in the computing system of FIG. 1 in accordance with this disclosure.

FIG. 2 is a block diagram illustrating an example GPU 40 that may be used in computing system 10 of FIG. 1 in accordance with this disclosure. In some examples, GPU 40 may be used to implement GPU 14 illustrated in FIG. 1. GPU 40 includes a GPU processing block 42, host-accessible GPU registers 44 and a bus controller 46. GPU 40 may be communicatively to one or more other host devices or computing devices via interconnection network 18.

GPU processing block 42 is configured to execute tasks and to facilitate message passing between tasks executing on GPU processing block 42 and processes executing on other host or computing devices. GPU processing block 42 is communicatively coupled to host-accessible GPU registers 44, e.g., via one or more control and/or data lines. In some examples, GPU processing block 42 may be referred to as an arithmetic logic unit (ALU) block. GPU processing block 42 includes a task 48, a message passing module 50, an incoming data register 52 and an outgoing data register 54.

Host-accessible GPU registers 44 is configured to store data that may be communicated to or from a host device. Host-accessible GPU registers 44 includes a message status register 56, a message count register 58, an incoming message register 60, an outgoing message register 62, an interrupt status register 64 and an interrupt acknowledgement register 66. Each of host-accessible GPU registers 44 may be accessible by a host device, e.g., host device 12 in FIG. 1. In some examples, host-accessible GPU registers 44 may be memory-mapped registers, i.e., registers that are mapped to and addressable in the memory space of a host device. In further examples, host-accessible GPU registers 44 may be input/output-mapped (I/O-mapped) registers, i.e., registers mapped to the I/O space of a host device. Host-accessible GPU registers 44 are communicatively coupled to GPU processing block 42 via one or more control and/or data lines. Host-accessible GPU registers 44 are also communicatively coupled to bus controller 46 via interconnection network 18.

Task 48 may execute on one or more programmable processors. In some examples, GPU processing block 42 may include multiple processors or processing elements configured to execute multiple execution instances of task 48. Task 48 may be substantially similar to task 28 described above with respect to FIG. 1, and therefore will not be described in further detail.

Message passing module 50 is configured to control the message passing operations performed by GPU 40. Message passing module 50 may be implemented in hardware, software, firmware or any combination thereof. In some examples, if part or all of the functionality of message passing module 50 is implemented in software, the software instructions for such an implementation may be included within the same executable file as the executable file that contains software instructions for task 48. Message passing module 50 is communicatively coupled to task 48, message passing module 50, incoming data register 52 and outgoing data register 54.

Message passing module 50 may pass one or more messages, via host-accessible GPU registers 44, between task 48 executing on one or more processors and a process executing on a host device while task 48 is executing on the one or more processors and in response to receiving one or more message passing instructions from task 48. In some examples, the one or more message passing instructions may include a send instruction that instructs message passing module 50 to send a message from task 48 to a process executing on a host device. In such examples, message passing module 50 may store message data associated with the message in one of host-accessible GPU registers 44. In further examples, the one or more message passing instructions may include a receive instruction that instructs message passing module 50 to provide to task 48 a message sent to task 48 from a process executing on a host device if available. In such examples, message passing module 50 may obtain message data associated with the message from one or more of host-accessible GPU registers 44.

Incoming data register 52, in the example of FIG. 2, is a hardware register that stores incoming data received from an external device via incoming message register 60. Incoming data register 52 may also store a status bit indicating whether the data in incoming data register 52 has been consumed and/or whether the data in incoming data register 52 is available for reading. Incoming data register 52 is communicatively coupled to incoming message register 60 via one or more data lines. In some examples, the number of data lines may be equal to the number of bits in incoming data register 52, both of which may be equal to the number of bits in the message. In further examples, the number of bits may be 32-bits. In some examples, GPU processing block 42 may implement an internal First In, First Out (FIFO) buffer to store a plurality of incoming messages received from incoming data register 52.

Outgoing data register 54, in the example of FIG. 2, is a hardware register that stores outgoing data received from one or more message passing instructions issued by task 48. Outgoing data register 54 is communicatively coupled to outgoing message register 62 via one or more data lines. In some examples, the number of data lines may be equal to the number of bits in outgoing data register 54, both of which may be equal to the number of bits in the message. In some examples, outgoing data register 54 and outgoing message register 62 may be configured such that, when message passing module 50 writes data to outgoing data register 54, outgoing message register 62 is automatically updated with the data written to outgoing data register 54. In some examples, GPU processing block 42 may implement an internal First In, First Out (FIFO) buffer to store a plurality of outgoing messages to be written to outgoing data register 54.

Message status register 56, in the example of FIG. 2, is configured to store data indicative of whether an incoming message was accepted by GPU 40. Message status register 56 may be used by a host device to determine whether a message was successfully transmitted and, in some examples, to implement a back-off and/or overflow mechanism. After accepting an incoming message, message passing module 50 may set message status register 56 to a particular value indicating that the incoming message was accepted.

Message count register 58, in the example of FIG. 2, is configured to store data indicative of whether incoming message register 60 contains an incoming message. In some examples, message count register 58 may send a signal to message passing module 50 to indicate message arrival when message count register 58 has been incremented by a host device. In some cases, the signal may be a 1-bit pulse fine. In further examples, message passing module 50 may decrement message count register 58 after reading the message from incoming data register 52.

Incoming message register 60, in the example of FIG. 2, is configured to store incoming message data. For example, a host device may place incoming message data into incoming message register 60 in order to send a message to task 48. Incoming message register 60 is communicatively coupled to incoming data register 52.

Outgoing message register 62, in the example of FIG. 2, is configured to store outgoing message data received from outgoing data register 54. Outgoing message register 62 may automatically update the data in outgoing message register 62 to correspond to outgoing data register 54 when new data is written to outgoing data register 54. In some examples, message passing module 50 may generate an interrupt signal in response to an outgoing message being written to outgoing message register 62. The interrupt signal may be sent to a host device and indicate that message passing module 50 has sent a message.

Interrupt status register 64, in the example of FIG. 2, is configured to store a status bit indicative of whether an outgoing message has been written to outgoing message register 62. For example, interrupt status register 64 and outgoing message register 62 may be configured such that a status bit in interrupt status register 64 is set when an outgoing message is written to outgoing message register 62. The status bit may allow a process executing on a host device to poll GPU 40 to see if a message is available.

Interrupt acknowledgement register 66, in the example of FIG. 2, is configured to store an acknowledgement bit indicative of whether the host device has read the outgoing message stored in outgoing message register 62. For example, outgoing message register 62 and interrupt acknowledgement register 66 may be configured such that, when an outgoing message is written to outgoing message register 62, the acknowledgement bit in interrupt acknowledgement register 66 is set. In such an example, after a host device reads outgoing message register 62, the host device may clear the acknowledgement bit thereby indicating that the host device has read the outgoing message and a new outgoing message can be written to outgoing message register 62. The acknowledgment bit may be used to implement a flow control scheme for outgoing message data.

Bus controller 46, in the example of FIG. 2, is configured to allow external devices access to host-accessible GPU registers 44 via interconnection network 18. For example, bus controller 46 may multiplex and demultiplex bus signals and perform various receive and transmit operations specified by the bus signals. Bus controller 46 may operate according to one or more public or proprietary bus standards.

Various techniques for message passing in multiple-processor computing systems will now be described according to certain aspects of this disclosure. In some examples, computing system 10 of FIG. 1 may be used to implement the example techniques shown in FIGS. 3-19. For ease of explanation, the techniques may be described with respect to components of example computing system 10 shown in FIG. 1, but it should be understood that the techniques may be performed on other systems with the same or different components in the same or a different configuration. In additional examples, some of the techniques shown in FIGS. 3-19 may be described with respect to specific components of GPU 40 of FIG. 2. Again, it should be understood that FIG. 2 is just one example of a GPU that may be able to implement the techniques of this disclosure, and that such techniques may performed by other GPUs with the same or different components in the same or a different configuration.

Figure 3:
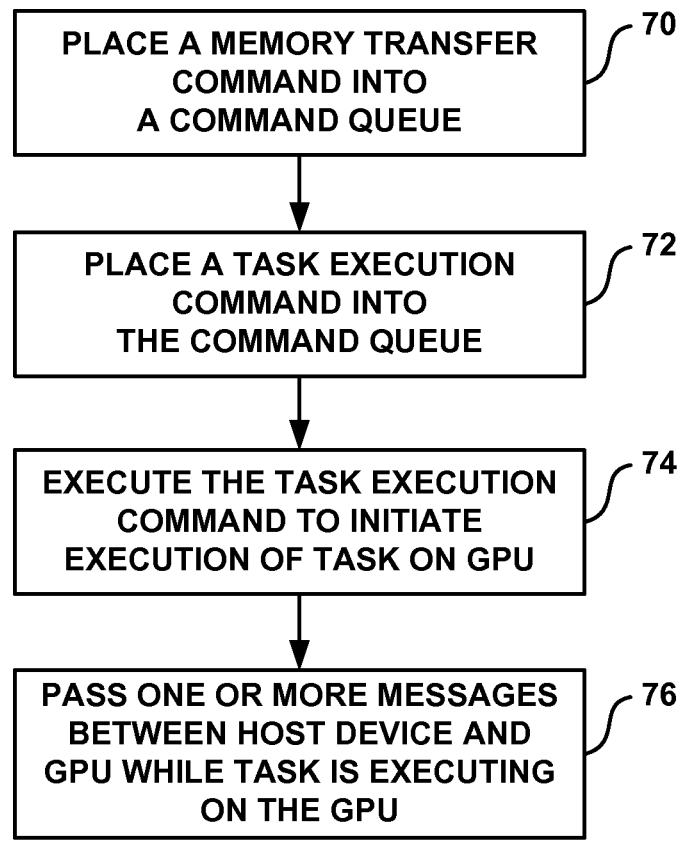
FIG. 3 is a flow diagram illustrating an example technique for message passing in a multiple-processor platform environment in accordance with this disclosure.

FIG. 3 illustrates an example technique for message passing in a multiple-processor platform environment in accordance with this disclosure. In some examples, computing system 10 of FIG. 1 may be used to implement the example technique shown in FIG. 3. Command queue interface 24 places a memory transfer command into command queue 32 (70). Command queue interface 24 places a task execution command into command queue 32 (72). Command queue interface 24 executes the task execution command to initiate execution of the task on GPU 14 (74).

Host message passing interface 26 passes one or more messages between host device 12 and GPU 14 while task 28 is executing on GPU 14 (76). For example, host message passing interface 26 may pass a message to GPU 14 that originates from one or more send instructions issued by host process 20, The one or more send instructions may specify that GPU 14 or a task executing on GPU 14 is the destination for the message.

Figure 4:
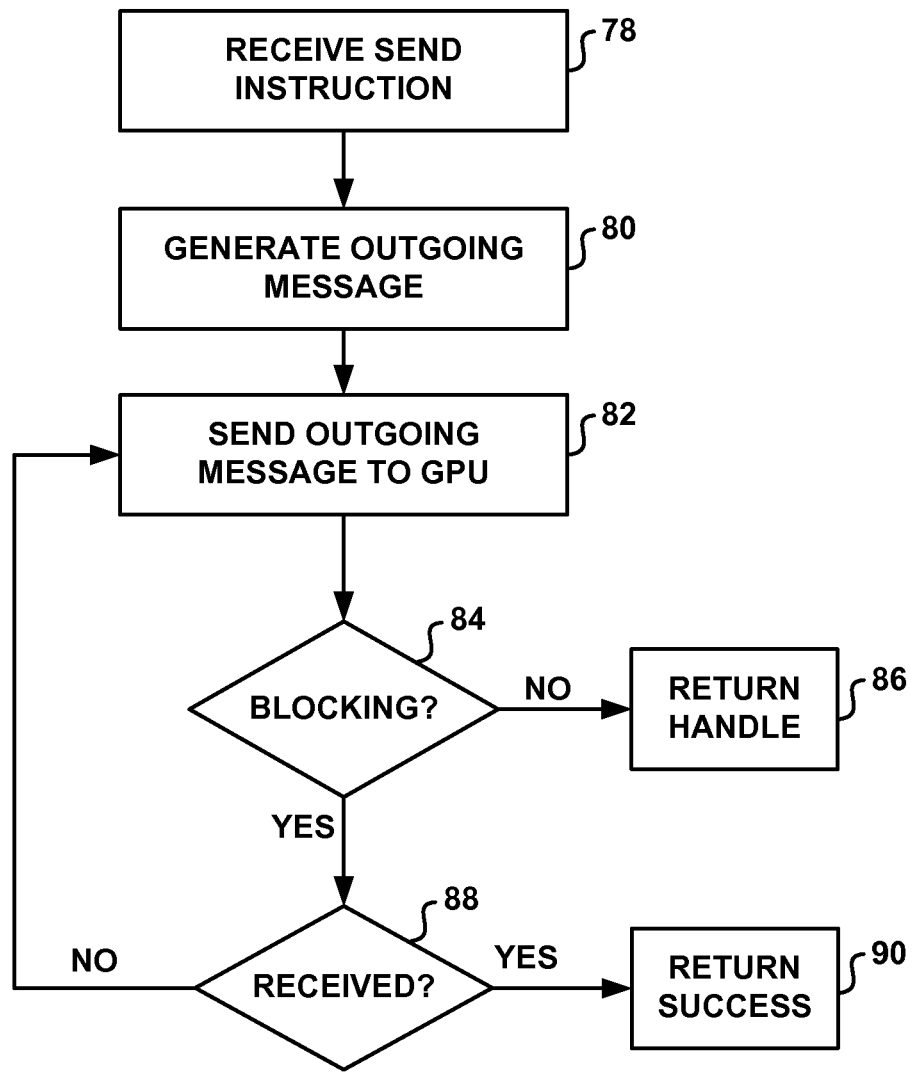
FIG. 4 is a flow diagram illustrating an example technique for executing a send instruction issued by a process executing on a host device in accordance with this disclosure.

FIG. 4 an example technique for executing a send instruction issued by a process executing on a host device in accordance with this disclosure. In some examples, computing system 10 of FIG. 1 may be used to implement the example technique shown in FIG. 4. Host message passing interface 26 receives a send instruction from host process 20 (78). Host message passing interface 26 generates an outgoing message based on message data contained with the send instruction (80). In some examples, the outgoing message may be identical to the message data contained in the send instruction. In additional examples, host message passing interface 26 may append one or more pieces of header information and/or routing information to the message data contained in the send instruction to generate the outgoing message. In further examples, host message passing interface 26 may perform one or more coding or transformation operations on the message data contained in the send instruction to generate the outgoing message. Host message passing interface 26 may send the outgoing message to GPU 14 (82).

Host message passing interface 26 may determine whether the send instruction is a blocking instruction or a non-blocking instruction (84). In some examples, host message passing interface 26 may make the determination of whether the send instruction is a blocking or non-blocking instruction based on an input parameter specified in the send instruction. In other examples, two different types of send instructions may be used, and host message passing interface 26 may make the determination of whether the send instruction is a blocking or non-blocking instruction based on the type of instruction, e.g., the operation code (opcode) of the instruction. If host message passing interface 26 determines that the send instruction is a non-blocking instruction, host message passing interface 26 may return a handle to the calling process (86). The handle may allow the calling process to query the handle to determine if the message has been successfully sent at a later time. If the subsequent query indicates that the send failed, the calling process may need to issue a subsequent send instruction to retry the send operation. In some examples, the calling process may implement a back-off routine or overflow mechanism in response to a failed send operation.

If host message passing interface 26 determines that the send instruction is a blocking instruction, host message passing interface 26 may determine whether the outgoing message was successfully received by GPU 14 (88). If host message passing interface 26 determines that the outgoing message was successfully received, host message passing interface 26 may return a value to the calling process indicating that the message contained in the send instruction was successfully sent (90). Otherwise, if host message passing interface 26 determines that the outgoing message was not successfully received, host message passing interface 26 may proceed to process block 82 and resend the outgoing message to GPU 14. The blocking instruction may complete, in some examples, when host message passing interface 26 determines the message was successfully received or a threshold number of unsuccessful delivery attempts has been reached.

Figure 5:
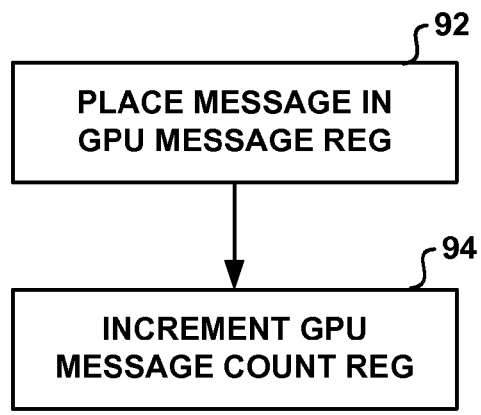
FIGS. 5 and 6 are flow diagrams illustrating example techniques that may be used to implement portions of the technique illustrated in FIG. 4 in accordance with this disclosure.

FIG. 5 is a flow diagram illustrating an example technique that may be used to implement process block 82 in FIG. 4 in accordance with this disclosure. In some examples, computing system 10 of FIG. 1 and/or GPU 40 of FIG. 2 may be used to implement the example technique shown in FIG. 5. Host message passing interface 26 may place or store the outgoing message in incoming message register 60 of GPU 40 (92). Host message passing interface 26 may increment message count register 58 of GPU 40 to indicate to message passing module 50 in GPU 14 that a new message has arrived (94). In some examples, host message passing interface 26 may use memory-mapped register hardware and/or I/O-mapped register hardware known in the art to perform one or more of process blocks 92 and 94.

Figure 6:
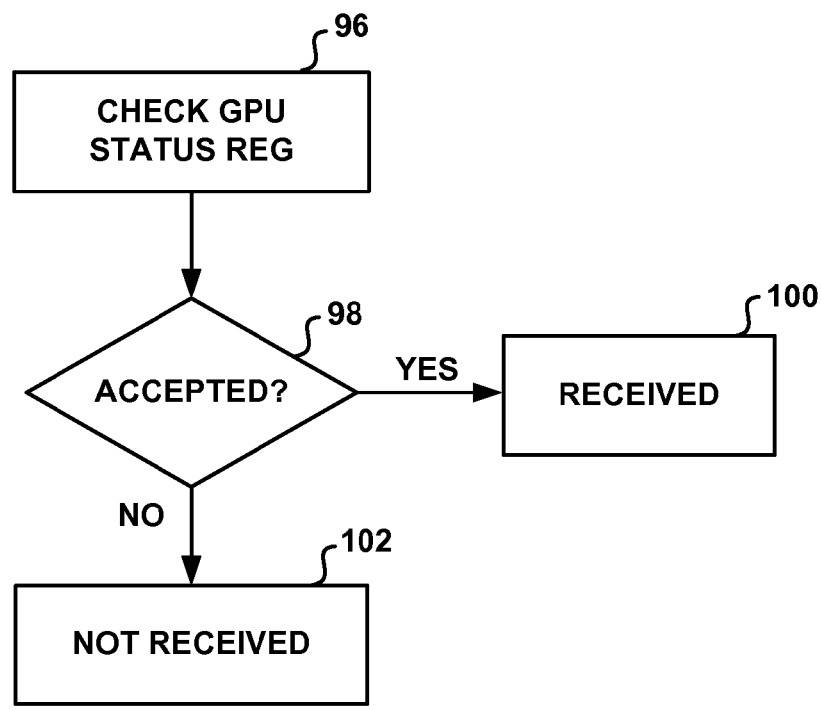

FIG. 6 is a flow diagram illustrating an example technique that may be used to implement decision block 88 in FIG. 4 in accordance with this disclosure. In some examples, computing system 10 of FIG. 1 and/or GPU 40 of FIG. 2 may be used to implement the example technique shown in FIG. 6. Host message passing interface 26 may check a status bit in message status register 56 of GPU 40 (96). Host message passing interface 26 may determine if the sent message was accepted by GPU 14 based on the status bit in message status register 56 (98). If the status bit indicates that the sent message was accepted by GPU 14, host message passing interface 26 may determine that the outgoing message was successfully received (100). On the other hand, if the status bit indicates that the sent message was not accepted by GPU 14, host message passing interface 26 may determine that the outgoing message was not successfully received (102).

Figure 7:
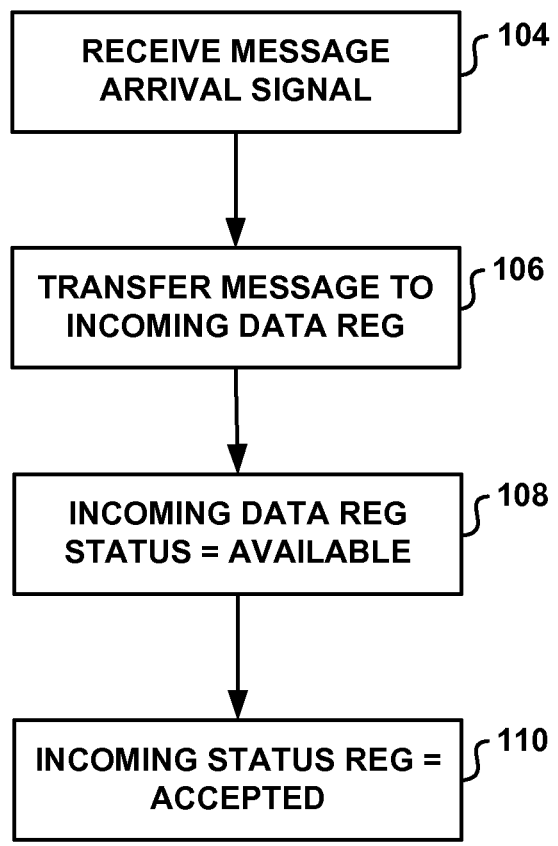
FIG. 7 is a flow diagram illustrating an example technique for processing a received message in a computing device, e.g., a GPU, in accordance with this disclosure.

FIG. 7 is a flow diagram illustrating an example technique for processing a received message in a computing device, such as, e.g., a GPU. In some examples, GPU 40 of FIG. 2 may be used to implement the example technique shown in FIG. 7. Message passing module 50 in GPU 40 receives a message arrival signal (104). For example, message count register 58 may be configured such that whenever a host device increments message count register 58, a message arrival pulse is sent to message passing module 50. Message passing module 50 may cause the data stored in incoming message register 60 to be transferred to incoming data register 52 (106). For example, message passing module 50 may issue a control signal to incoming data register 52 causing incoming data register 52 to overwrite the current data stored in incoming data register 52 with the data stored in incoming message register 60. Message passing module 50 may set the status bit in incoming data register 52 to indicate that data is available in incoming data register 52, e.g., not consumed (108). Message passing module 50 may set a status bit in message status register 56 to indicate that the incoming message has been accepted by GPU 40 (110).

Figure 8:
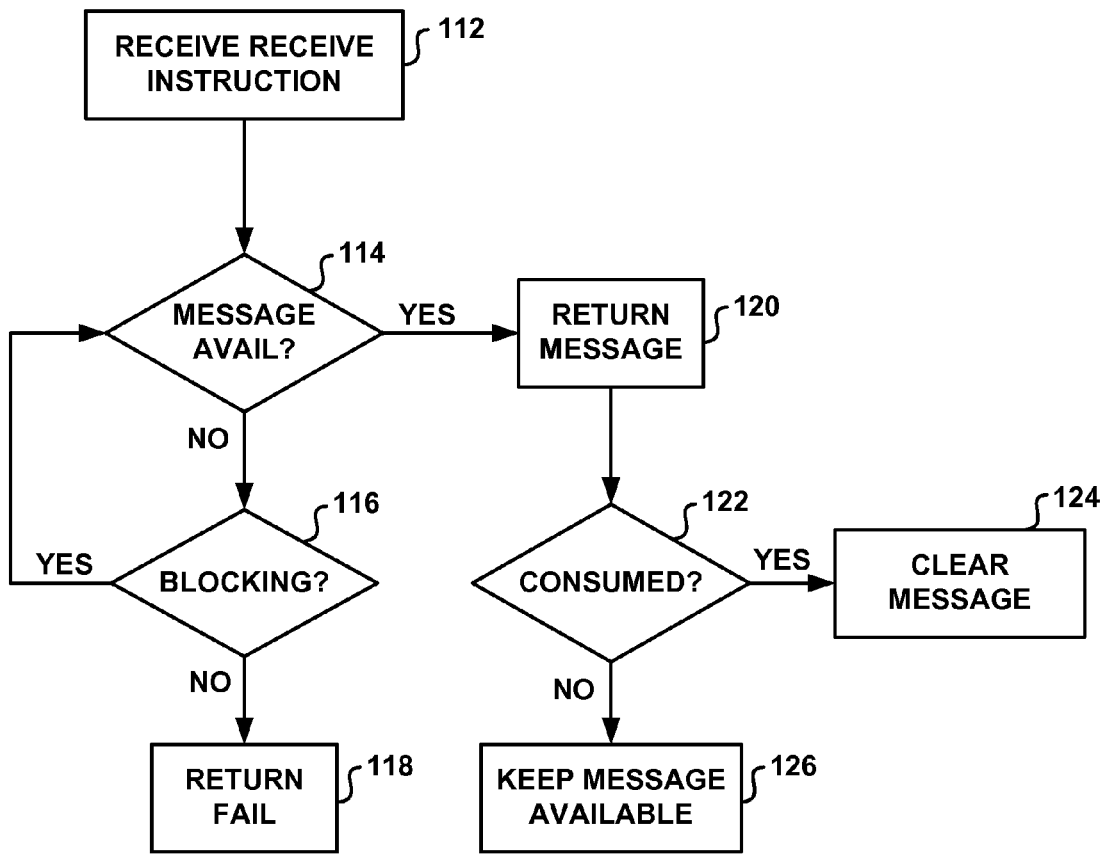
FIG. 8 is a flow diagram illustrating an example technique for executing a receive instruction issued by a task executing on a computing device, e.g., a GPU, in accordance with this disclosure.

FIG. 8 is a flow diagram illustrating an example technique for executing a receive instruction issued by a task executing on a computing device in accordance with this disclosure. In some examples, computing system 10 of FIG. 1 may be used to implement the example technique shown in FIG. 8. Device message passing interface 30 receives a receive instruction from task 28 (112). Device message passing interface 30 determines if a message is available from a host device (114).

If message passing module 50 determines that the message is not available, message passing module 50 may determine whether the receive instruction is a blocking receive instruction or a non-blocking receive instruction (116). In some examples, message passing module 50 may make the determination of whether the receive instruction is a blocking or non-blocking instruction based on an input parameter specified in the receive instruction. In other examples, two different types of receive instructions may be used, and message passing module 50 may make the determination of whether the receive instruction is a blocking or non-blocking instruction based on the type of instruction, e.g., the operation code (opcode) of the instruction. If message passing module 50 determines that the receive instruction is a blocking instruction, message passing module 50 may return to decision block 114 to determine if an incoming message is available. Otherwise, if message passing module 50 determines that the instruction is a non-blocking instruction, message passing module 50 may return a value to the calling process indicating that the receive instruction failed (118).

If message passing module 50 determines that a message is available from the host device, message passing module 50 may return the message data to the calling process (120). Message passing module 50 determines whether the message data should be marked as consumed (122). Message passing module 50 may determine whether the data should be marked as consumed based on one or more consumption modes. In some examples, the consumption mode may be hardwired into GPU 14. In additional examples, the consumption mode may be programmable by either task 28 and/or host process 20. For example, a send and/or receive instruction in either task 28 or host process 20 may contain a parameter specifying a particular consumption mode. For example, one consumption mode may specify that the message data should be marked as consumed when at least one execution instance of the task has read the data. As another example, one consumption mode may specify that the message data should be marked as consumed when at least a threshold number of execution instances of the task have read the data.

If message passing module 50 determines that the message data should be marked as consumed, message passing module 50 may clear the message data (124). For example, message passing module 50 may clear a status bit in incoming data register 52. On the other hand, if message passing module 50 determines that the message data should not be marked as consumed, message passing module 50 may keep the message data (126). For example, message passing module 50 may not clear the status bit in incoming data register 52.

Figure 9:
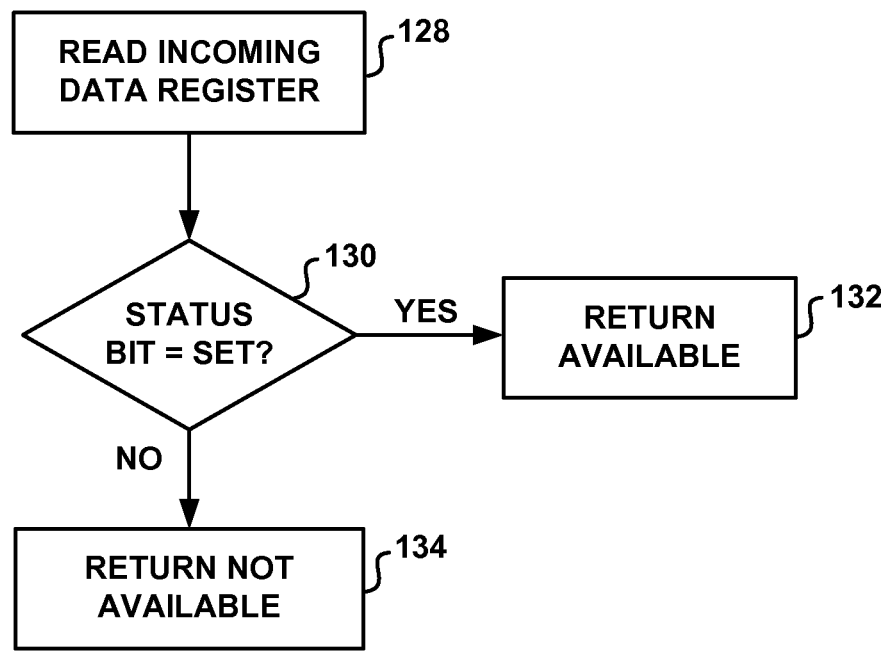
FIGS. 9 and 10 are flow diagrams illustrating example techniques that may be used to implement portions of the technique illustrated in FIG. 8 in accordance with this disclosure.

FIG. 9 is a flow diagram illustrating an example technique that may be used to implement decision block 114 in FIG. 8 in accordance with this disclosure. In some examples, computing system 10 of FIG. 1 and/or GPU 40 of FIG. 2 may be used to implement the example technique shown in FIG. 9. Message passing module 50 may read a status bit in incoming data register 52 of GPU 40 (128). Message passing module 50 may determine if the status bit is set (130). If the status bit in incoming data register 52 is set, message passing module 50 may determine that the incoming message is available (132). On the other hand, if the status bit in incoming data register 52 is not set, message passing module 50 may determine that the incoming message is not available (134).

Figure 10:
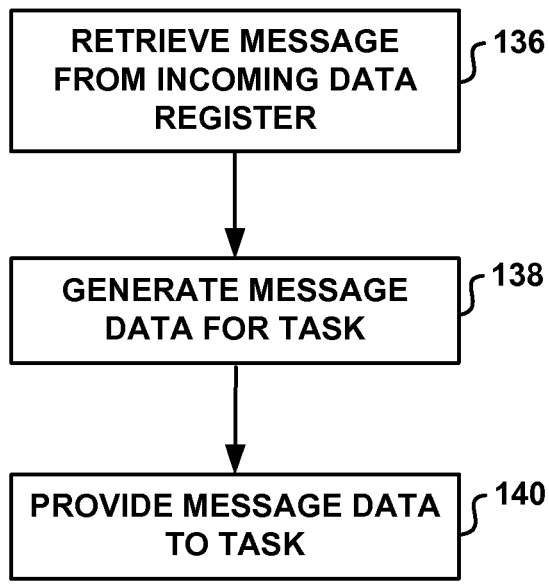

FIG. 10 is a flow diagram illustrating an example technique that may be used to implement process block 120 in FIG. 8 in accordance with this disclosure. In some examples, computing system 10 of FIG. 1 and/or GPU 40 of FIG. 2 may be used to implement the example technique shown in FIG. 10. Message passing module 50 may retrieve the incoming message data from incoming data register 52 in GPU 40 (136). Message passing module 50 may generate return message data for task 48 based on the message data retrieved from incoming data register 52 (138). In some examples, the returned message data may be identical to the message data contained incoming data register 52. In additional examples, message passing module 50 may remove one or more pieces of header information and/or routing information from the message data contained incoming data register 52 to generate the return message data. In further examples, message passing module 50 may perform one or more decoding or transformation operations on the message data contained in incoming data register 52 to generate the return message data. Message passing module 50 provides the message data to task 48 (140).

Figure 11:
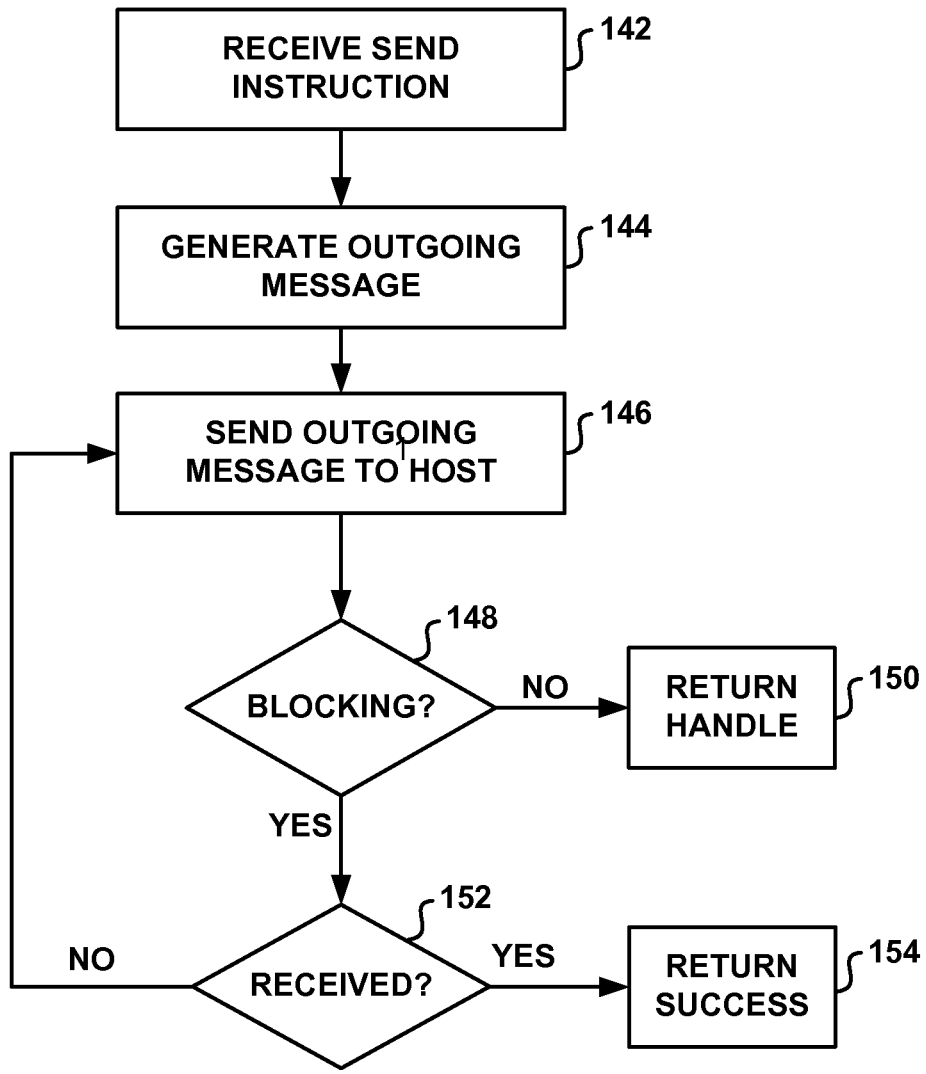
FIG. 11 is a flow diagram illustrating an example technique for executing a send instruction issued by a process executing on a computing device, e.g., a GPU, in accordance with this disclosure.

FIG. 11 an example technique for executing a send instruction issued by a process executing on a computing device, e.g., GPU 14, in accordance with this disclosure. In some examples, computing system 10 of FIG. 1 may be used to implement the example technique shown in FIG. 11. Message passing module 50 receives a send instruction from task 28 (142). Message passing module 50 generates an outgoing message based on message data contained with the send instruction (144). In some examples, the outgoing message may be identical to the message data contained in the send instruction. In additional examples, message passing module 50 may append one or more pieces of header information and/or routing information to the message data contained in the send instruction to generate the outgoing message. In further examples, message passing module 50 may perform one or more coding or transformation operations on the message data contained in the send instruction to generate the outgoing message. Message passing module 50 may send the outgoing message to host device 12 (146).

Message passing module 50 may determine whether the send instruction is a blocking instruction or a non-blocking instruction (148). In some examples, message passing module 50 may make the determination of whether the send instruction is a blocking or non-blocking instruction based on an input parameter specified in the send instruction. In other examples, two different types of send instructions may be used, and message passing module 50 may make the determination of whether the send instruction is a blocking or non-blocking instruction based on the type of instruction, e.g., the operation code (opcode) of the instruction. If message passing module 50 determines that the send instruction is a non-blocking instruction, message passing module 50 may return a handle to the calling process, e.g., task 28 (150). The handle may allow the calling process to query the handle to determine if the message has been successfully sent at a later time. If the subsequent query indicates that the send operation failed, the calling process may need to issue a subsequent send instruction to retry the send operation.

If message passing module 50 determines that the send instruction is a blocking instruction, message passing module 50 may determine whether the outgoing message was successfully received by host device 12 (152). For example, message passing module 50 may poll a status register contained within host device 12 that indicates whether the message was accepted. If message passing module 50 determines that the outgoing message was successfully received, message passing module 50 may return a value to the calling process indicating that the message contained in the send instruction was successfully sent (154). Otherwise, if message passing module 50 determines that the outgoing message was not successfully received, message passing module 50 may proceed to process block 146 and resend the outgoing message to host device 12. The blocking instruction may complete, in some examples, when message passing module 50 determines the message was successfully received or a threshold number of unsuccessful delivery attempts has been reached.

Figure 12:
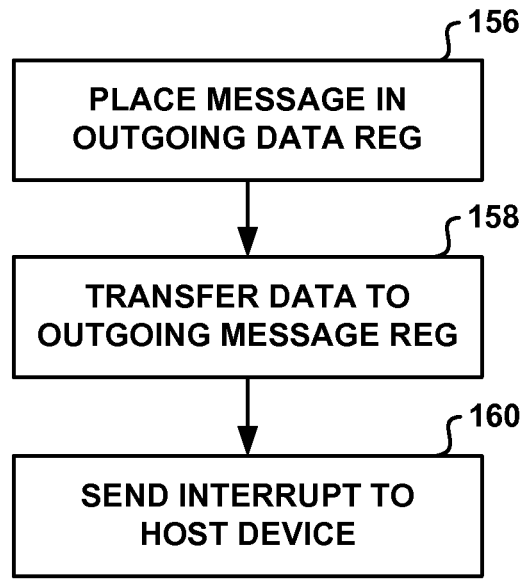
FIGS. 12 and 13 are flow diagrams illustrating example techniques that may be used to implement portions of the technique illustrated in FIG. 11 in accordance with this disclosure.

FIG. 12 is a flow diagram illustrating an example technique that may be used to implement process block 146 in FIG. 11 in accordance with this disclosure. In some examples, computing system 10 of FIG. 1 and/or GPU 40 of FIG. 2 may be used to implement the example technique shown in FIG. 12. Message passing module 50 may place or store the outgoing message in outgoing data register 54 (156). Outgoing message register 62 may update the data in outgoing message register 62 to correspond to outgoing data register 54 in response to new data being placed into outgoing data register 54 (158). Message passing module 50 may generate and send an interrupt signal to host device 12 indicating that a message is available from task 28 of GPU 40 (160).

Figure 13:
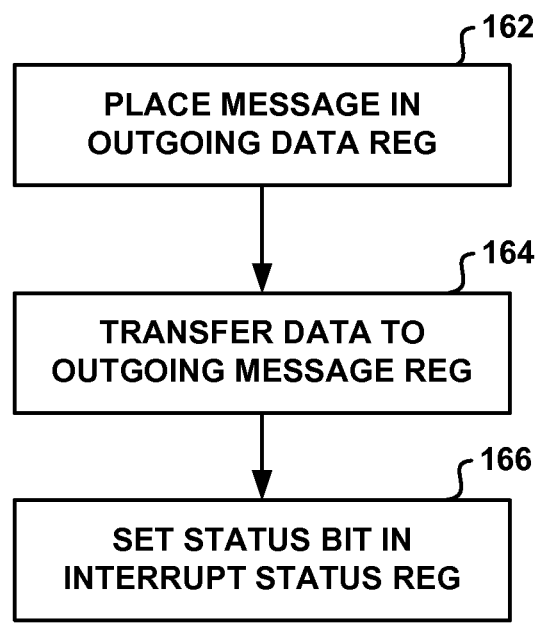

FIG. 13 is another example technique that may be used to implement process block 146 FIG. 11 in accordance with this disclosure. In some examples, computing system 10 of FIG. 1 and/or GPU 40 of FIG. 2 may be used to implement the example technique shown in FIG. 13. Message passing module 50 may place or store the outgoing message in outgoing data register 54 (162). Outgoing message register 62 may update the data in outgoing message register 62 to correspond to outgoing data register 54 in response to new data being placed into outgoing data register 54 (164). Message passing module 50 may set a status bit in interrupt status register 64 to indicate that a message is available from task 28 of GPU 40. The status bit may be set to allow host device 12 to poll GPU 40 to determine if a message is available (166).

Figure 14:
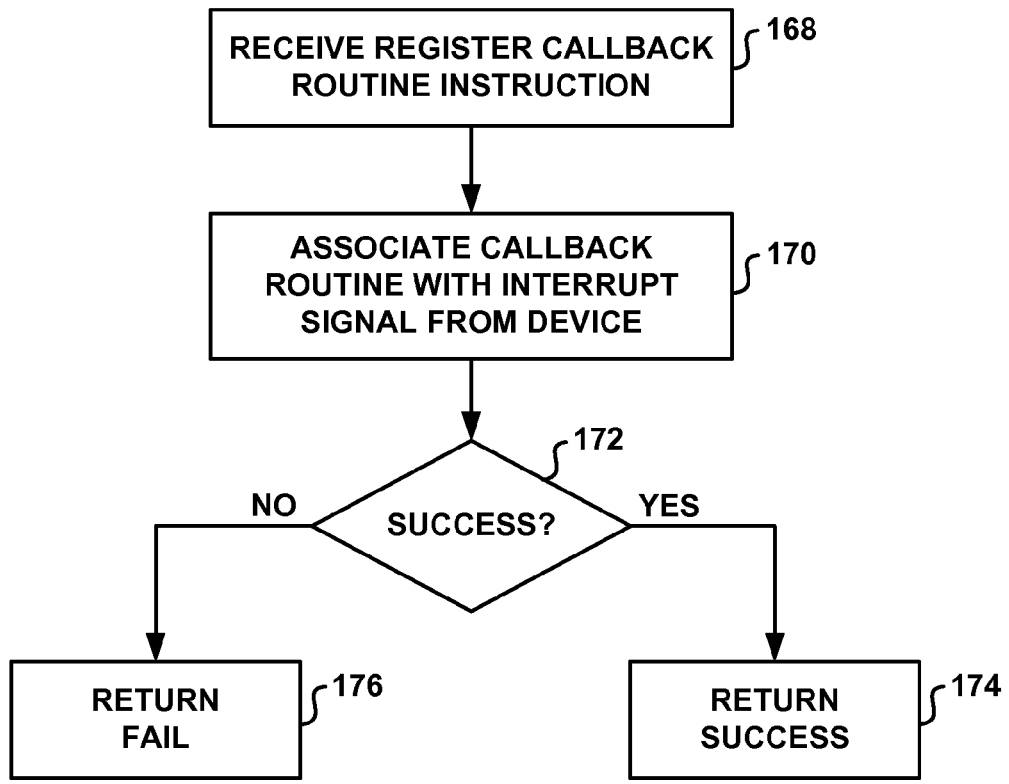
FIG. 14 is a flow diagram illustrating an example technique for executing a register callback routine instruction issued by a process executing on a host device in accordance with this disclosure.

FIG. 14 is a flow diagram illustrating an example technique for executing a register callback routine instruction issued by a process executing on a host device in accordance with this disclosure. In some examples, computing system 10 of FIG. 1 may be used to implement the example technique shown in FIG. 14. Host message passing interface 26 receives a register callback routine instruction from host process 20 (168). Host message passing interface 26 associates the callback routine specified in the register callback routine instruction with an interrupt signal from a device specified in the instruction, e.g., GPU 14 (170). In some examples, the interrupt signal may be indicative that a task executing on the specified device, e.g., task 28 executing on GPU 14, has sent a message. The interrupt signal, in some examples, may be delivered via a dedicated interrupt signal line that is coupled between host device 12 and GPU 14. In further examples, the interrupt signal may be indicative of other events in addition to task 28 sending a message. In such examples, host message passing interface 26 may perform additional processing after receiving the interrupt signal to determine which of the multiple events is signified by the signal.

Host message passing interface 26 determines if the callback routine was successfully associated with interrupt signal (172). If the callback routine was successfully associated with interrupt signal, host message passing interface 26 may return a value to the calling process indicating that the register callback routine operation was successfully completed (174). Otherwise, if the callback routine was not successfully associated with interrupt signal, e.g., an error occurred, host message passing interface 26 may return a value to the calling process indicating that the register callback routine operation failed (176).

Figure 15:
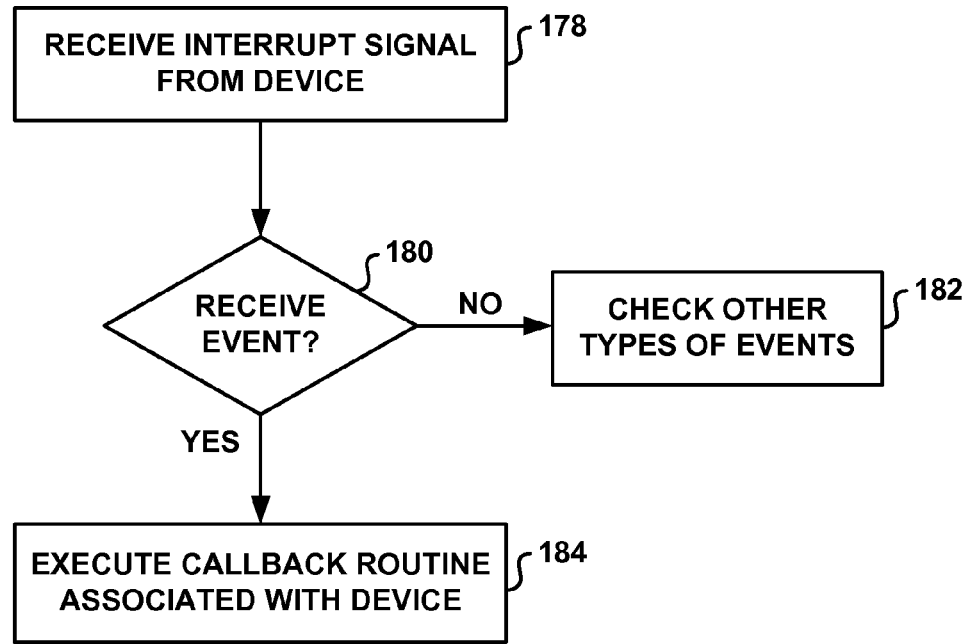
FIG. 15 is a flow diagram illustrating an example technique for processing an interrupt received from a computing device in accordance with this disclosure.

FIG. 15 is a flow diagram illustrating an example technique for processing an interrupt received from a computing device in accordance with this disclosure. In some examples, computing system 10 of FIG. 1 may be used to implement the example technique shown in FIG. 15. Host message passing interface 26 receives an interrupt signal from a computing device, e.g., GPU 14, (178). Host message passing interface 26 determines if the interrupt signal was sent in response to a message receive event (180). In other words, host message passing interface 26 may determine if the interrupt signal indicates that a task executing on the device, e.g., task 28 executing on GPU 14, has sent a message.

In some examples, the interrupt signal may be a dedicated interrupt signal that signals message receive events and no other events. In such examples, host message passing interface 26 may determine that the interrupt signal was sent in response to a message receive event by virtue of receiving the interrupt signal itself and no other operations necessarily need to be performed. In examples where the interrupt signal signals a plurality of potential events, host message passing interface 26 may need to query the computing device to determine which event was signaled.

If host message passing interface 26 determines that the interrupt signal was not sent in response to a message receive event, host message passing interface 26 may check for other types of events (182). Otherwise, if host message passing interface 26 determines that the interrupt signal was sent in response to a message receive event, host message passing interface 26 may execute the callback routine associated with the device from which the message was received (184).

Figure 16:
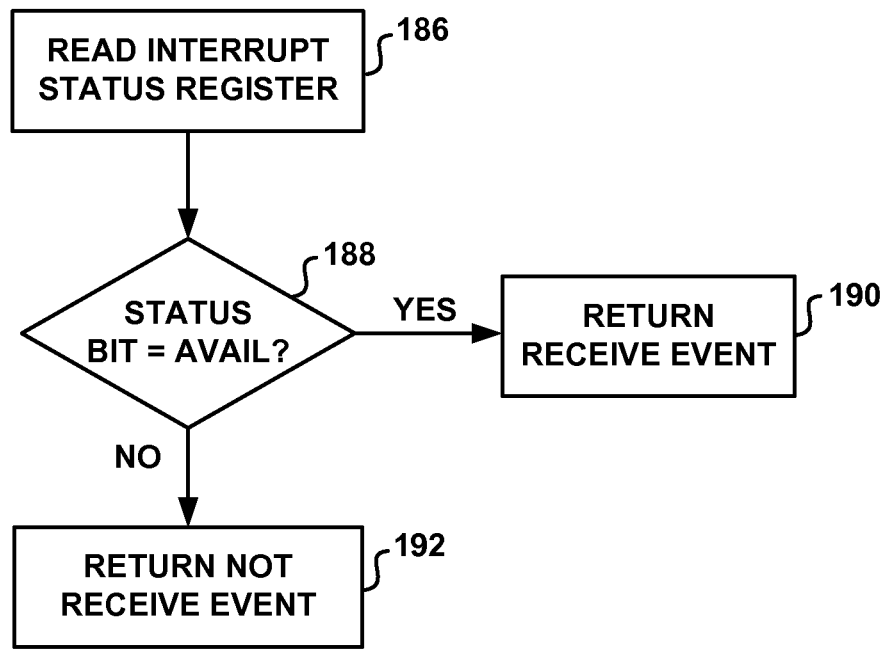
FIGS. 16 and 17 are flow diagrams illustrating example techniques that may be used to implement portions of the technique illustrated in FIG. 15 in accordance with this disclosure.

FIG. 16 is a flow diagram illustrating an example technique that may be used to implement decision block 180 in FIG. 15 in accordance with this disclosure. In some examples, computing system 10 of FIG. 1 and/or GPU 40 of FIG. 2 may be used to implement the example technique shown in FIG. 16. Host message passing interface 26 may read interrupt status register 64 in GPU 40 (186). Host message passing interface 26 may determine whether a status bit in interrupt status register 64 indicates that a new message is available for the host device (188). For example, message passing module 50 may set the status bit in interrupt status register 64 when a message is available, and host message passing interface 26 may poll interrupt status register 64 to determine if the status bit is set in order to determine if a new message is available for the host device. If the status bit indicates that a new message is available for the host device, host message passing interface 26 may determine that the interrupt signal was sent in response to a message receive event (190). On the other hand, if the status bit indicates that a new message is not available for the host device, host message passing interface 26 may determine that the interrupt signal was not sent in response to a message receive event (192).

Figure 17:
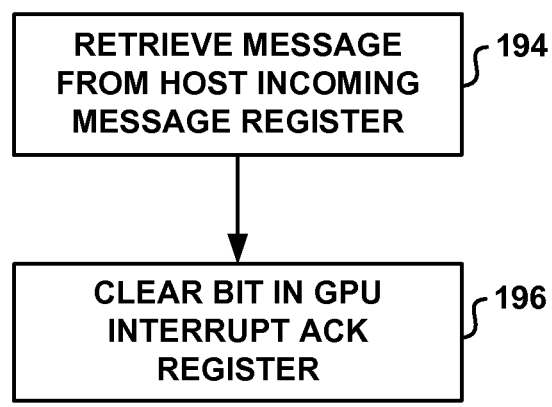

FIG. 17 is a flow diagram illustrating an example technique that may be used to implement process block 184 in FIG. 15 in accordance with this disclosure. In some examples, computing system 10 of FIG. 1 and/or GPU 40 of FIG. 2 may be used to implement the example technique shown in FIG. 17. Host message passing interface 26 may retrieve the message from outgoing message register 62 in GPU 40 (194). Host message passing interface 26 may clear an acknowledgement bit in interrupt acknowledgement register 66 (196). Clearing the acknowledgement bit may assist in the flow control of GPU 40. For example, GPU 40 may set the acknowledgement bit in interrupt acknowledgement register 66 when an outgoing message is written to outgoing message register 62, and wait until the acknowledgement bit has been cleared prior to writing additional data to outgoing message register 62.

Figure 18:
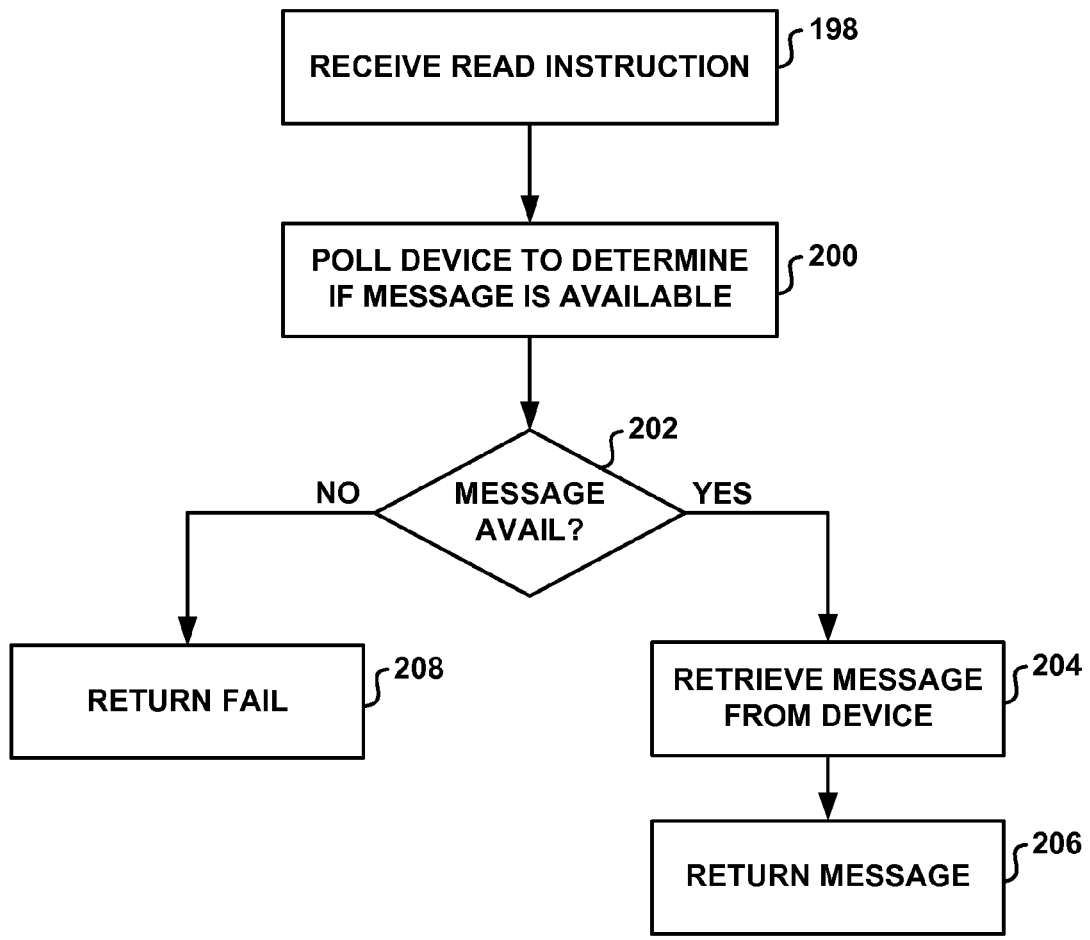
FIG. 18 is a flow diagram illustrating an example technique for executing a read instruction issued by a process executing on a host device in accordance with this disclosure.

FIG. 18 is a flow diagram illustrating an example technique for executing a read instruction issued by a process executing on a host device in accordance with this disclosure. In some examples, computing system 10 of FIG. 1 may be used to implement the example technique shown in FIG. 18. Host message passing interface 26 receives a read instruction specifying a particular device from which to read data (198). Host message passing interface 26 polls the device specified in the read instruction (200). Host message passing interface 26 determines if a message is available from the device specified in the receive instruction based on the polling data received from the polling operation (202). If host message passing interface 26 determines that a message is available from the device specified in the receive instruction, host message passing interface 26 may retrieve the message from the device specified in the read instruction (204). In some examples, host message passing interface 26 may retrieve the message from a register in the device that is accessible to host device 12, e.g., outgoing message register 62 in GPU 40. Host message passing interface 26 may return the message data to the calling process, e.g., host process 20 (206). If host message passing interface 26 determines that a message is not available from the device specified in the receive instruction, host message passing interface 26 may return a value indicating that the read instruction failed (208). The calling process may need to issue the read instruction again to retry the read operation.

Figure 19:
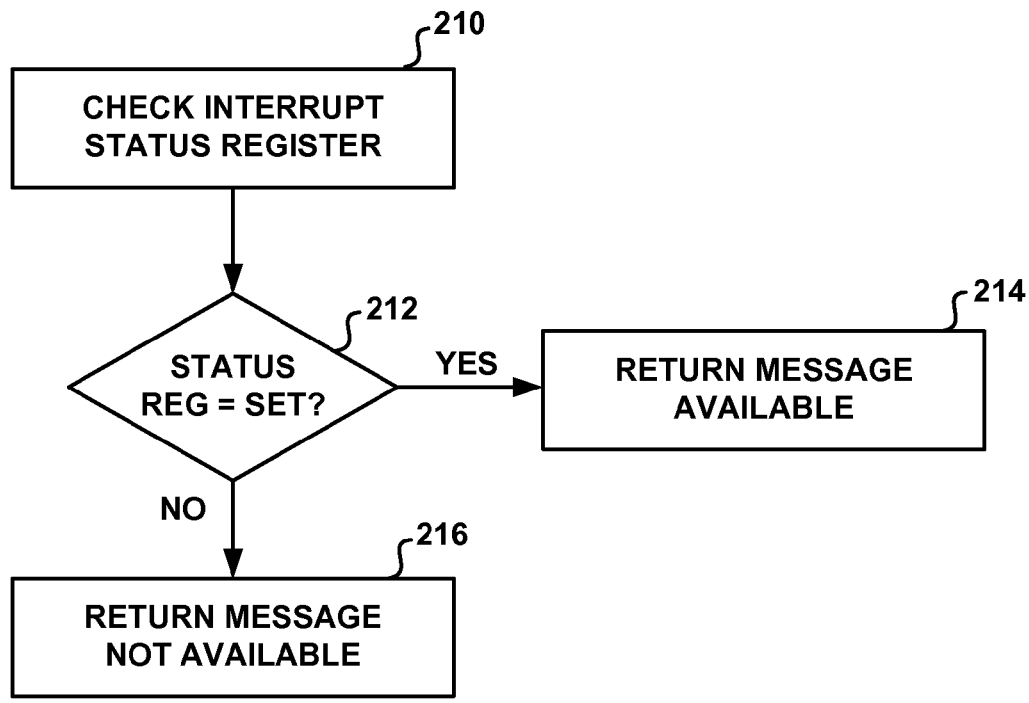
FIG. 19 is a flow diagram illustrating an example technique that may be used to implement portions of the technique illustrated in FIG. 18 in accordance with this disclosure.

FIG. 19 is a flow diagram illustrating an example technique that may be used to implement decision block 202 in FIG. 18 in accordance with this disclosure. In some examples, computing system 10 of FIG. 1 and/or GPU 40 of FIG. 2 may be used to implement the example technique shown in FIG. 19. Host message passing interface 26 may read interrupt status register 64 in GPU 40 (210). Host message passing interface 26 may determine whether a status bit in interrupt status register 64 indicates that a new message is available for the host device (212). For example, message passing module 50 may set the status bit in interrupt status register 64 when a message is available, and host message passing interface 26 may poll interrupt status register 64 to determine if the status bit is set in order to determine if a new message is available for the host device. If the status bit is set, host message passing interface 26 may determine that a message is available (214). On the other hand, if the status bit is not set, host message passing interface 26 may determine that the message is not available (216).

Although the message passing techniques implemented by host message passing interface 26 and device message passing interface 30 have been described above as providing out-of-band signaling between host device 12 and GPU 14, in other example systems, other techniques may be used to provide out-of-band signaling. For example, a special high-priority queue may be defined, in some examples, which may be used for sending out-of-band messages.

Figure 20:
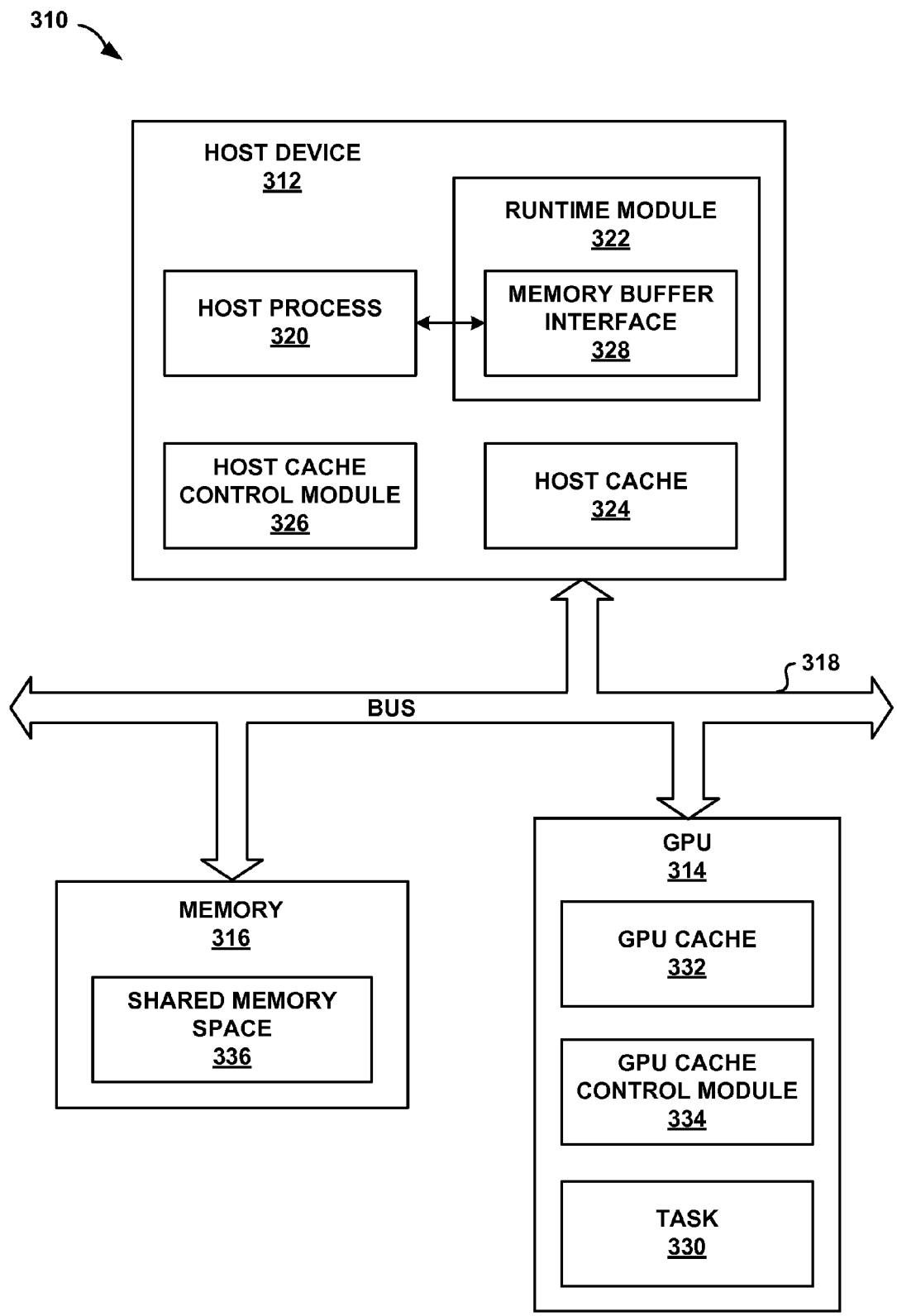
FIG. 20 is a block diagram illustrating an example computing system that may facilitate the use of immediate memory objects in accordance with this disclosure.

FIG. 20 is a block diagram illustrating an example computing system 310 that may facilitate the use of immediate memory objects in accordance with this disclosure. Computing system 310 is configured to process one or more software applications on multiple processing devices. In some examples, the one or more applications may include a host process, and computing system 310 may be configured to execute the host process and to distribute the execution of one or more tasks initiated by the host process on other computing devices within computing system 310. In further examples, the host process and/or the tasks executed by computing system 310 may be programmed according to a parallel programming model. For example, the applications may include instructions that are designed to leverage the task-level parallelism and/or data-level parallelism of underlying hardware systems.

Computing system 310 may comprise a personal computer, a desktop computer, a laptop computer, a computer workstation, a video game platform or console, a mobile telephone such as, e.g., a cellular or satellite telephone, a mobile telephone, a landline telephone, an Internet telephone, a handheld device such as a portable video game device or a personal digital assistant (PDA), a digital media player such as a personal music player, a video player, a display device, or a television, a television set-top box, a server, an intermediate network device, a mainframe computer or any other type of device that processes information.

Computing system 310 includes a host device 312, a GPU 314, a memory 316 and an interconnection network 318. Host device 312 is configured to provide a platform for the execution of a host process and a runtime module for a multiple-processor computing platform API. Typically, host device 312 is a general-purpose CPU, although host device 12 may be any type of type of device capable of executing programs. Host device 12 is communicatively coupled to GPU 314 and memory 316 via interconnection network 318. Host device 312 includes a host process 320, a runtime module 322, a host cache 324 and host cache control module 326. Host process 320 and runtime module 322 may execute on any combination of one or more programmable processors.

Host process 320 includes a set of instructions that form a software program for execution on the computing system 310 platform. The software program may be designed to perform one or more specific tasks for an end-user. Such tasks may, in some examples, involve computationally intensive algorithms that can exploit the multiple processing devices and parallel architectures provided by computing system 310.

Runtime module 322 may be a software module that implements one or more interfaces configured to service one or more of the instructions contained in host process 320. The interfaces implemented by runtime module 322 include memory buffer interface 328. In some examples, runtime module 322 may implement one or more of command queue interface 24 shown in FIG. 1 and host message passing interface 26 shown in FIG. 1 in addition to memory buffer interface 328. In further examples, runtime module 322 may implement one or more interfaces contained within a standard multiple-processor system API in addition to the interfaces described in this disclosure. In some examples, the standard API may be a heterogeneous computing platform API, a cross-platform API, a cross-vendor API, a parallel programming API, a task-level parallel programming API and/or a data-level parallel programming API. In further examples, the standard API may be the OpenCL API. In such examples, runtime module 322 may be designed to be in compliance with one or more of the OpenCL specifications. In additional examples, runtime module 322 may be implemented as part of or be a driver program, e.g., a GPU driver.

Memory buffer interface 328 is configured to receive one or more memory object creation instructions from host process 20 and to execute the functions specified by the received instructions. In some examples, memory buffer interface 328 may be implemented as an extension to an existing standard API, such as, e.g., the OpenCL API. In additional examples, command queue interface 24 may be integrated into an existing standard API, such as, e.g. the OpenCL API.

Host cache 324 is configured to store data for use by processes executing within host device 312. In some examples, the memory space associated with the data stored in host cache 324 may overlap with a portion of the memory space in memory 316. Host cache 324 may be any type of cache known in the art. For example, host cache 324 may include any combination of cache-levels (e.g., L1, L2, etc.) and/or mapping schemes (e.g., direct mapped, fully-associative, set associative, etc.). Host cache control module 326 is configured to control the operation of host cache 324.

GPU 314 is configured to execute one or more tasks in response to instructions received from host device 312. GPU 314 may be any type of GPU that includes one or more programmable processors or processing elements. For example, GPU 314 may include one or more programmable shader units that are configured to execute a plurality of execution instances for a task in parallel. The programmable shader units may include a vertex shader unit, a fragment shader unit, a geometry shader unit and/or a unified shader unit. GPU 314 is communicatively coupled to host device 312 and memory 316 via interconnection network 318. GPU 314 includes a task 330, a GPU cache 332 and a GPU cache control module 334. Task 330 may execute on any combination of one or more programmable processing elements.

Task 330 comprises a set of instructions that form a task for execution on a computing device in computing system 310. In some examples, the set of instructions for task 330 may be defined in host process 320 and, in some cases, compiled by instructions included in host process 320. In further examples, task 330 may be a kernel program that has multiple execution instances executing on GPU 314 in parallel. In such examples, host process 320 may define an index space for the kernel that maps kernel execution instances to respective processing elements for executing the kernel execution instances, and GPU 314 may execute the multiple kernel execution instances for task 330 in accordance with the index space defined for the kernel.

GPU cache 332 is configured to store data for use by tasks executing within GPU 314. In some examples, the memory space associated with the data stored in GPU cache 332 may overlap with a portion of the memory space in memory 316. GPU cache 332 may be any type of cache known in the art. For example, GPU cache 332 may include any combination of cache-levels (e.g., L1, L2, etc.) and/or mapping schemes (e.g., direct mapped, fully-associative, set associative, etc.). GPU cache control module 334 is configured to control the operation of GPU cache 332.

Memory 316 is configured to store data for use by one or both of host device 312 and GPU 314. Memory 316 may include any combination of one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data storage media or an optical storage media. Memory 316 is communicatively coupled to host device 312 and GPU 314 via interconnection network 318. Memory 316 includes shared memory space 336. Shared memory space 336 may be a memory space that is accessible by both host device 312 and GPU 314.

Interconnection network 318 is configured to facilitate communication between host device 312, GPU 314 and memory 316. Interconnection network 318 may be any type of interconnection network known in the art. In the example computing system 310 of FIG. 20, interconnection network 318 is a bus. The bus may be include one or more of any of a variety of bus structures, such as, e.g., a third generation bus (e.g., a HyperTransport bus or an InfiniBand bus), a second generation bus (e.g., an Advanced Graphics Port bus, a Peripheral Component Interconnect Express (PCIe) bus, or an Advanced eXentisible Interface (AXI) bus) or any other type of bus. Interconnection network 318 is coupled to host device 312, GPU 314 and memory 316.

The structures and functionalities of the components in computing system 310 will now be described in further detail. As discussed above, host process 320 includes a set of instructions. The set of instructions may include, for example, one or more memory object creation instructions. In additional examples, the set of instructions may include instructions that specify the tasks or kernels to be executed on GPU 314, instructions that create command queues and associate the command queues with particular devices, instructions that compile and bind programs, instructions that setup kernel parameters, instructions that define index spaces, instructions that define a device context, enqueue instructions, message passing instructions and other instructions that support the functionality provided by host process 320.

According to this disclosure, host process 320 may interact with memory buffer interface 328 by issuing one or more memory object creation instructions to memory buffer interface 328 instructing memory buffer interface 328 to create a memory object based on information contained in the instruction that specifies whether an immediate mode is enabled for the memory object. As used herein, a memory object may refer to a software object that represents a region of memory space accessible by GPU 314. In some examples, the region of memory space may also be accessible by host device 312. A memory object may include the data contained in the memory space associated with the memory object. The memory object may further include one or more characteristics associated with the memory space. In some examples, a memory object may include a handle to a reference counted region of global memory, e.g., memory 316.

The memory objects may include buffer objects and image objects. A buffer object may be a memory object that stores a one-dimensional collection of bytes. The one-dimensional collection of bytes may be the data associated with the memory object. A buffer object may also include information such as, e.g., the size of the memory space associated with the buffer object in bytes, usage information for the buffer object, and the region of memory space allocated for the buffer object. An image object stores a two-dimensional or three-dimensional array of data, such as, e.g., a texture, a frame-buffer or an image. An image object may also include information such as, e.g., the dimensions of the image, a description of each element in the image, usage information for the image object, and the region of memory space allocated for the image object.

According to some aspects of this disclosure, the memory object creation instructions may include an input parameter that specifies whether an immediate mode should be enabled for the memory object to be created. As discussed in further detail herein, when the immediate mode is enabled, the memory object may be implemented as a non-cacheable shared memory and/or as a cache-coherent shared memory. When the immediate mode is disabled, the memory object may not necessarily be implemented as a non-cacheable shared memory or as a cache-coherent shared memory.

In some examples, the memory object may include an immediate mode attribute that is indicative of whether the memory object is an immediate mode memory object. In such examples, memory buffer interface 328 may be configured to set the immediate mode attribute for the memory object to be created to a value indicative of whether the immediate mode is enabled for the memory object based on the information specifying whether the immediate mode should be enabled for the memory object. The immediate mode attribute of the memory object may be used by computing system 310 to determine whether or not to implement the memory object as a non-cacheable shared memory and/or as a cache-coherent shared memory.

The memory object creation instructions may, in some examples, include a buffer object creation instruction that instincts memory buffer interface 328 to create a buffer object based on information contained in the instruction that specifies whether an immediate mode is enabled for the buffer object. The memory object creation instructions may, in further examples, include an image object creation instruction that instincts memory buffer interface 328 to create an image object based on information contained in the instruction that specifies whether an immediate mode is enabled for the image object.

In some examples, the interface for the buffer object creation instruction may take the following form:

```
cl_mem clCreateBuffer (
    cl_context context,
    cl_mem_flags flags,
    size_t size,
    void *host_ptr,
    cl_int *errcode_ret)
``` where clCreateBuffer is the instruction identifier, cl_context context is a valid context, e.g., an OpenCL context, used to create the buffer object, cl_mem_flags flags is a bit-field that is used to specify allocation and usage information for the buffer object, size_t size is a parameter specifying the size in bytes of the buffer memory object to be allocated, void *host_ptr is a pointer to the buffer data that may already be allocated by the application, and cl_int *errcode_ret returns one or more error codes. The instruction may return the created buffer object as a cl_mem memory object. In this example, the input parameter that specifies whether an immediate mode should be enabled for the image object may be, e.g., a CL_IMMEDIATE flag that is specified in the cl_mem_flags flags field.

In further examples, the interface for the image object creation instruction may take the following form:

```
cl_mem clCreateImage2D (
    cl_context context,
    cl_mem_flags flags,
    const cl_image_format *image_format,
    size_t image_width,
    size_t image_height,
    size_t image_row_pitch,
    void *host_ptr,
    cl_int *errcode_ret)
``` where clCreateImage2D is the instruction identifier, cl_context context is a valid context, e.g., an OpenCL context, used to create the buffer object, cl_mem_flags flags is a bit-field that is used to specify allocation and usage information for the image object, const cl_image_format *image_format pointer to a structure that describes format properties of the image to be allocated, size_t image_width is the width of the image in pixels, size_t image_height is the height of the image in pixels, size_t image_row_pitch is the scan-line pitch in bytes, void *host_ptr is a pointer to the image data that may already be allocated by the application, and cl_int *errcode_ret returns one or more error codes. The instruction may return the created image object as a cl_mem memory object. In this example, the input parameter that specifies whether an immediate mode should be enabled for the image object may be, e.g., a CL_IMMEDIATE flag that is specified in the cl_mem_flags flags field.

In some examples, the memory object creation interfaces may be configured to allow only either a WRITE_ONLY attribute or a READ_ONLY attribute in terms of read/write attributes. In other words, in such examples, memory buffer interface 328 may disallow a READ_WRITE attribute. Non-immediate CL images may already have such a feature provided by the OpenCL specification. Disallowing the READ_WRITE attribute may reduce the complexity in maintaining cache coherency.

According to this disclosure, memory buffer interface 328 is configured to receive an instruction that specifies whether an immediate mode should be enabled for shared memory space 336 that is accessible by both host device 312 and by GPU 314, and to selectively enable the immediate mode for shared memory space 336 based on the received instruction that specifies whether the immediate mode should be enabled for shared memory space 336. For example, memory buffer interface 328 may enable the immediate mode for shared memory space 336 if the instruction specifies that the immediate mode should be enabled for shared memory space 336, and disable the immediate mode for shared memory space 336 if the instruction specifies that the immediate mode should be disabled for shared memory space 336. The instruction may be, for example, one of a memory object creation instruction, a buffer object creations instruction or an image object creation instruction. Shared memory space 336 may correspond, for example, to a memory object, a buffer object or an image object.

In some examples, when memory buffer interface 328 enables the immediate mode for shared memory space 336, memory buffer interface 328 may cause caching services for shared memory space 336 to be disabled. Similarly, when memory buffer interface 328 disables the immediate mode for shared memory space 336, memory buffer interface 328 may cause caching services for shared memory space 336 to be enabled for shared memory space 336. The caching services may be performed by one or both of host cache 324 and GPU cache 332. Caching services, as used herein, may refer to services which are typically performed by a cache as known in the art.

In further examples, memory buffer interface 328 may enable and disable the immediate mode for shared memory space 336 by setting an immediate mode attribute associated with shared memory space 336 to a value indicative of whether the immediate mode is enabled for the shared memory space. For example, memory buffer interface 328 may enable the immediate mode for shared memory space 336 by setting an immediate mode attribute associated with shared memory space 336 to a value that indicates the immediate mode is enabled for shared memory space 336, e.g., immediate mode attribute=true. Similarly, memory buffer interface 328 may disable the immediate mode for shared memory space 336 by setting the immediate mode attribute associated with shared memory space 336 to a value that indicates that the immediate mode is disabled for shared memory space 336, e.g., immediate mode attribute=false. The immediate mode attribute may, in some cases, be a global variable, e.g., a boolean variable, accessible by task 330 executing on GPU 314. In some examples, the immediate mode attribute may be stored within shared memory space 336. In other examples, the immediate mode attribute may be stored in a location accessible by task 330 executing on GPU 314 other than shared memory space 336. In cases where shared memory space 336 is part of a memory object, the immediate mode attribute may be stored in a location of memory space where the other attributes of the memory object are stored.

In examples where memory buffer interface 328 enables and disables the immediate mode for shared memory space 336 by setting an immediate mode attribute associated with shared memory space 336, the source code for task 330 may, in some cases, be compiled such that, prior to performing a memory read or write operation with respect to shared memory space 336, task 330 accesses the immediate mode attribute associated with shared memory space 336, and determines whether an immediate mode is enabled for shared memory space 336 based on the immediate mode attribute for shared memory space 336. If the immediate mode is enabled for shared memory space 336, then task 330 may be programmed to execute an immediate mode read or write instruction to read data from or write data to shared memory space 336. On the other hand, if the immediate mode is not enabled for shared memory space, then task 330 may be programmed to execute a cached mode read or write instruction, e.g., a cached read or write instruction, to read data from or write data to shared memory space 336.

The immediate mode read and write instructions may, for example, perform read and write operations, respectively, without using caching services. For example, the immediate mode read instruction may cause the cache to be invalidated prior to performing the read operation and/or may bypass the cache when performing the read operation. The immediate mode write instruction, for example, may cause the cache to perform an immediate write-back when performing the write operation and/or may bypass the cache when performing the write operation. The cached read and write instructions may, for example, execute read and write operations, respectively, using the caching services of one or both of GPU cache 332.

In additional cases, the compiler for task 330 may have access to information, when compiling the source code for task 330, indicative of whether the immediate mode is enabled for shared memory space 336. For example, the source code for task 330, e.g., the kernel source code, may include a flag indicative of whether the immediate mode is enabled for a memory object used by task 330 and associated with shared memory space 336. In some examples, the flag may take the form of an OpenCL attribute qualifier, such as, e.g., a _cl_immediate attribute qualifier. If the immediate mode is enabled for the memory object associated with shared memory space 336, then the compiler may compile task 330 such that the compiled code for task 330 includes immediate mode read and/or write instructions for read or write operations that take place with respect to shared memory space 336. Otherwise, if the immediate mode is not enabled for the memory object associated with shared memory space 336, then the compiler may compile task 330 such that the compiled code for task 330 does not include immediate mode read and/or write instructions for read or write operations that take place with respect to shared memory space 336. For example, the compiler may compile task 330 such that the compiled code for task 330 includes cached read and/or write instructions for read or write operations that take place with respect to shared memory space 336.

In further examples, memory buffer interface 328 may enable and disable the immediate mode for shared memory space 336 by enabling and disabling the performance of caching services for shared memory space 336 by at least one of host cache 324 in host device 312 and GPU cache 332 in GPU 314. For example, memory buffer interface 328 may enable the immediate mode for shared memory space 336 by disabling the performance of caching services for shared memory space 336 by at least one of host cache 324 in host device 312 and GPU cache 332 in GPU 314. Similarly, memory buffer interface 328 may disable the immediate mode for shared memory space 336 by enabling the performance of caching services for shared memory space 336 by the at feast one of host cache 324 in host device 312 and GPU cache 332 in GPU 314.

In such examples, memory buffer interface 328 may enable and disable the performance of caching services for shared memory space 336 by configuring a hardware-based cache control module and/or hardware-based memory management unit associated with the cache performing the caching services for shared memory space 336. For example, to enable the performance of caching services for shared memory space 336 by host cache 324, memory buffer interface 328 may configure host cache control module 326 such that caching services are provided by host cache 324 for shared memory space 336. To disable the performance of caching services for shared memory space 336 by host cache 324, memory buffer interface 328 may, for example, configure host cache control module 326 such that caching services are not provided by host cache 324 for shared memory space 336. Similarly, to enable the performance of caching services for shared memory space 336 by GPU cache 332, memory buffer interface 328 may, for example, configure GPU cache control module 334 such that caching services are provided by host cache 324 for shared memory space 336. To disable the performance of caching services for shared memory space 336 by GPU cache 332, memory buffer interface 328 may, for example, configure GPU cache control module 334 such that caching services are not provided by GPU cache 332 for shared memory space 336.

In some examples, memory buffer interface 328 may configure one or both of host cache control module 326 and GPU cache control module 334 by setting one or more hardware-based immediate flags associated with shared memory space 336 to a value indicative of whether caching services should be provided for shared memory space 336. The one or more hardware-based immediate flags may be, in some examples, one or more registers. In further examples, the hardware-based immediate flags may be part of a table of immediate flags where each immediate flag in the table of immediate flags corresponds to a particular address space within memory 316. In any case, when the one or more immediate flags associated with shared memory space 336 are set to values indicating that caching services should be provided, host cache control module 326 and/or GPU cache control module 334 may provide caching services for shared memory space 336 using host cache 324 and/or GPU cache 332. Similarly, when the one or more flags associated with shared memory space 336 are set to values indicating that caching services should not be provided, host cache control module 326 and/or GPU cache control module 334 may not provide caching services for shared memory space 336.

In such examples, GPU cache control module 334 may be configured to process read instructions and/or write instructions for memory addresses within the address space of memory 316. The read and write instructions may be issued to GPU cache control module 334, for example, by task 330 executing on GPU 314. In response to receiving a read or write instruction to read data from or write data to a memory location within a given address space of memory 316, GPU cache control module 334 may identify a hardware-based flag associated with the address space, and determine whether to use the caching services of GPU cache 332 when processing the read or write instruction based on the value of the hardware-based flag. If GPU cache control module 334 determines to use the caching services of GPU cache 332, then GPU cache control module 334 may, for example, attempt to read data from GPU cache 332 if the data is valid and/or write data to GPU cache 332. If GPU cache control module 334 determines not to use the caching services of GPU cache 332, then GPU cache control module 334 may, in some examples, bypass GPU cache 332 and read data from or write data directly to memory 316. In additional examples, if GPU cache control module 334 determines not to use the caching services of GPU cache 332, then GPU cache control module 334 may invalidate a portion of cache 332 associated with the address space prior to executing a read instruction and/or perform a cache write-back or cache write-through technique when executing a write instruction. Host cache control module 334 may operate in a similar fashion with respect to host cache 324 in response to read and write instructions received from host process 320 executing on host device 312.

In additional examples, memory buffer interface 328 may enable and disable the immediate mode for shared memory space 336 by enabling and disabling a shared memory cache coherency mode for at least one of host cache 324 in host device 312 and GPU cache 332 in GPU 314. For example, to enable the immediate mode for shared memory space 336, memory buffer interface 328 may enable the shared memory cache coherency mode for at least one of host cache 324 in host device 312 and GPU cache 332 in GPU 314. Similarly, to disable the immediate mode for shared memory space 336, memory buffer interface 328 may disable the shared memory cache coherency mode for the at least one of host cache 324 in host device 312 and GPU cache 332 in GPU 314. In such examples, memory buffer interface 328 may, in some cases, enable a shared memory cache coherency mode for host cache 324 by configuring one or both of host cache control module 326 and GPU cache control module 334 to enable the shared memory cache coherency mode, and disable the shared memory cache coherency mode for host cache 324 by configuring one or both of host cache control module 326 and GPU cache control module 334 to disable the shared memory cache coherency mode.

When a shared memory cache coherency mode for host cache 324 is enabled, host cache control module 326 may perform shared memory cache coherency techniques with respect to shared memory space 336 according to known methods. When the shared memory cache coherence mode for host cache 324 is disabled, host cache 324 may not perform the shared memory cache coherency techniques with respect to shared memory space 336. Similarly, when a shared memory cache coherency mode for GPU cache 332 is enabled, GPU cache control module 334 may perform shared memory cache coherency techniques with respect to shared memory space 336 according to known methods. When the shared memory cache coherence mode for GPU cache 332 is disabled, GPU cache control module 334 may not perform the shared memory cache coherency techniques with respect to shared memory space 336.

For ease of illustration, the example computing system 310 illustrated in FIG. 20 describes the immediate buffering techniques of this disclosure using GPU 314 as a computing device. It should be recognized that the techniques in this disclosure may be applied to multiple-processor computing systems that have computing devices other than a GPU in addition to or in lieu of GPU 314. In some examples, the computing devices in computing system 310 may be OpenCL compute devices. In addition, the example computing system 310 shown in FIG. 20 illustrates an infrastructure and techniques for implementing immediate memory objects that facilitate in-flight data sharing between a host device and a computing device. In other example computing systems, however, the techniques may be readily extended to provide in-flight data sharing between different computing devices (e.g., OpenCL compute devices) in a computing system having more than one computing device. In such examples, one or more interrupt lines may be wired between different computing devices.

Figure 21:
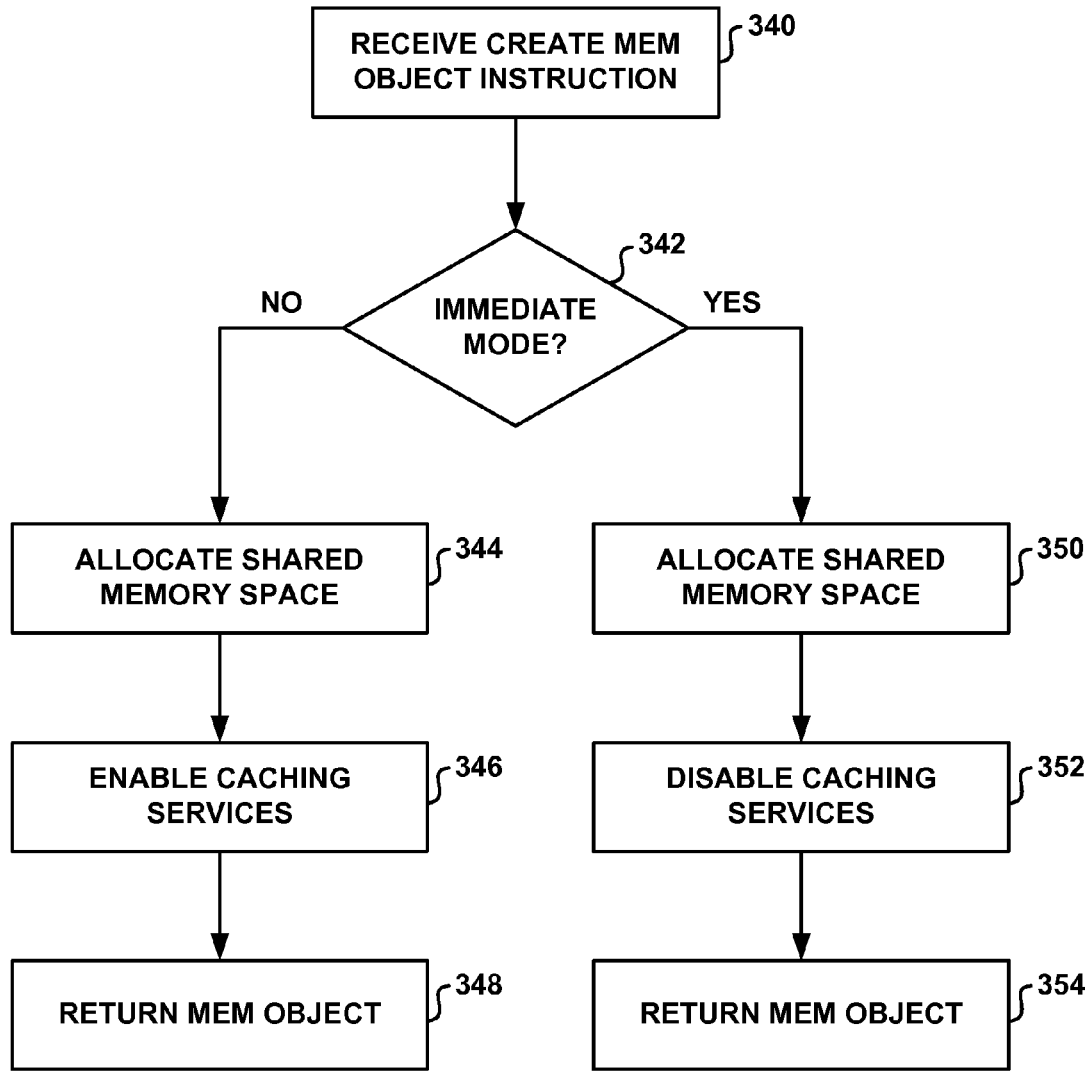
FIG. 21 is a flow diagram illustrating an example technique for executing a memory object creation instruction issued by a process executing on a host device in accordance with this disclosure.

FIG. 21 is a flow diagram illustrating an example technique for executing a memory object creation instruction issued by a process executing on a host device in accordance with this disclosure. In some examples, computing system 310 of FIG. 20 may be used to implement the example technique shown in FIG. 21. The memory object creation instruction may be a buffer object, creation instruction or an image object creation instruction. Memory buffer interface 328 receives a memory object creation instruction (340). Memory buffer interface 328 determines if the memory object creation instructions specifies that the immediate mode should be enabled for the memory object (342). For example, memory buffer interface 328 may determine whether an immediate flag parameter is included in a parameter list for the memory object creation instruction.

If memory buffer interface 328 determines that the memory object creation instruction does not specify that the immediate mode should be enabled for the memory object, then memory buffer interface 328 may allocate a shared memory space 336 for the memory object to be created (344), cause the performance of caching services by one or both of host cache 324 and GPU cache 332 to be enabled for shared memory space 336 (346), and return a reference to the created memory object (348). The memory object creation instruction may specify that the immediate mode should not be enabled, e.g., by not including an immediate flag parameter or by specifying with another parameter value that the immediate mode should not be enabled. On the contrary, if memory buffer interface 328 determines that the memory object creation instruction specifies that the immediate mode should be enabled for the memory object, then memory buffer interface 328 may allocate a shared memory space 336 for the memory object to be created (350), cause the performance of caching services by one or both of host cache 324 and GPU cache 332 to be disabled for shared memory space 336 (352), and return a reference to the created memory object (354). The memory object creation instruction may specify that the immediate mode should be enabled, e.g., by including an immediate flag parameter or by specifying with another parameter value that the immediate mode should be enabled.

In some examples, memory buffer interface 328 may cause the performance of caching services to be enabled for shared memory space 336 by setting an immediate mode attribute of the memory object associated with shared memory space 336 to a value indicating that caching services should be provided for the memory object associated with shared memory space 336. Likewise, memory buffer interface 328 may cause the performance of caching services to be disabled for shared memory space 336 by setting the immediate mode attribute of the memory object associated with shared memory space 336 to a value indicating that caching services should not be provided for the memory object associated with shared memory space 336. The returned memory object may include the immediate mode attribute. In such examples, the immediate mode attribute for the memory object may be accessible by one or both of host process 320 executing on host device 312 and task 330 executing on GPU 314. Host process 320 and/or task 330 may determine whether to use caching services when executing particular read and write instructions with respect to shared memory space 336 based on the immediate mode attribute of the memory object associated with shared memory space 336.

In further examples, memory buffer interface 328 may cause the performance of caching services to be enabled for shared memory space 336 by configuring one or more hardware-based immediate flags associated with the shared memory space 336 to a value indicating that caching services should be provided for shared memory space 336. Likewise, memory buffer interface 328 may cause the performance of caching services to be disabled for shared memory space 336 by configuring one or more hardware-based immediate flags associated with the shared memory space 336 to a value indicating that caching services should not be provided for shared memory space 336. The one or more hardware-based immediate flags may be located in one or more of host cache control module 326 and GPU cache control module 334 or another local or global memory management unit (not shown).

In additional examples, memory buffer interface 328 may return the memory object to the calling process, e.g., host process 320, prior to allocating the physical memory space in memory 316 to store the data. In such examples, memory buffer interface 328 may include the immediate mode attribute in the returned memory object. Then, when memory 316 is allocated at a later time for the memory object, memory buffer interface 328 or another module may configure the one or more hardware-based immediate flags based on the immediate mode attribute of the memory object.

Figure 22:
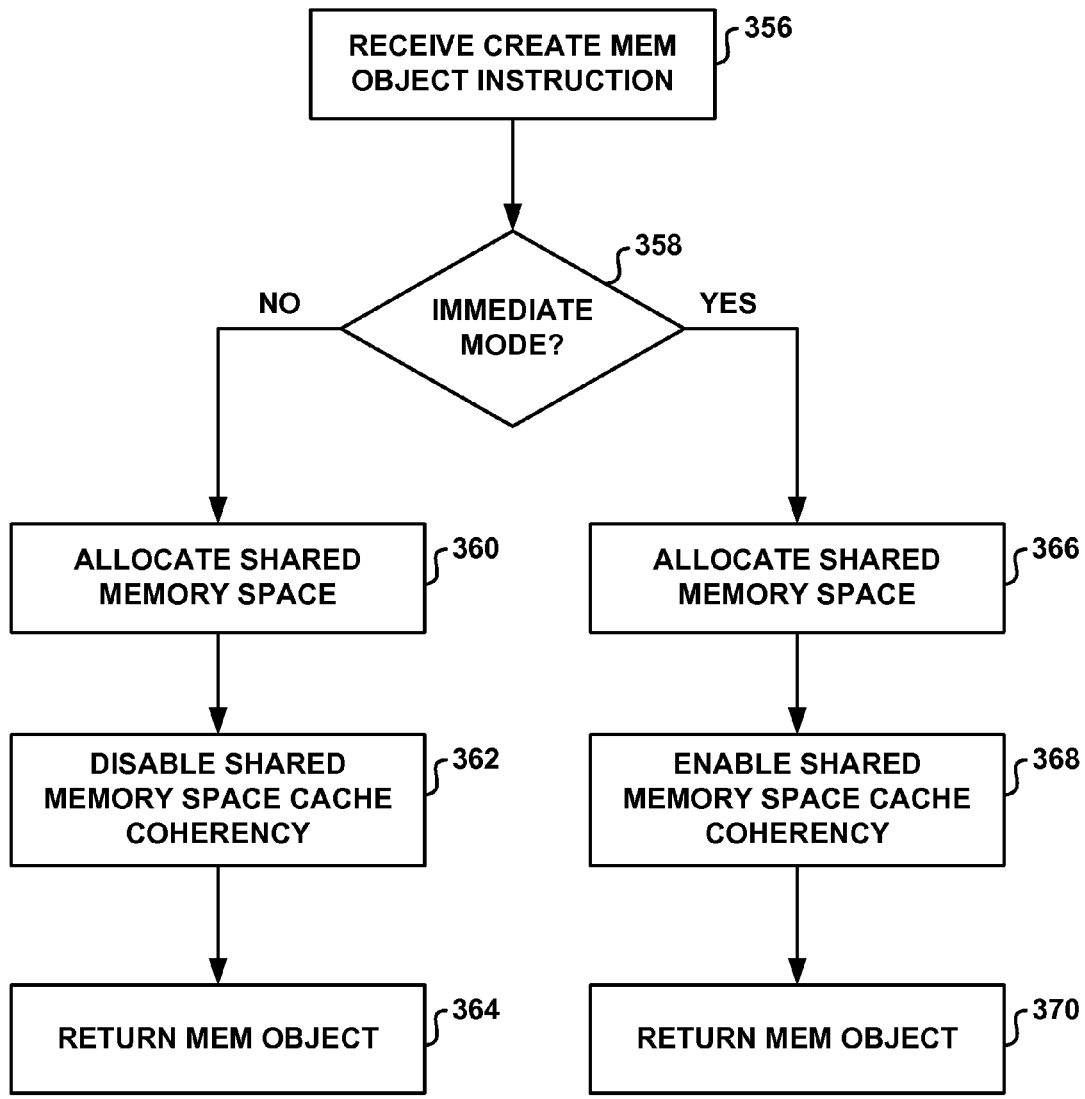
FIG. 22 is a flow diagram illustrating another example technique for executing a memory object creation instruction issued by a process executing on a host device in accordance with this disclosure.

FIG. 22 is a flow diagram illustrating another example technique for executing a memory object creation instruction issued by a process executing on a host device in accordance with this disclosure. In some examples, computing system 310 of FIG. 20 may be used to implement the example technique shown in FIG. 22. The memory object creation instruction may be a buffer object creation instruction or an image object creation instruction. Memory buffer interface 328 receives a memory object creation instruction (356). Memory buffer interface 328 determines if the memory object creation instruction specifies that the immediate mode should be enabled for the memory object (358). For example, memory buffer interface 328 may determine whether an immediate flag parameter is included in a parameter list for the memory object creation instruction.

If memory buffer interface 328 determines that the memory object creation instruction does not specify that the immediate mode should be enabled for the memory object, then memory buffer interface 328 may allocate a shared memory space 336 for the memory object to be created (360), disable a shared memory cache coherency mode for shared memory space 336 (362), and return a reference to the created memory object (364). On the contrary, if memory buffer interface 328 determines that the memory object creation instruction specifies that the immediate mode should be enabled for the memory object, then memory buffer interface 328 may allocate a shared memory space 336 for the memory object to be created (366), enable a shared memory cache coherency mode for shared memory space 336 (368), and return a reference to the created memory object (370).

In some examples, memory buffer interface 328 may return the memory object to the calling process, e.g., host process 320, prior to allocating the physical memory space in memory 316 to store the data. In such examples, memory buffer interface 328 may include the immediate mode attribute in the returned memory object. Then, when memory 316 is allocated at a later time for the memory object, memory buffer interface 328 or another module may enable or disable the shared memory space cache coherency mode based on the immediate mode attribute of the memory object.

FIGS. 23-28 illustrate example techniques that a GPU may use to process immediate mode and cached mode load and store instructions in accordance with this disclosure. As discussed above, the source code for task 330 may, in some examples, be compiled such that the compiled code may include both cached mode instructions and immediate mode instructions in order to support both immediate memory objects and cached memory objects. Cached mode instructions may execute read and write operations with respect to a memory using caching services of a cache associated with the underlying memory, and immediate mode instructions may execute read and write operations with respect to a memory without using caching services of a cache associated with the underlying memory. Cached mode instructions may be alternatively referred to herein as non-immediate mode instructions. The load and store instructions may alternatively be referred to herein as read and write instructions, respectively.

In some examples, the cached mode version of a load or store instruction and the immediate mode version of the load or store instruction may be different instructions, e.g., each having a different operational code, i.e., opcode. In further examples, the cached mode version of a load or store instruction and the immediate mode version of the load or store instruction may be the same instruction, e.g., both having the same opcode. In such examples, a parameter provided with the instruction may specify whether the instruction is cached mode or immediate mode.

Figure 23:
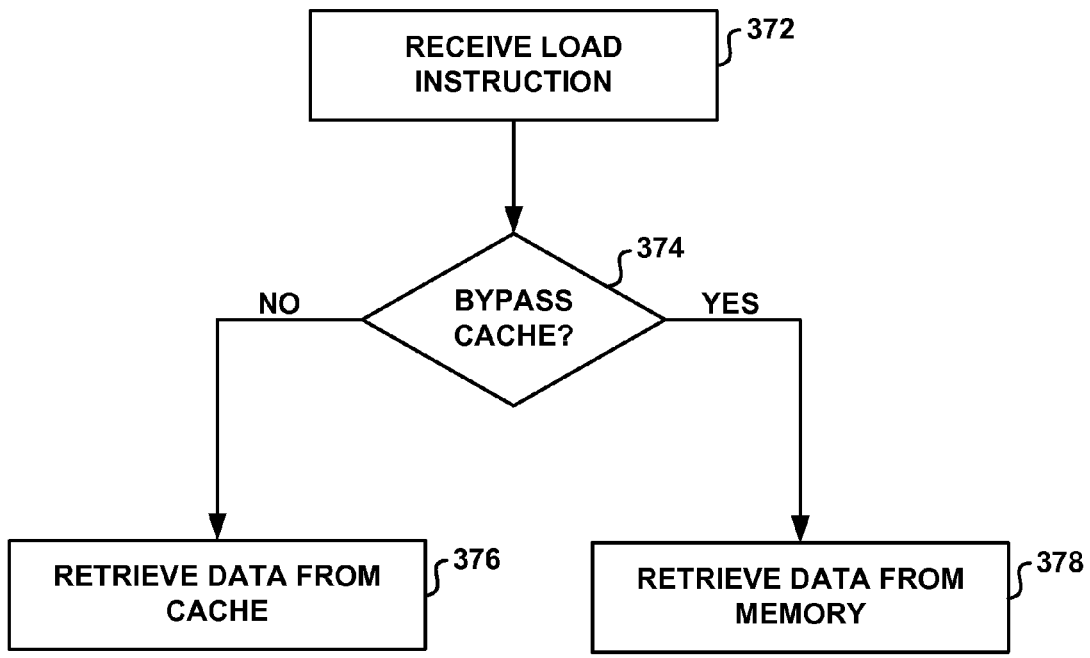
FIGS. 23-26 are flow diagrams illustrating example techniques for processing cached mode and immediate mode instructions in accordance with this disclosure.

FIG. 23 is a flow diagram illustrating an example technique for processing cached mode and immediate mode instructions in accordance with this disclosure. In some examples, computing system 310 of FIG. 20 may be used to implement the example technique shown in FIG. 23. In the example of FIG. 23, the immediate mode is referred to as a bypass cache mode, and the immediate mode instructions correspond to bypass cache mode instructions. GPU cache control module 334 receives a load instruction that specifies a memory location and whether a bypass cache mode is enabled (372). GPU cache control module 334 determines if the load instruction specifies that the bypass cache mode is enabled (374). In some cases, GPU cache control module 334 may determine if the load instruction specifies that the bypass cache mode is enabled based on the type of instruction, e.g., the opcode of the instruction. In additional cases, GPU cache control module 334 may determine if the load instruction specifies that the bypass cache mode is enabled based on a parameter included with the load instruction that is indicative of whether the bypass cache mode is enabled. If GPU cache control module 334 determines that the bypass cache mode is not enabled, then GPU cache control module 334 retrieves data from a cache, e.g., GPU cache 332, at a cache location associated with the memory location specified in the load instruction (376). On the other hand, if GPU cache control module 334 determines that the bypass cache mode is enabled, then GPU cache control module 334 retrieves data from a memory, e.g., shared memory space 336, at the memory location specified in the load instruction (378).

Figure 24:
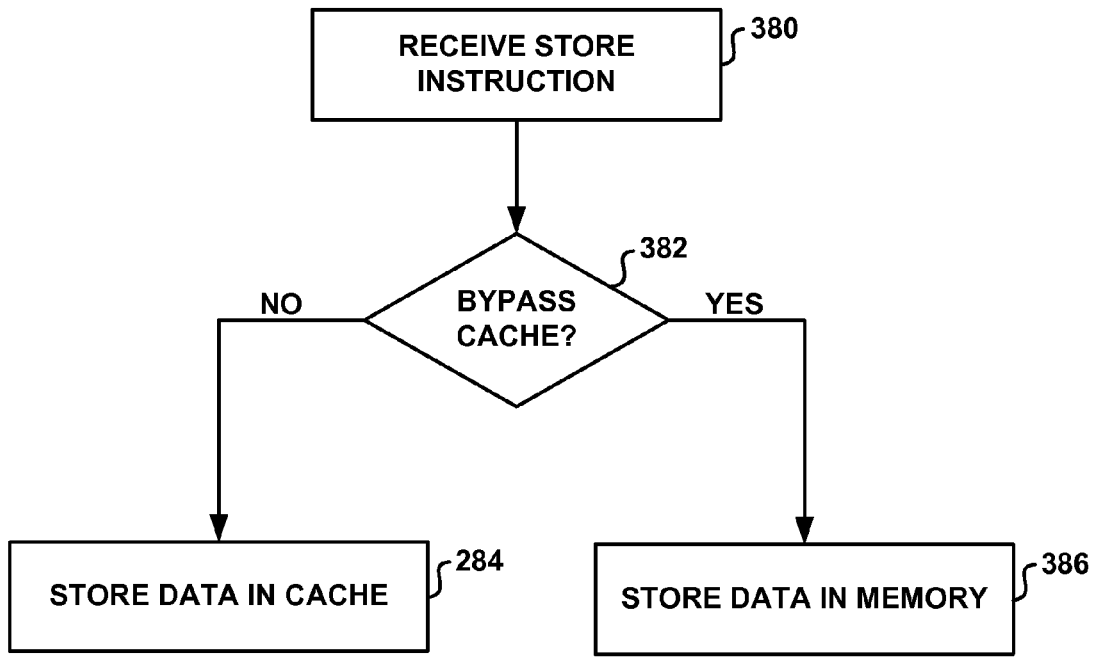

FIG. 24 is a flow diagram illustrating another example technique for processing cached mode and immediate mode instructions in accordance with this disclosure. In some examples, computing system 310 of FIG. 20 may be used to implement the example technique shown in FIG. 24. In the example of FIG. 24, the immediate mode is referred to as a bypass cache mode, and the immediate mode instructions correspond to bypass cache mode instructions. GPU cache control module 334 receives a store instruction that specifies a memory location, data to store and whether a bypass cache mode is enabled (380). GPU cache control module 334 determines if the store instruction specifies that the bypass cache mode is enabled (382). In some cases, GPU cache control module 334 may determine if the store instruction specifies that the bypass cache mode is enabled based on the type of instruction, e.g., the opcode of the instruction. In additional cases, GPU cache control module 334 may determine if the store instruction specifies that the bypass cache mode is enabled based on a parameter included with the load instruction that is indicative of whether the bypass cache mode is enabled. If GPU cache control module 334 determines that the bypass cache mode is not enabled, then GPU cache control module 334 stores the data specified in the store instruction in a cache, e.g., GPU cache 332, at a cache location associated with the memory location specified in the store instruction (384). On the other hand, if GPU cache control module 334 determines that the bypass cache mode is enabled, then GPU cache control module 334 stores the data specified in the store instruction to a memory, e.g., shared memory space 336, at the memory location specified in the store instruction (386).

Figure 25:
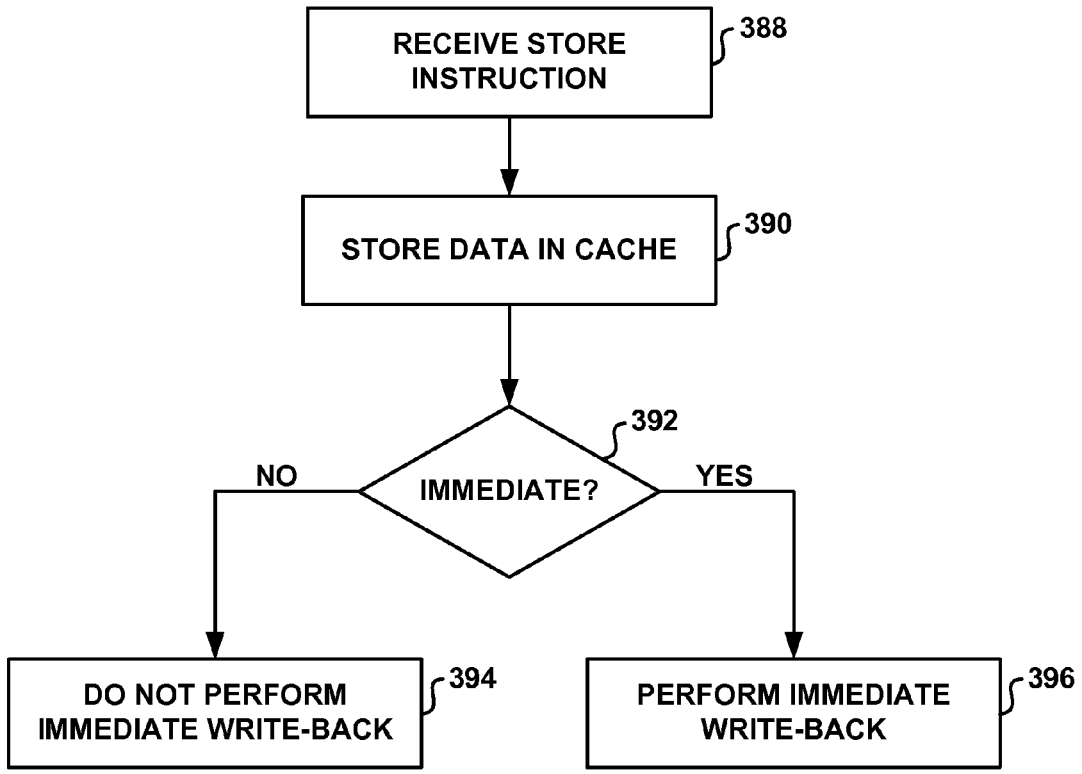

FIG. 25 is a flow diagram illustrating another example technique for processing cached mode and immediate mode instructions in accordance with this disclosure. In some examples, computing system 310 of FIG. 20 may be used to implement the example technique shown in FIG. 25. GPU cache control module 334 receives a store instruction that specifies a memory location, data to store and whether an immediate mode is enabled (388). GPU cache control module 334 stores the data specified in the store instruction in a cache, e.g., GPU cache 332, at a cache location associated with the memory location specified in the store instruction (390). GPU cache control module 334 determines if the immediate mode is enabled based on the information in the store instruction that specifies whether the immediate mode is enabled (392). The information that specifies whether the immediate mode is enabled may be, in some examples, the type of instruction, e.g., the opcode for the instruction and/or a parameter included with the instruction that specifies whether the immediate mode is enabled for the instruction. If the immediate mode is not enabled, GPU cache control module 334 does not perform an immediate cache write-back operation (394). On the other hand, if the immediate mode is enabled, GPU cache control module 334 performs an immediate cache write-back operation (396).

Figure 26:
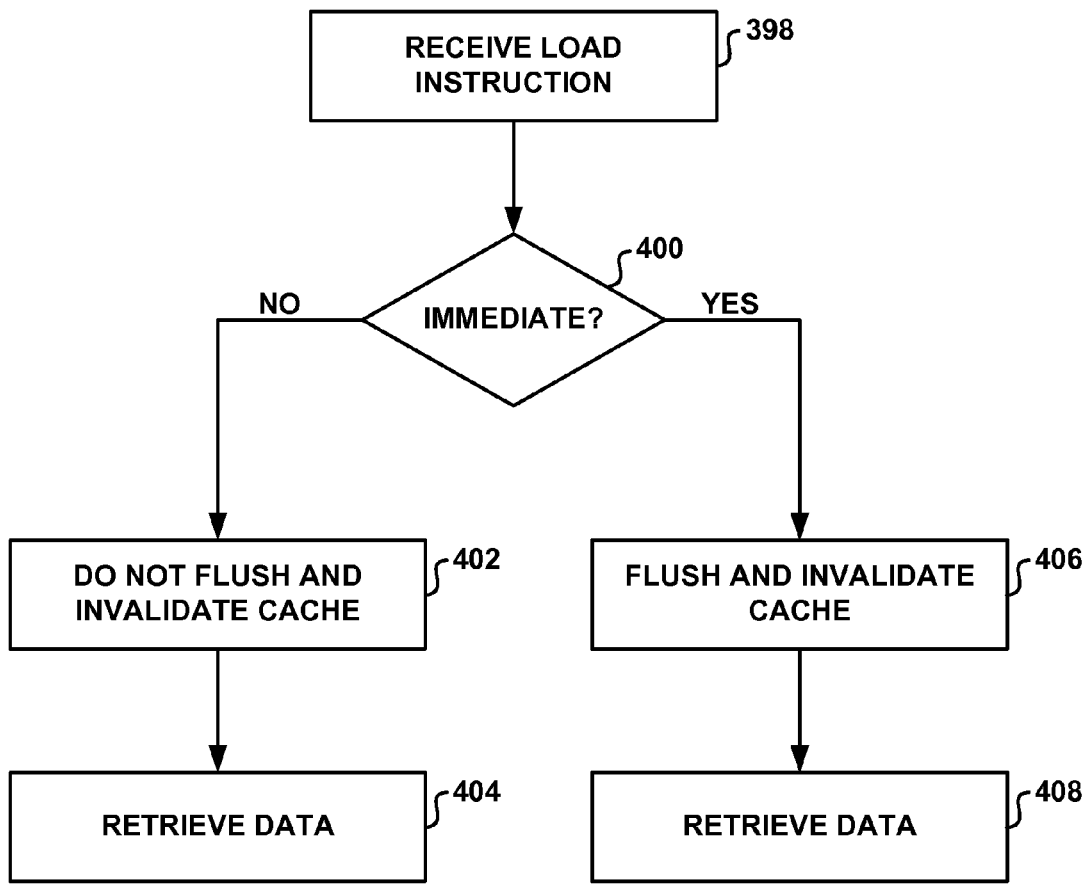

FIG. 26 is a flow diagram illustrating another example technique for processing cached mode and immediate mode instructions in accordance with this disclosure. In some examples, computing system 310 of FIG. 20 may be used to implement the example technique shown in FIG. 26. GPU cache control module 334 receives a load instruction that specifies a memory location and whether an immediate mode is enabled (398). GPU cache control module 334 determines if the immediate mode is enabled based on the information in the load instruction that specifies whether the immediate mode is enabled (400). The information that specifies whether the immediate mode is enabled may be, in some examples, the type of instruction, e.g., the opcode for the instruction and/or a parameter included with the instruction that specifies whether the immediate mode is enabled for the instruction. If the immediate mode is not enabled, GPU cache control module 334 does not flush and invalidate the cache (402). GPU cache control module 334 retrieves the data specified in the load instruction from either a cache, e.g., GPU cache 332, if the data is available in the cache or, if the data is unavailable in the cache, from the underlying memory (404). If the immediate mode is enabled, GPU cache control module 334 flushes and invalidates the cache (406). GPU cache control module 334 retrieves the data specified in the load instruction from the underlying memory (408). The cache does not return the data because the cache has been flushed and invalidated.

Figure 27:
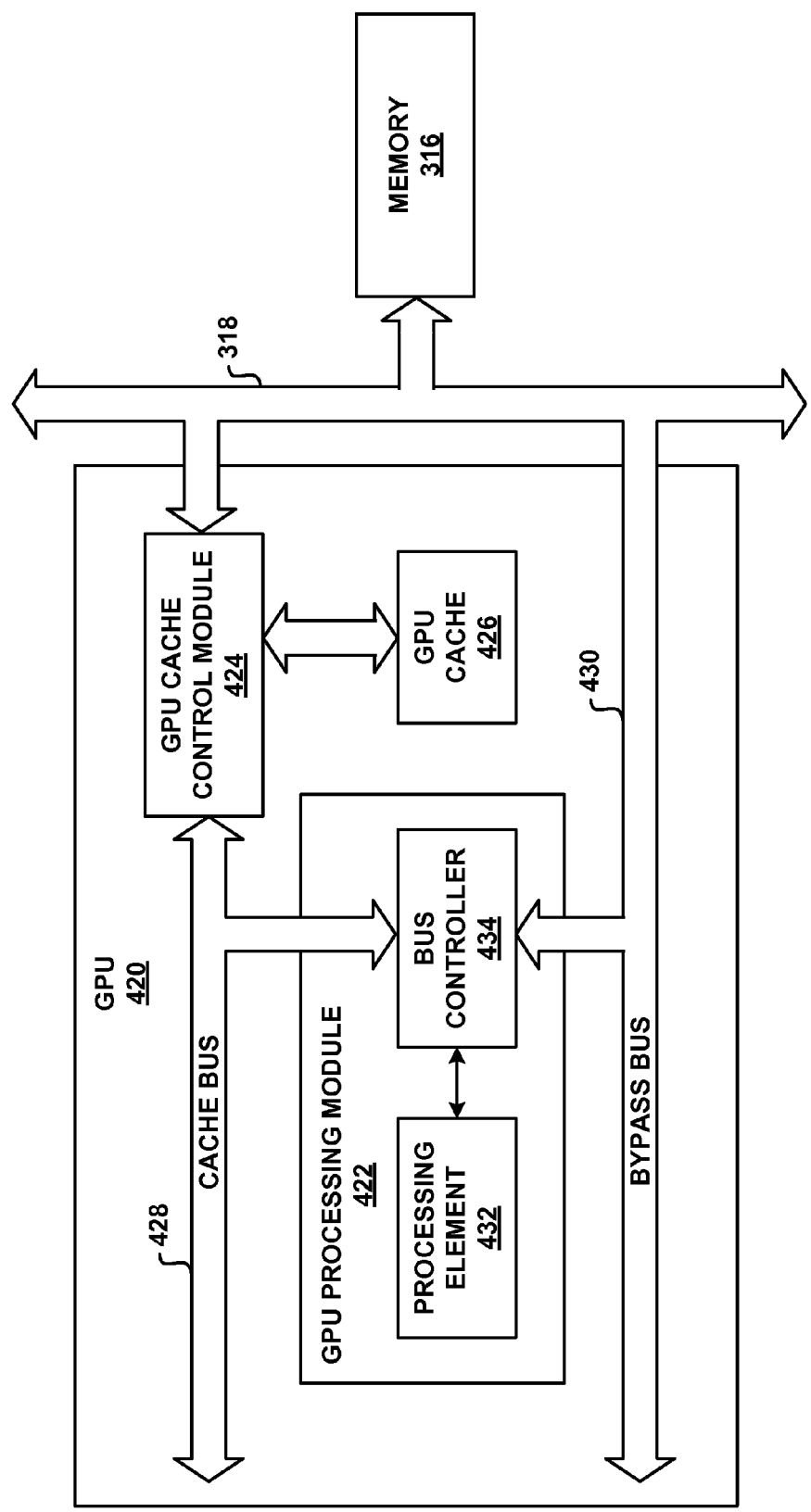
FIG. 27 is a block diagram illustrating an example GPU that may be used in the computing system of FIG. 20 in accordance with this disclosure.

FIG. 27 is a block diagram illustrating an example GPU 420 that may be used in computing system 310 of FIG. 20 in accordance with this disclosure. In some examples, GPU 420 may be used to implement GPU 314 illustrated in FIG. 20. GPU 420 includes a GPU processing module 422, a GPU cache control module 424, a GPU cache 426, a cache bus 428 and a bypass bus 430. GPU processing module 422 is communicatively coupled to GPU cache control module 424 via cache bus 428. GPU processing module 422 is also communicatively coupled to memory 316 via bypass bus 430. GPU cache control module 424 and GPU cache 426 are substantially similar to GPU cache control module 334 and GPU cache 332 in FIG. 20 and will not be described in further detail. GPU processing module 422 includes processing element 432 and a bus controller 434. Processing element 432 is configured to issue load and store instructions to bus controller 434.

Bus controller 434 may be configured to forward load and store instructions to appropriate locations via cache bus 428 and bypass bus 430. Bus controller 434 may be configured to operate in an immediate mode or a non-immediate mode based on information in the load or store instruction that is indicative of whether the instruction is an immediate mode or cached mode instruction. When bus controller 434 is configured to operate in a non-immediate mode, i.e., a cached mode, bus controller 434 may use cache bus 428 to forward load and store instructions to GPU cache control module 424 for execution. On the other hand, when bus controller 434 is configured to operate in an immediate mode, bus controller 434 may use bypass bus 430 to forward load and store instructions to memory 316 for execution.

Figure 28:
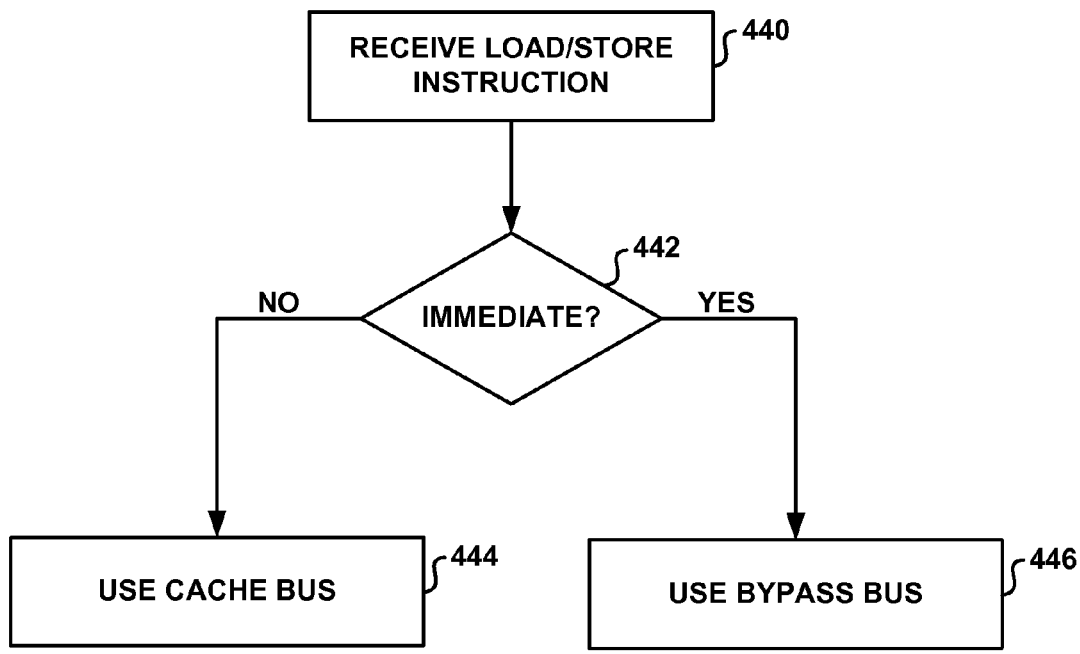
FIG. 28 is a flow diagram illustrating an example technique for processing cached mode and immediate mode instructions in accordance with this disclosure.

FIG. 28 is a flow diagram illustrating an example technique for processing cached mode and immediate mode instructions in accordance with this disclosure. In some examples, GPU 420 of FIG. 27 may be used to implement the example technique shown in FIG. 28. Bus controller 434 receives a load or a store instruction (440). Bus controller 434 determines if the immediate mode is enabled based on the information in the load or store instruction that specifies whether the immediate mode is enabled (442). The information that specifies whether the immediate mode is enabled may be, in some examples, the type of instruction, e.g., the opcode for the instruction and/or a parameter included with the instruction that specifies whether the immediate mode is enabled for the instruction. If bus controller 434 determines that the immediate mode is not enabled, then bus controller 434 uses cache bus 428 to forward the received instruction to GPU cache control module 424 (444). Otherwise, if bus controller 434 determines that the immediate mode is enabled, then bus controller 434 uses bypass bus 430 to forward the received instruction to memory 316 (446).

Figure 29:
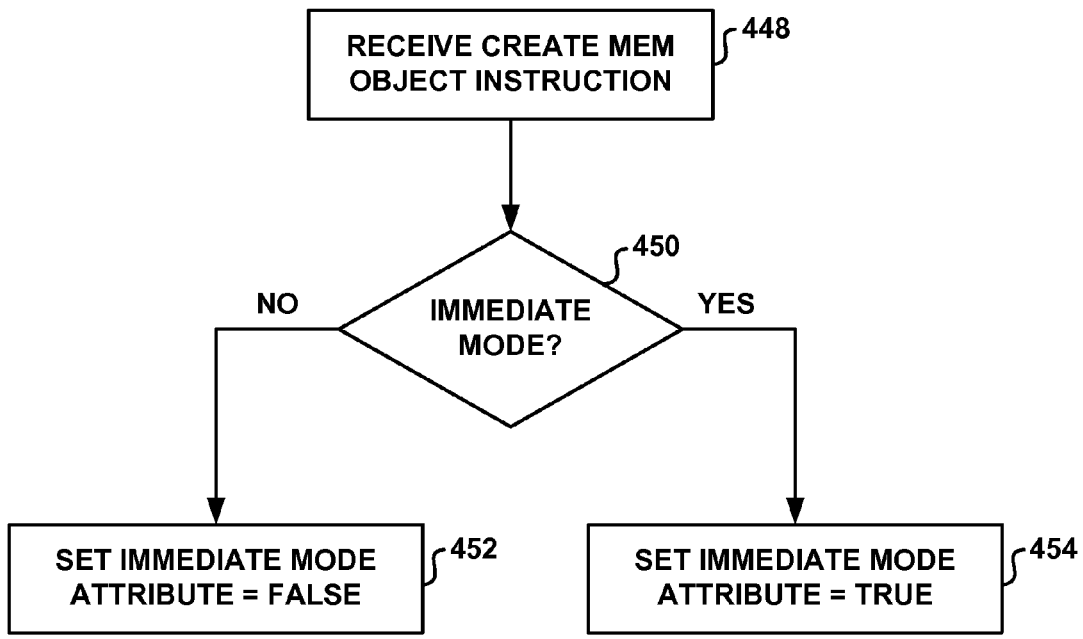
FIG. 29 is a flow diagram illustrating another example technique for executing a memory object creation instruction issued by a process executing on a host device in accordance with this disclosure.

FIG. 29 is a flow diagram illustrating another example technique for executing a memory object creation instruction issued by a process executing on a host device in accordance with this disclosure. In some examples, computing system 310 of FIG. 20 may be used to implement the example technique shown in FIG. 29. The memory object creation instruction may be a buffer object creation instruction or an image object creation instruction. Memory buffer interface 328 receives a memory object creation instruction (448). Memory buffer interface 328 determines if the memory object creation instruction specifies that the immediate mode should be enabled for the memory object (450). For example, memory buffer interface 328 may determine whether an immediate flag parameter is included in a parameter list for the memory object creation instruction.

If memory buffer interface 328 determines that the memory object creation instruction does not specify that the immediate mode should be enabled for the memory object, then memory buffer interface 328 sets an immediate mode attribute for the created memory object to a value indicative that the immediate mode is not enabled, e.g., "false" (452). On the other hand, if memory buffer interface 328 determines that the memory object creation instruction specifies that the immediate mode should be enabled for the memory object, then memory buffer interface 328 sets an immediate mode attribute for the created memory object to a value indicative that the immediate mode is enabled, e.g., "true" (454). The immediate mode attribute of the memory object may be used by host device 312 and/or GPU 314, in some examples, to determine whether to execute cached mode or immediate mode read and write operations when accessing data stored in a particular memory object.

In some examples, host process 320 and/or task 330 may wish to program some memory objects to be immediate memory objects and other objects to be cached memory objects, i.e., non-immediate memory objects. The techniques of this disclosure may, in some examples, include specialized compilation techniques that allow a compiled task 330 to perform read and write operations with respect to both cached memory objects and immediate memory objects. A first example compilation technique may compile a given read operation or write operation into a sequence of instructions. The sequence of instructions may check the value of an immediate mode attribute for a memory object to be read from or written to, and determine whether to execute a cached mode instruction or an immediate mode instruction based on the value of the immediate mode attribute. A second example compilation technique may use information in the source code that is indicative of whether the memory object is an immediate mode object to select either cache mode instructions or immediate mode instructions to use in the compiled code for accessing the memory object.

According to the first example compilation technique, a compiler may compile source code for task 330 such that the compiled code for task 330 includes a read sequence according to the following example pseudo-code:

```
if ( isImmediate ){
    immediate_read(...)
}
else{
    cached_read(...)
}
``` where "isImmediate" represents a boolean immediate mode attribute for a memory object from which data will be read, "immediate_read( . . . )" represents an immediate mode read instruction, and "cached_read( . . . )" represents a cached mode read instruction.

GPU cache control module 334 may process the immediate_read( . . . ) instruction by, for example, invalidating GPU cache 332, if used, prior to reading data from GPU cache 332. GPU cache control module 334 may process the cached_read( . . . ) instruction by, for example, reading data from GPU cache 332 in a normal fashion, e.g., without invalidating the cache prior to performing the read.

According to the first example compilation technique, a compiler may compile source code for task 330 such that the compiled code for task 330 includes a write sequence according to the following example pseudo-code:

```
if ( isImmediate ){
    immediate_write(...)
}
else{
    cached_write(...)
}
``` where "isImmediate" represents a boolean immediate mode attribute for a memory object to which data will be written, "immediate_write( . . . )" represents an immediate mode write instruction, and "cached_write( . . . )" represents a cached mode write instruction.

GPU cache control module 334 may process the immediate_write( . . . ) instruction, in some examples, by using a write-through mode for GPU cache 332, if a cache is used. In further examples, GPU cache control module 334 may process the immediate_write( . . . ) instruction by writing data to GPU cache 332 if a cache is used, and performing a cache flush for GPU cache 332 in response to writing the data to GPU cache 332. GPU cache control module 334 may process the cached_write( . . . ) instruction by writing data to GPU cache 332 in a normal fashion, e.g., without using a write-through mode and/or without flushing the cache in response to the write operation.

Figure 30:
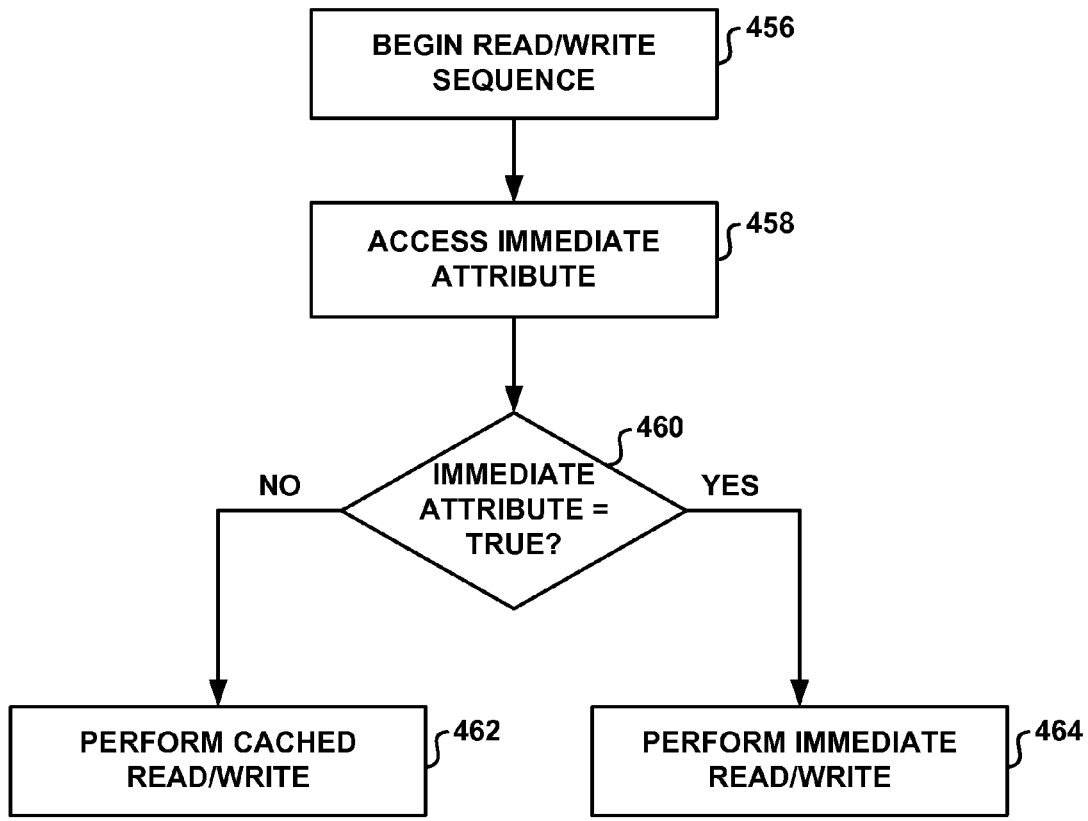
FIG. 30 is a flow diagram illustrating how a GPU may process a sequence of instructions compiled according to a first compilation technique according to this disclosure.

FIG. 30 is a flow diagram illustrating how a GPU may process a sequence of instructions compiled according to the above-described first compilation technique. In some examples, the technique illustrated in FIG. 30 may be used to implement the example pseudo-code provided above for the read and write sequences. Task 330 begins a read sequence or a write sequence (456). For example, task 330 may begin the read sequence or the write sequence when task 330 reaches a point in the execution of task 330 where a read or write instruction for a particular memory object should occur. Task 330 accesses the immediate mode attribute associated with the memory object from which data will be read or to which data will be written (458). Task 330 determines whether the attribute for the memory object is set to a value indicating that the immediate mode is enabled, e.g., "true" (460). If task 330 determines that the attribute for the memory object is set to a value indicative that the immediate mode is not enabled, then task 330 performs a cached read or write operation for the memory object using a cached read or write instruction (462). Otherwise, if task 330 determines that the attribute for the memory object is set to a value indicating that the immediate mode is enabled, then task 330 performs an immediate read or write operation for the memory object using an immediate read or write instruction (464).

According to the second example compilation technique, when compiling the source code, the compiler may have access to information indicative of whether or not the immediate mode is enabled for a particular memory object that is read from or written to by task 330. The compiler may use this information to compile the source code for task 330 to select between either cached mode read and write instructions or immediate mode read and write instructions when the task 330 reads from or writes to the particular memory object.

In some examples, the information indicative of whether or not the immediate mode is enabled for a particular memory object may be a compile-time attribute indicative of whether the immediate mode is enabled for one or more memory objects accessed by the source code for task 330. For example, the source code for task 330, e.g., the kernel source code, may include a compile-time attribute indicative of whether the immediate mode is enabled for one or more memory objects used by task 330. The compile-time attribute may, in some cases, take the form of an OpenCL attribute qualifier such as, e.g., _cl_immediate. The attribute qualifier may be associated with one or more particular memory objects and/or one or more variables which are stored within the one or more memory objects. When the attribute qualifier is associated with a particular memory object, then the compiler may determine that the immediate mode is enabled for the memory object. Similarly, when the attribute qualifier is not associated with a particular memory object, then the compiler may determine that the immediate mode is not enabled for the memory object. Using such an attribute may reduce the work for the compiler and potentially reduce the kernel size. In some examples, software applications may limit the use of immediate buffers to cases where such buffers are needed. In such examples, the decision of whether or not to use immediate buffers may be a compile time decision.

If the compile-time attribute indicates that the immediate mode is enabled for the memory object associated with shared memory space 336, then the compiler may compile task 330 such that the compiled code for task 330 includes immediate mode read and/or write instructions for read or write operations that take place with respect to shared memory space 336. Otherwise, if the immediate mode is not enabled for the memory object associated with shared memory space 336, then the compiler may compile task 330 such that the compiled code for task 330 does not include immediate mode read and/or write instructions for read or write operations that take place with respect to shared memory space 336. For example, the compiler may compile task 330 such that the compiled code for task 330 includes cached read and/or write instructions for read or write operations that take place with respect to shared memory space 336.

Figure 31:
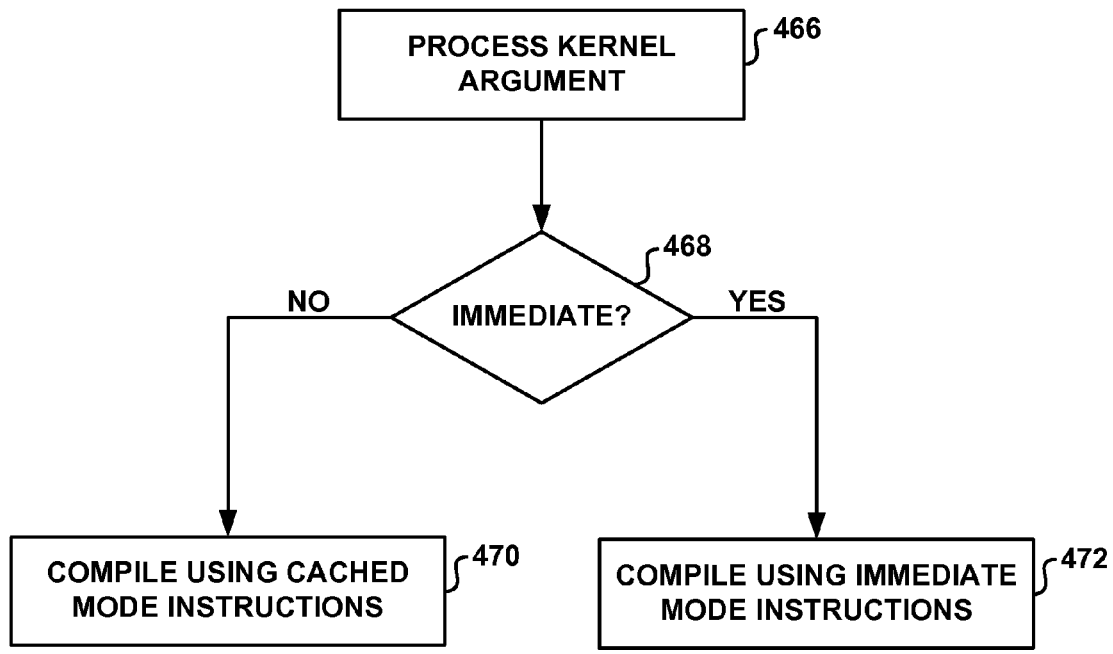
FIG. 31 is a flow diagram illustrating an example technique for compiling source code for a task in accordance with this disclosure.

FIG. 31 is a flow diagram illustrating an example technique for compiling source code for a task in accordance with this disclosure. The resulting code compiled using the techniques in FIG. 31 may, in some examples, correspond to task 330 in FIG. 20. In the example technique of FIG. 31 task 330, is referred to as a kernel. The compiler processes a kernel argument that is implemented by a memory object (466). The compiler determines whether the memory object is an immediate mode memory object (468). In some examples, the compiler may determine whether the memory object is an immediate mode memory object based on information included in the source code of the kernel, e.g., a compile-time attribute associated with the kernel argument. If the compiler determines that the memory object is not an immediate mode memory object, then the compiler compiles the read operations and the write operations associated with the particular kernel argument using cached read and write instructions (470). On the other hand, if the compiler determines that the memory object is an immediate mode memory object, then the compiler compiles the read operations and the write operations associated with the particular kernel argument using immediate mode read and write instructions (472).

Figure 32:
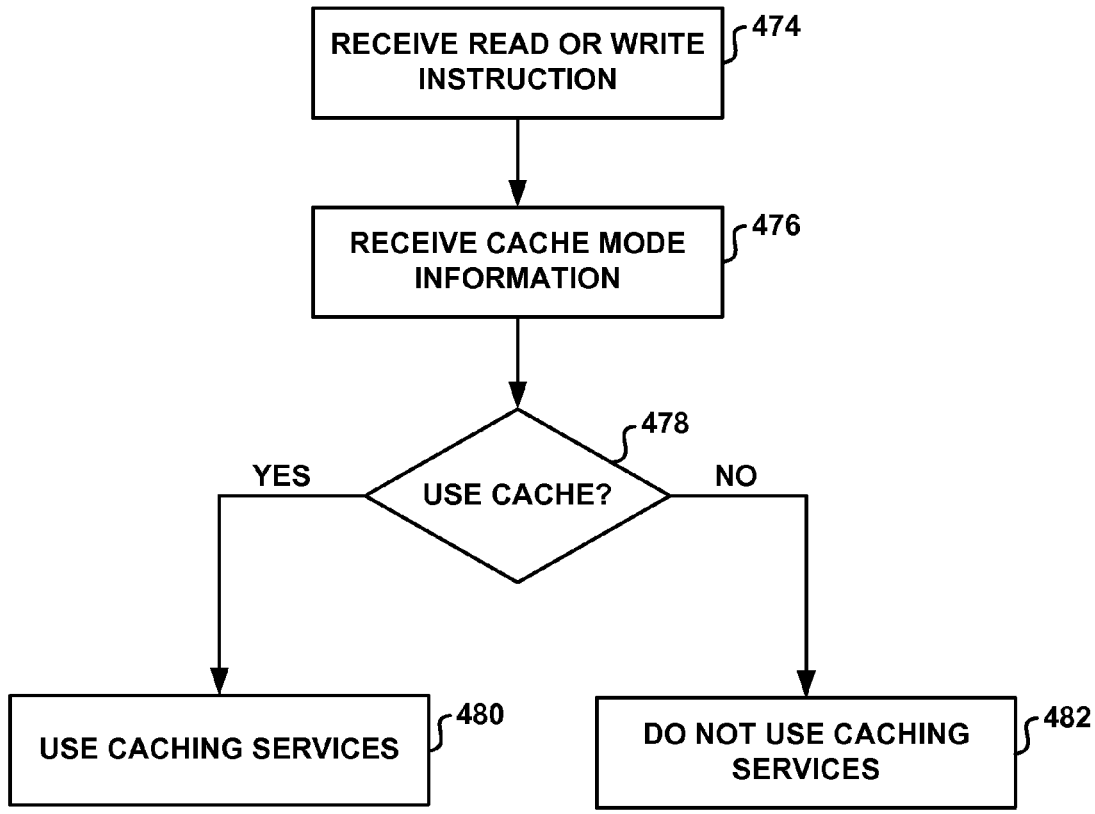
FIG. 32 is a flow diagram illustrating an example technique that may be used by a GPU to selectively use caching services according to this disclosure.

FIG. 32 is a flow diagram illustrating an example technique that may be used by a GPU to selectively use caching services according to this disclosure. For example, the techniques may allow a GPU to selectively use a GPU cache associated with a memory to execute at least one of a read operation and a write operation with respect to a memory space of the memory in response to receiving information specifying whether caching services should be used for executing at least one of read operations and write operations with respect to the memory space. In some examples, GPU 314 illustrated in FIG. 20 and/or GPU 420 illustrated in FIG. 27 may be used to implement the techniques illustrated in FIG. 32.

GPU 314 receives at least one of a read instruction or a write instruction to process (474). The received instruction may instruct GPU 314 to execute at least one of a read operation and a write operation with respect to a memory space of a memory. GPU 314 receives cache mode information specifying whether caching services should be used for executing at least one of read operations and write operations with respect to the memory space (476). In some examples, the cache mode information may be included within the received instruction. In further examples, the cache mode information may be an immediate mode attribute of a memory object associated with the memory space. GPU 314 determines whether to use caching services based on the cache mode information (478). In response to receiving information specifying that caching services should be used for executing the received instruction, GPU 314 may use caching services to execute the received instruction (480). In response to receiving information specifying that caching services should not be used for executing the received instruction, GPU 314 may not use caching services to execute the received instruction (482). In some examples, GPU 314 may use one or more of the techniques illustrated in FIGS. 23-28 and 30 to implement one or more of decision box 478 and process boxes 480 and 482. In some cases, a GPU cache control module or memory management unit, e.g., GPU cache control module 334 illustrated in FIG. 20, may be used to implement the techniques shown in FIG. 32. In additional cases, a bus controller, e.g., bus controller 434 illustrated in FIG. 27, may be used to implement the techniques shown in FIG. 32.

In some examples, in order to implement the immediate memory objects, a GPU ALU may be designed to execute an ALU instruction that invalidates the global memory cache and/or a specific portion of the global memory cache specified in the instruction. In general, host device 312 may use existing CPU capabilities to implement the immediate memory objects.

Various use cases for the out-of-band signaling techniques described in this disclosure, e.g., the message passing techniques described herein, and the immediate memory objects described in this disclosure will now be discussed in further detail. According to a first use case, out-of band signaling may be used as a stand-alone feature without necessarily using immediate memory objects in addition to the out-of-band signaling techniques. Out-of-band signaling may be used for synchronization and passing a relatively small amount of data quickly. In some examples, out-of-band signaling may have a lower latency than immediate memory objects, but have a lower bandwidth than immediate memory objects.

Out-of-band signaling may also be used according to the first use case for memory allocation operations. For example, a GPU may use out-of-band signaling to request that the host CPU allocate a new buffer. The GPU may also use also use out-of-band signaling to specify to the host CPU a requested buffer length. As another example, a CPU may use out-of-band signaling after allocating a buffer to send a pointer to the GPU that specifies a memory location for the buffer.

Out-of-band signaling may also be used according to the first use case for remote procedure calls where a small amount of data is to be exchanged. For example, in a case where a kernel executing on a compute unit within a computing device uses a RFC to launch another kernel on another compute unit either in the same computing device or in another computing device, the data for the RPC might be stored in local memory of the launching compute unit. The out-of-band signaling techniques of this disclosure may be used to transfer the data from the local memory of the launching compute unit to the local memory of the compute unit executing the newly launched kernel.

Out-of-band signaling may also be used according to the first use case for progress reporting. For example, a GPU may use out-of-band signaling to report the percentage of completion of the current task to the host CPU.

Out-of-band signaling may also be used according to the first use case for error reporting. For example, a GPU may use out-of-band signaling to report an error code to the host CPU.

Out-of-band signaling may also be used according to the first use case to assist in context switches. For example, a host CPU may use out-of-band signaling to request that a GPU save a state to prepare for a context switch According to a second use case, immediate memory objects may be used as a stand-alone feature without necessarily using out-of-band signaling in addition to the immediate memory objects. For example, immediate buffers may be used to accomplish the exchange of a relatively large amount of data. Immediate buffers may contain not just data, but also synchronization markers. In this case, a data producer may first write data to the buffer, and then write a synchronization marker which indicates the readiness and/or the location of the data to a consumer. The consumer looks for a synchronization data in a location decided a priori, such as, for example, in the header section of the buffer by polling this memory location. Once the synchronization marker is obtained, the consumer reads the data. Similar techniques may be applied to immediate image objects.

A variety of synchronization protocols can be employed for these techniques. For instance, synchronization markers may be embedded inside the data buffer, or may be located in separate buffers. Such techniques may be applied to the transmission of compressed data that is compressed using variable length encoding or run length encoding schemes.

According to a third use case, immediate memory objects may be used in conjunction with out-of-band signaling, for example, to accomplish the exchange of a relatively large amount of data. In this case, out-of-band signaling may be used for synchronization while the immediate memory objects store the data. For example, a data producer may place data into an immediate buffer and notify a consumer about the readiness and the location and/or the size of data using out-of-band signaling. In a flow controlled scenario, the consumer reads the data and notifies the producer that the buffer can be reused. The notification may also be accomplished using out-of-band signaling.

Such techniques may be used in algorithms that require flow controlled data pipelining. For a host CPU and a GPU, such techniques may be used, for example, for diagnostic logging. For multiple OpenCL compute devices, these techniques may be used to connect multiple devices into an asynchronous flow-controlled data pipeline. This may allow the application to be broken up into blocks that are more suitable for each CPU or GPU, launch various pipeline processing stages on multiple devices and/or to off-load most, or even all, data synchronization from a host CPU.

In some examples, the techniques of this disclosure may provide a message passing interface that facilitates the sending and receiving of messages between a process executing on a host device and a task executing on a computing device for a multiple-processor computing platform that initiates tasks using command queues. The computing device may, in some cases, be a GPU. In additional cases, the computing device may be any type of computing device defined by a cross-platform, cross-vendor, heterogeneous computing platform API.

In further examples, the techniques of this disclose may provide a GPU that includes one or more registers that are accessible by a host device. The one or more registers may be configured to facilitate message passing between a task executing on the GPU and a process executing on a device other than the GPU.

In additional examples, the techniques of this disclose may provide a memory buffer interface that allows immediate memory objects to be created. The immediate memory objects may be used to implement a non-cacheable shared memory space and/or a cache-coherent shared memory space in order to share data between a process executing on a host device and a task executing on a computing device while the task is executing on the computing device. The computing device may, in some cases, be a graphics processing unit (GPU). In additional cases, the computing device may be any type of computing device defined by a cross-platform, cross-vendor, heterogeneous computing platform API.

In yet further examples, the techniques of this disclose may provide a GPU that includes a cache for a shared memory space that may be selectively disabled in order to provide a non-cacheable shared memory space. In additional examples, the techniques of this disclosure may provide a GPU that includes a cache coherency mode that may be selectively enabled to provide a cache-coherent shared memory space.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

The invention claimed is:

1. A device comprising:
   a graphics processing unit (GPU) comprising:
      a GPU cache configured to perform caching services for a shared memory space of a memory, the shared memory space being accessible by another processing unit; and
      one or more processing modules configured to selectively use caching services of the GPU cache to execute at least one of a read operation or a write operation with respect to the shared memory space of the memory in response to receiving information specifying whether caching services should be used for executing at least one of read operations or write operations with respect to the shared memory space, wherein to selectively use the caching services of the GPU cache to execute the at least one of the read operation or the write operation with respect to the shared memory space of the memory, the one or more processing modules are configured to:
         disable the caching services performed by the GPU cache for the shared memory space of the memory when the information specifying whether the caching services should be used specifies that an immediate mode should be enabled; and
         enable a shared memory cache coherency mode for the GPU cache when the information specifying whether the caching services should be used specifies that the immediate mode should be enabled.

2. The device of claim 1, wherein the one or more processing modules are configured to use the caching services of the GPU cache to execute the at least one of the read operation or the write operation with respect to the shared memory space of the memory in response to receiving information specifying that caching services should be used for executing the at least one of read operations or write operations with respect to the shared memory space, and to not use the caching services of the GPU cache to execute the at least one of the read operation or the write operation with respect to the shared memory space of the memory in response to receiving information specifying that caching services should not be used for executing the at least one of read operations or write operations with respect to the shared memory space.

3. The device of claim 1, wherein the information specifying whether caching services should be used for executing the at least one of read operations or write operations with respect to the shared memory space comprises at least one of a read instruction or a write instruction that specifies whether a cached mode is enabled for the at least one of the read instruction or the write instruction.

4. The device of claim 1, wherein the information specifying whether caching services should be used for executing the at least one of read operations or write operations with respect to the shared memory space comprises the immediate mode attribute of a memory object associated with the shared memory space, the immediate mode attribute specifying whether the immediate mode is enabled for the memory object.

5. The device of claim 1, wherein the one or more processing modules comprise a GPU cache control module.

6. The device of claim 1, wherein the one or more processing modules comprise a bus controller.

7. The device of claim 1, wherein the GPU comprises a programmable shader unit.

8. A method comprising:
   performing caching services for a shared memory space of a memory, the shared memory space being accessible by another processing unit; and
   selectively using, with one or more processing modules of a graphics processing unit (GPU), caching services of a GPU cache to execute at least one of a read operation or a write operation with respect to the shared memory space of the memory in response to receiving information specifying whether caching services should be used for executing at least one of read operations or write operations with respect to the shared memory space, the GPU cache being included in the GPU, the GPU cache being configured to perform caching services for the shared memory space of the memory, wherein selectively using the caching services of the GPU cache to execute the at least one of the read operation or the write operation with respect to the shared memory space of the memory comprises:

disabling the caching services performed by the GPU cache for the shared memory space of the memory when the information specifying whether the caching services should be used specifies that an immediate mode should be enabled; and enabling a shared memory cache coherency mode for the GPU cache when the information specifying whether the caching services should be used specifies that the immediate mode should be enabled.

9. The method of claim 8, wherein selectively using the caching services of the GPU cache comprises:

using the caching services of the GPU cache to execute the at least one of the read operation or the write operation with respect to the shared memory space of the memory in response to receiving information specifying that caching services should be used for executing the at least one of read operations or write operations with respect to the shared memory space; and not using the caching services of the GPU cache to execute the at least one of the read operation or the write operation with respect to the shared memory space of the memory in response to receiving information specifying that caching services should not be used for executing the at least one of read operations or write operations with respect to the shared memory space.

10. The method of claim 8, wherein the information specifying whether caching services should be used for executing the at least one of read operations or write operations with respect to the shared memory space comprises at least one of a read instruction or a write instruction that specifies whether a cached mode is enabled for the at least one of the read instruction or the write instruction.

11. The method of claim 8, wherein the information specifying whether caching services should be used for executing the at least one of read operations or write operations with respect to the shared memory space comprises an immediate mode attribute of a memory object associated with the shared memory space, the immediate mode attribute specifying whether an immediate mode is enabled for the shared memory object.

12. The method of claim 8, wherein the one or more processing modules comprise a GPU cache control module.

13. The method of claim 8, wherein the one or more processing modules comprise a bus controller.

14. The method of claim 8, wherein the GPU comprises a programmable shader unit.

15. An apparatus comprising:
a graphics processing unit (GPU) comprising:
a GPU cache configured to perform caching services for a shared memory space of a memory, the shared memory space being accessible by another processing unit; and
means for selectively using caching services of the GPU cache to execute at least one of a read operation or a write operation with respect to the shared memory space of the memory in response to receiving information specifying whether caching services should be used for executing at least one of read operations or write operations with respect to the shared memory space, wherein the means for selectively using the caching services of the GPU cache to execute at least one of the read operation or the write operation with respect to the shared memory space of the memory comprises:
means for disabling the caching services performed by the GPU cache for the shared memory space of the memory when the information specifying whether the caching services should be used specifies that an immediate mode should be enabled; and means for enabling a shared memory cache coherency mode for the GPU cache when the information specifying whether the caching services should be used specifies that the immediate mode should be enabled.

16. The apparatus of claim 15, wherein the means for selectively using the caching services of the GPU cache comprises:

means for using the caching services of the GPU cache to execute the at least one of the read operation or the write operation with respect to the shared memory space of the memory in response to receiving information specifying that caching services should be used for executing the at least one of read operations or write operations with respect to the shared memory space; and means for not using the caching services of the GPU cache to execute the at least one of the read operation or the write operation with respect to the shared memory space of the memory in response to receiving information specifying that caching services should not be used for executing the at least one of read operations or write operations with respect to the shared memory space.

17. The apparatus of claim 15, wherein the information specifying whether caching services should be used for executing the at least one of read operations or write operations with respect to the shared memory space comprises at least one of a read instruction or a write instruction that specifies whether a cached mode is enabled for the at least one of the read instruction or the write instruction.

18. The apparatus of claim 15, wherein the information specifying whether caching services should be used for executing the at least one of read operations or write operations with respect to the shared memory space comprises an immediate mode attribute of a memory object associated with the shared memory space, the immediate mode attribute specifying whether an immediate mode is enabled for the memory object.

19. The apparatus of claim 15, wherein the means for selectively using the caching services comprises a GPU cache control module.

20. The apparatus of claim 15, wherein the means for selectively using the caching services comprises a bus controller.

21. The apparatus of claim 15, further comprising a programmable shader unit.

22. A non-transitory computer-readable medium comprising instructions that cause one or more processors to:

perform caching services for a shared memory space of a memory, the shared memory space being accessible by another processing unit; and selectively use caching services of a graphics processing unit (GPU) cache to execute at least one of a read operation or a write operation with respect to a shared memory space of the memory in response to receiving information specifying whether caching services should be used for executing at least one of read operations or write operations with respect to the shared memory space, the GPU cache being included in the GPU and being configured to perform caching services for the shared memory space of the memory, wherein to selectively use the caching services of the GPU cache to execute the at least one of the read operation or the write operation with respect to the shared memory space of the memory, the one or more processors:
  disable the caching services performed by the GPU cache for the shared memory space of the memory when the information specifying whether the caching services should be used specifies that an immediate mode should be enabled; and
  enable a shared memory cache coherency mode for the GPU cache when the information specifying whether the caching services should be used specifies that the immediate mode should be enabled.

23. The non-transitory computer-readable medium of claim 22, wherein the instructions that cause the one or more processors to selectively use the caching services of the GPU cache comprise instructions that cause the one or more processors to:
  use the caching services of the GPU cache to execute the at least one of the read operation or the write operation with respect to the shared memory space of the memory in response to receiving information specifying that caching services should be used for executing the at least one of read operations or write operations with respect to the shared memory space; and
  not use the caching services of the GPU cache to execute the at least one of the read operation or the write operation with respect to the shared memory space of the memory in response to receiving information specifying that caching services should not be used for executing the at least one of read operations or write operations with respect to the shared memory space.

24. The non-transitory computer-readable medium of claim 22, wherein the information specifying whether caching services should be used for executing the at least one of read operations or write operations with respect to the shared memory space comprises at least one of a read instruction or a write instruction that specifies whether a cached mode is enabled for the at least one of the read instruction or the write instruction.

25. The non-transitory computer-readable medium of claim 22, wherein the information specifying whether caching services should be used for executing the at least one of read operations or write operations with respect to the shared memory space comprises an immediate mode attribute of a memory object associated with the shared memory space, the immediate mode attribute specifying whether an immediate mode is enabled for the memory object.

26. The non-transitory computer-readable medium of claim 22, wherein the GPU cache is included in a GPU comprising a programmable shader unit.

* * * * *